US007158946B2

(12) United States Patent
Sato et al.

(10) Patent No.: US 7,158,946 B2
(45) Date of Patent: Jan. 2, 2007

(54) METHOD, SYSTEM AND MEDIUM FOR REMOTELY MANAGING PLURAL IMAGE FORMING APPARATUSES AND PLURAL TYPES OF MAINTENANCE AGREEMENTS RELATING TO THE APPARATUSES

(75) Inventors: Kazuma Sato, Kanagawa (JP); Yuji Sakabe, Tokyo (JP); Toru Niki, Kanagawa (JP); Yuko Suzuki, New York, NY (US); Kengo Kawamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 658 days.

(21) Appl. No.: 09/781,162

(22) Filed: Feb. 13, 2001

(65) Prior Publication Data
US 2001/0037267 A1 Nov. 1, 2001

(30) Foreign Application Priority Data

| Feb. 14, 2000 | (JP) | ............................... 2000-035933 |
| Feb. 6, 2001 | (JP) | ............................... 2001-030176 |

(51) Int. Cl.
G06Q 30/00 (2006.01)
G03G 21/02 (2006.01)

(52) U.S. Cl. ........................................ 705/26; 399/79
(58) Field of Classification Search ............... 705/25, 705/26, 27; 399/76–86
See application file for complete search history.

(56) References Cited

U.S. PATENT DOCUMENTS

| 5,305,199 | A | | 4/1994 | LoBiondo et al. ........... 364/403 |
| 5,381,242 | A | * | 1/1995 | Fujii ........................... 358/468 |
| 5,383,129 | A | * | 1/1995 | Farrell ......................... 399/79 |
| 5,699,546 | A | | 12/1997 | Nishikata et al. ........... 395/430 |
| 5,708,909 | A | * | 1/1998 | Yamashita et al. ............ 399/8 |
| 5,715,496 | A | | 2/1998 | Sawada et al. ................ 399/8 |
| 5,745,883 | A | * | 4/1998 | Krist et al. .................. 705/34 |
| 5,850,584 | A | * | 12/1998 | Robinson et al. ............ 399/79 |
| 5,956,698 | A | * | 9/1999 | Lacheze et al. ............. 705/34 |
| 6,011,937 | A | | 1/2000 | Chaussade et al. .......... 399/24 |
| 6,052,547 | A | * | 4/2000 | Cuzzo et al. ................ 399/79 |
| 6,208,432 | B1 | | 3/2001 | Kohtani et al. ............. 358/444 |
| 6,385,675 | B1 | * | 5/2002 | Yamaguchi .................. 710/72 |
| 6,498,912 | B1 | * | 12/2002 | Leni et al. ................... 399/79 |
| 6,516,157 | B1 | * | 2/2003 | Maruta et al. ................ 399/8 |

(Continued)

FOREIGN PATENT DOCUMENTS

EP 0 429 056 5/1991

(Continued)

OTHER PUBLICATIONS

Author unknown, "Lexmark Launches MarkTrack Printer Software to Slash Prining Costs," M2 Presswire, Coventry, Sep. 10, 1999, p. 1.*

Primary Examiner—Jeffrey A. Smith
Assistant Examiner—Amee A. Shah
(74) Attorney, Agent, or Firm—Fitzpatrick, Cella, Harper & Scinto

(57) ABSTRACT

When data of the number of printed paper sheets is transmitted from a user device to a service center, the service center charges on the basis of a unit price corresponding to the agreement contents of each user and the number of printed paper sheets and notifies the user of the payable amount. In addition, upon receiving toner low information from the user device, the service center predicts the toner out time and issues a notification of cartridge supply and empty cartridge collection to the user.

15 Claims, 41 Drawing Sheets

U.S. PATENT DOCUMENTS 6,832,250 B1 * 12/2004 Coons et al. ............... 709/224
7,061,634 B1 * 6/2006 Ogura et al. ............... 358/1.15

FOREIGN PATENT DOCUMENTS

| EP | 0429056 A2 * | 5/1991 |
| EP | 0 715 221 | 6/1996 |
| EP | 0 813 120 | 12/1997 |
| JP | 63-197966 | 8/1988 |
| JP | 02136870 A * | 5/1990 |
| JP | 03-162057 | 7/1991 |
| JP | 03-248166 | 11/1991 |
| JP | 09138621 A * | 5/1997 |
| JP | 09-244760 | 9/1997 |
| JP | 10-333769 | 12/1998 |
| JP | 11-015335 | 1/1999 |
| JP | 11-234467 | 8/1999 |
| JP | 2000-352909 | 12/2000 |
| JP | 11-103291 | 10/2006 |

* cited by examiner

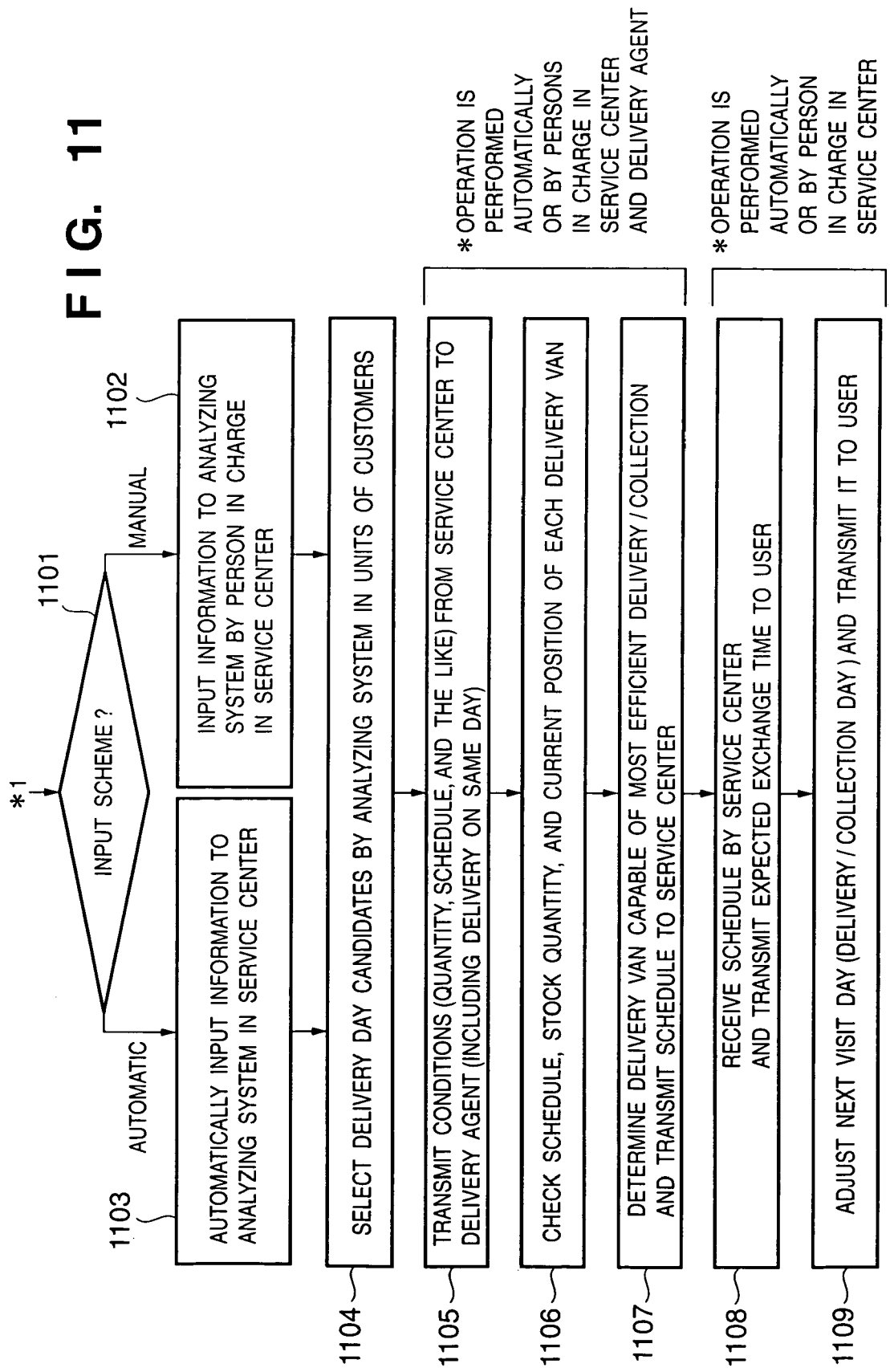

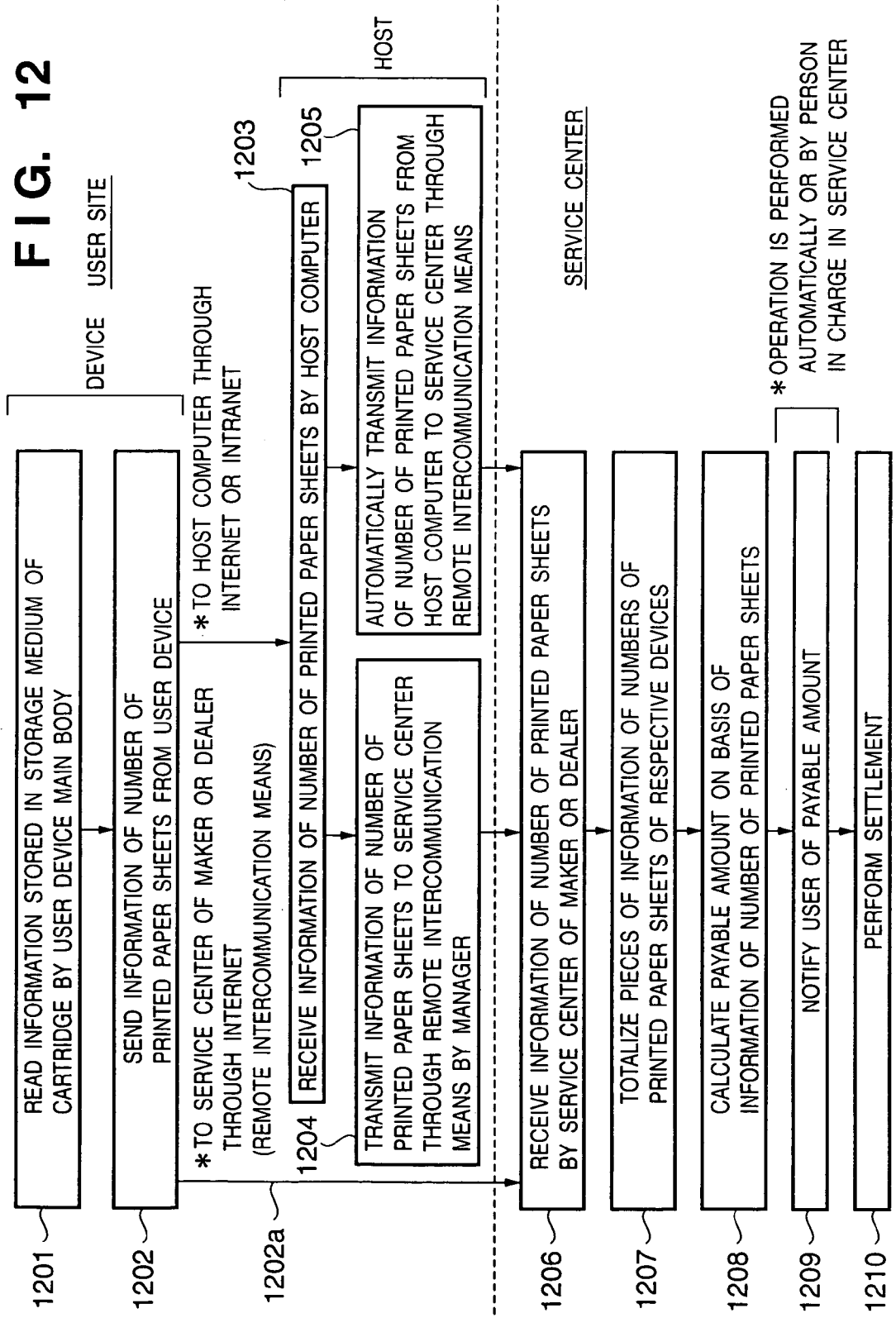

FIG. 13

! IT IS TIME TO EXCHANGE CARTRIDGE

TONER IN YOUR MACHINE NAME IS RUNNING SHORT
(* OR _____ % REMAINS)

EXPECTED EXCHANGE TIME IS
\* \* \* YEAR \* \* MONTH \* \* DAY — \* \* \* YEAR \* \* MONTH \* \* DAY

MAY WE DELIVER RESERVE CARTRIDGE ?

[ YES ]    [ NO ]

\* IF YOU SELECT "YES", ADJUSTMENT OF VISIT DAY
(DELIVERY DAY) WILL BE DONE ON NEXT WINDOW

IF "NO", WINDOW IS RE-DISPLAYED AFTER PREDETERMINED TIME

IF "YES", WINDOW IS SWITCHED TO ADJUSTMENT WINDOW

FIG. 14

WE ADJUST VISIT DAY (DELIVERY DAY)

EXPECTED EXCHANGE TIME IS:
＊＊＊＊YEAR＊＊MONTH＊＊DAY — ＊＊＊＊YEAR＊＊MONTH＊-＊DAY

PLEASE INPUT CONVENIENT DAYS FOR YOU

⟨FIRST CHOICE⟩

☐YEAR ☐MONTH ☐DAY ~ ☐MONTH ☐DAY

TIME: ☐ TO ☐ O'CLOCK

⟨SECOND CHOICE⟩

☐YEAR ☐MONTH ☐DAY ~ ☐MONTH ☐DAY

TIME: ☐ TO ☐ O'CLOCK

[TRANSMIT]  [CANCEL]

IF "CANCEL" IS CLICKED, WINDOW RETURNS TO TONER LOW NOTIFICATION WINDOW

IF "TRANSMIT" IS CLICKED, WINDOW IS SWITCHED TO DELIVERY DAY NOTIFICATION WINDOW

FROM DELIVERY DAY ADJUSTMENT WINDOW

IF "CHANGE" IS CLICKED, WINDOW IS SWITCHED TO DELIVERY DAY ADJUSTMENT WINDOW

FIG. 16

| INVOICE

CHARGE FOR **YEARMONTH IS

NUMBER OF DEVICES COVERED BY AGREEMENT: ××PIECES
TOTAL NUMBER OF PRINTED PAPER SHEETS: △△LEAVES
BASIC CHARGE: □□YEN
UNIT PRICE PER PRINT: YEN
*****DISCOUNT: ××× (YEN/%)

PAYABLE AMOUNT: ○○○○YEN

○ IF YOU APPROVE, PLEASE CLICK ON "YES"
● IF THERE IS ANY QUESTION, PLEASE CLICK ON "NO".
PERSONNEL IN OUR SERVICE CENTER WILL RESPOND.

YES   NO

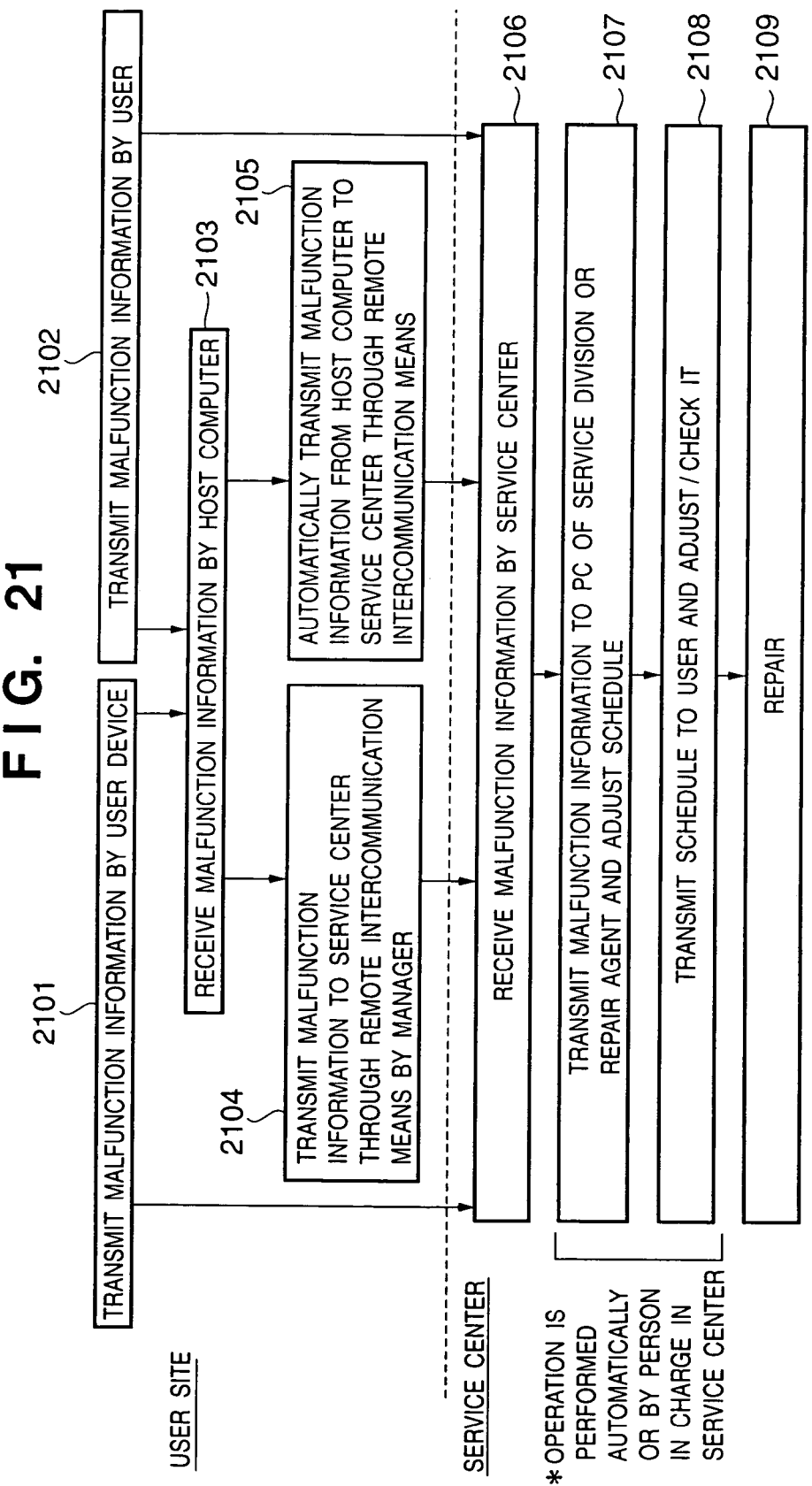

FIG. 22A

WE WILL ADJUST VISIT DAY FOR REPAIR

PLEASE INPUT CONVENIENT DAYS FOR YOU

⟨FIRST CHOICE⟩

[ ] YEAR [ ] MONTH [ ] DAY ~ [ ] MONTH [ ] DAY

TIME: [ ] TO [ ] O'CLOCK

⟨SECOND CHOICE⟩

[ ] YEAR [ ] MONTH [ ] DAY ~ [ ] MONTH [ ] DAY

TIME: [ ] TO [ ] O'CLOCK

[TRANSMIT]   [CANCEL]

FIG. 22B

MALFUNCTION SITUATION NOTIFICATION SHEET

PLEASE SELECT SYMPTOM OF YOUR MACHINE

◎ PAPER JAMS CONTINUE TO OCCUR
◎ IMAGE IS DIRTY
◎ NO IMAGE IS PRINTED
  ‧‧‧‧‧‧

[TRANSMIT]   [CANCEL]

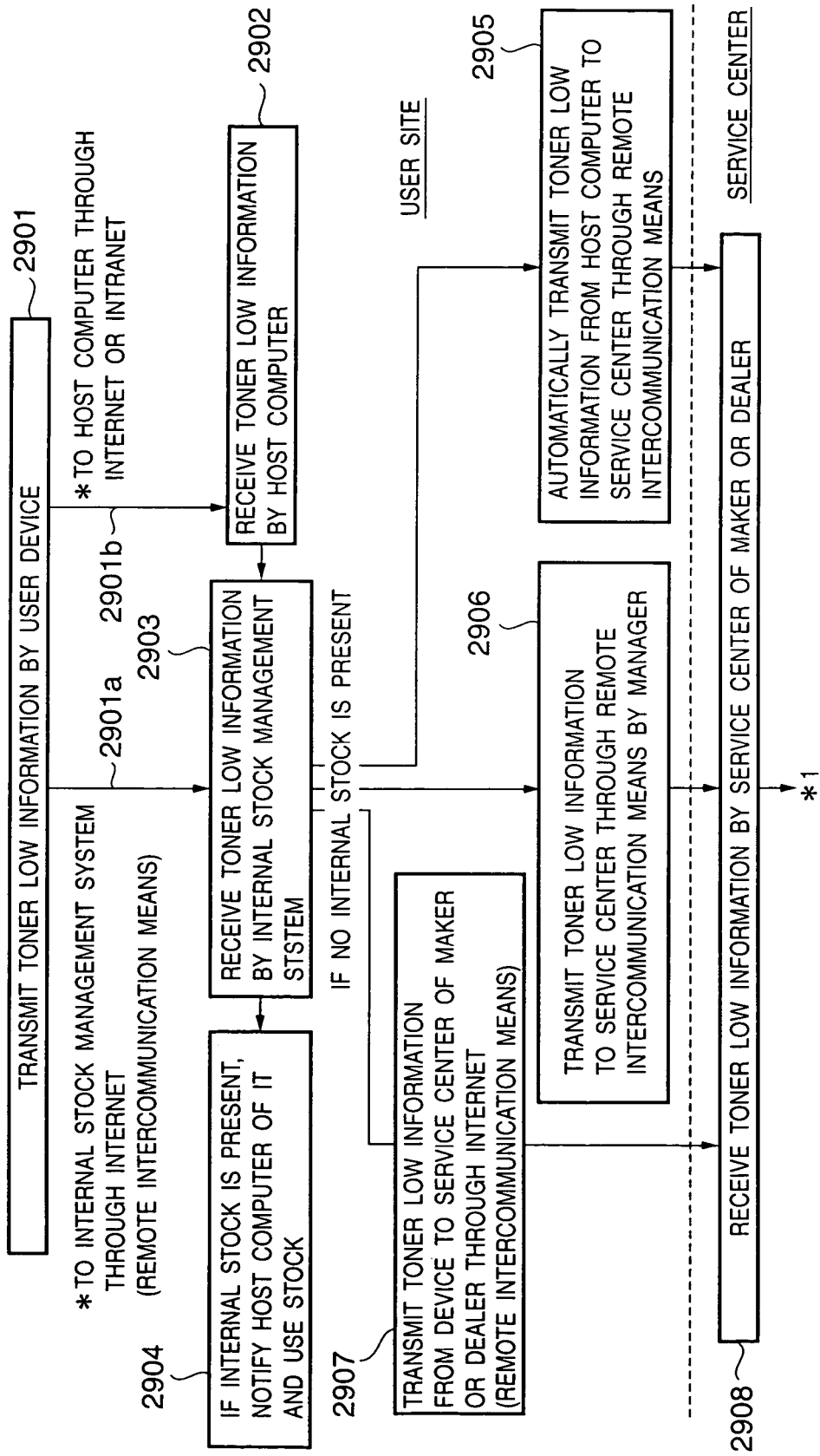

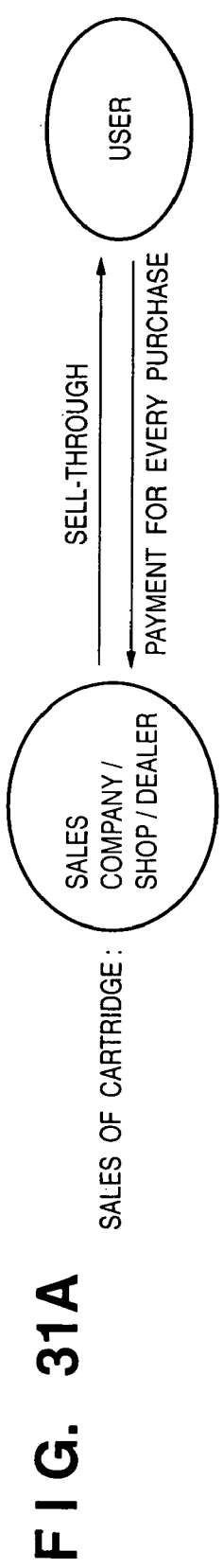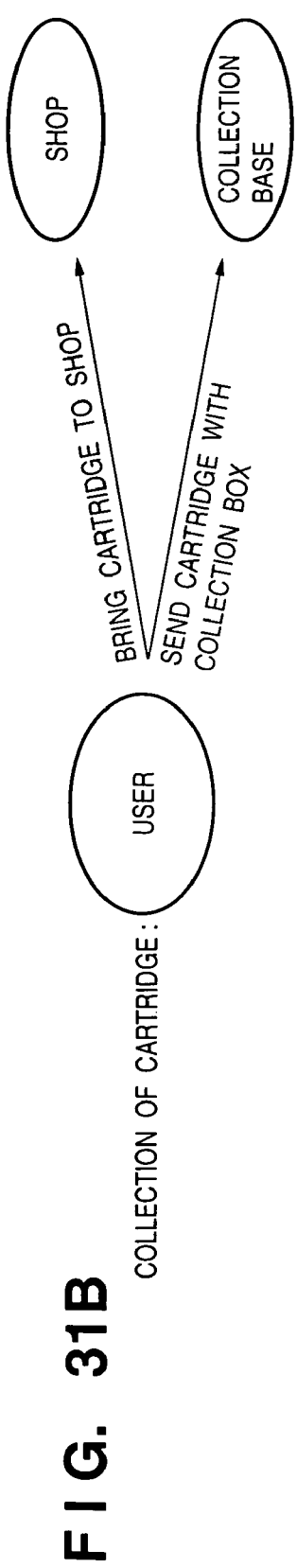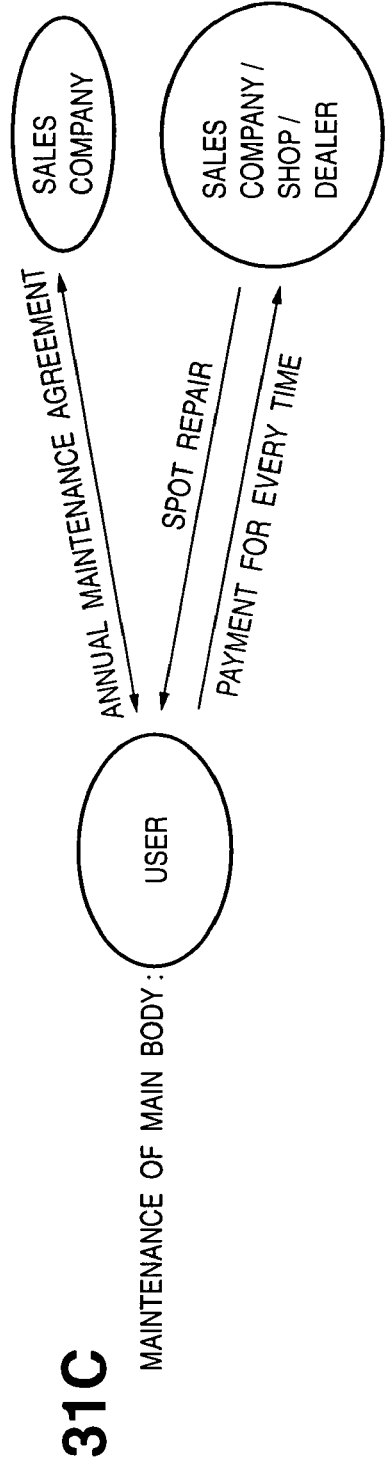

FIG. 33

○○ KK  
DATE: DECEMBER 12, 2001  
CUSTOMER ID: ×××××

IF YOU WANT AGREEMENT FOR PRINTER, PLEASE TURN ON BOXES ON LIST OF PRINTERS USED BELOW AND CLICK ON "NEXT"

| | MODEL FOR AGREEMENT | AGREEMENT CONTENTS | |
|---|---|---|---|
| ☐ | LBP-A1 | BASIC MAINTENANCE AGREEMENT | DETAILS |
| ☑ | LBP-A2 | SPOT MAINTENANCE AGREEMENT | DETAILS |
| ☐ | LBP-B1 | COMPREHENSIVE MAINTENANCE AGREEMENT | DETAILS |
| ☐ | LBP-B2 | COMPREHENSIVE MAINTENANCE AGREEMENT | DETAILS |
| ☐ | LBP-B3 | SPOT MAINTENANCE AGREEMENT | DETAILS |

CANCEL   NEXT

FIG. 34

| PRINTER FOR AGREEMENT 3401 | CARTRIDGE ID 3402 | AGREEMENT CONDITION 3403 | NUMBER OF PRINTS 3404 | UNIT PRICE (YEN / PRINT) 3405 | TOTAL AMOUNT (YEN) 3406 | AGREEMENT PERIOD 3407 |
|---|---|---|---|---|---|---|
| LBP-A1 | AAAA | BASIC MAINTENANCE AGREEMENT | 50 LEAVES | 13 YEN | 650 YEN | 2001/01/01~2001/12/31 |
| LBP-A2 | BBBB | SPOT MAINTENANCE AGREEMENT | 105 LEAVES | 10 YEN | 1050 YEN | 2001/07/01~2001/12/31 |
| LBP-B1 | CCCC | COMPREHENSIVE MAINTENANCE AGREEMENT | 250 LEAVES | 14 YEN | 3500 YEN | 2001/01/01~2002/06/30 |
| LBP-B2 | DDDD | COMPREHENSIVE MAINTENANCE AGREEMENT | 400 LEAVES | 14 YEN | 5600 YEN | 2001/01/01~2002/06/30 |
| LBP-B3 | EEEE | SPOT MAINTENANCE AGREEMENT | 500 LEAVES | 9 YEN | 4500 YEN | 2001/01/01~2001/12/30 |

FIG. 36A

| MAINTENANCE AGREEMENT SYSTEM | CHARGE FOR USE OF CARTRIDGE | CHARGE FOR REPAIR *1 |
|---|---|---|
| SPOT MAINTENANCE AGREEMENT | INCLUDED | PAY EXPENSE FOR EACH REPAIR |
| BASIC MAINTENANCE AGREEMENT | INCLUDED | INCLUDED / UPPER LIMIT AMOUNT ACCORDING TO AGREEMENT PERIOD IS SET FOR EACH MODEL *2 |
| COMPREHENSIVE MAINTENANCE AGREEMENT | INCLUDED | INCLUDED / NO PARTICULAR UPPER LIMIT AMOUNT IS SET, AND ANY REPAIR IS DONE FREE |

*1) CHARGE FOR REPAIR INCLUDES ALL EXPENSES FOR REPAIR, INCLUDING CHARGES FOR DISPATCH, REPAIR, AND COMPONENTS
*2) UPPER LIMIT AMOUNT FOR EACH MODEL IS SHOWN IN TABLE BELOW

FIG. 36B

| MODEL | UPPER LIMIT AMOUNT (FOR SIX MONTHS) |
|---|---|
| LBP-A | ¥20,000 |
| LBP-B | ¥30,000 |
| LBP-C | ¥15,000 |

FIG. 37

| MODEL | UNIT PRICE PER PRINT FOR AGREEMENT CONTENTS | | |
|---|---|---|---|
| | SPOT MAINTENANCE AGREEMENT | BASIC MAINTENANCE AGREEMENT | COMPREHENSIVE MAINTENANCE AGREEMENT |
| LBP-A | 10 YEN | 13 YEN | 15 YEN |
| LBP-B | 9 YEN | 12 YEN | 14 YEN |
| LBP-C | 12 YEN | 15 YEN | 16 YEN |
| LBP-D | 7 YEN | 9 YEN | 10 YEN |

| PRINTER FOR AGREEMENT 4101 | CARTRIDGE ID 4102 | AGREEMENT CONDITION 4103 | NUMBER OF PRINTS 4104 | UNIT PRICE (YEN/PRINT) 4105 | TOTAL AMOUNT (YEN) 4106 | AGREEMENT PERIOD 4107 |
|---|---|---|---|---|---|---|
| LBP-A1 | AAAA | BASIC MAINTENANCE AGREEMENT | 50 LEAVES | 13 YEN | 650 YEN | 2001/01/01~2001/12/31 |
| LBP-A2 | BBBB | SPOT MAINTENANCE AGREEMENT | 105 LEAVES | 10 YEN | 1050 YEN | 2001/07/01~2001/12/31 |
| LBP-B1 | CCCC | COMPREHENSIVE MAINTENANCE AGREEMENT | 250 LEAVES | 14 YEN | 3500 YEN | 2001/01/01~2002/06/30 |
| LBP-B2 | DDDD | COMPREHENSIVE MAINTENANCE AGREEMENT | 400 LEAVES | 14 YEN | 5600 YEN | 2001/01/01~2002/06/30 |
| LBP-B3 | EEEE | SPOT MAINTENANCE AGREEMENT | 500 LEAVES | 9 YEN | 4500 YEN | 2001/01/01~2001/12/31 |
| LBP-A2 | BBBB | BASIC MAINTENANCE AGREEMENT | 0 LEAVES | 13 YEN | 0 | 2002/01/01~2002/06/30 |

METHOD, SYSTEM AND MEDIUM FOR REMOTELY MANAGING PLURAL IMAGE FORMING APPARATUSES AND PLURAL TYPES OF MAINTENANCE AGREEMENTS RELATING TO THE APPARATUSES

FIELD OF THE INVENTION

The present invention relates to expendable charge method and system for a device such as a printer which uses expendables such as a cartridge filled with toner.

BACKGROUND OF THE INVENTION

Some electrophotographic devices such printers or facsimile apparatuses which consume a print agent and, more particularly, toner as a print agent use the cartridge scheme, in which a cartridge is filled with toner, and the whole cartridge is exchanged when the toner runs out. As advantages of this scheme, the cartridge can be easily exchanged, and when the cartridge has another expendable component such as a transfer body, the component can also be exchanged together with the cartridge, resulting in very easy maintenance. In addition, when the cartridge serves as some of the components of the device, the prime manufacturing cost of the device main body can be reduced.

The cartridge (to be sometimes abbreviated as a CRG hereinafter) is normally sold from the maker of a device that uses the cartridge to a device user through a sales channel. A used cartridge is also collected by the device maker.

FIG. 31A is a view showing a cartridge sales form. A user pays a shop for a cartridge in a sell-through form and manages the bought cartridge by himself/herself. In this sell-through form, the cartridge (CRG) is completely bought by the user.

FIG. 31B is a view showing how to collect a used cartridge conventionally. As shown in FIG. 31B, generally, the user brings the used cartridge to the shop or puts the used cartridge in a collection box and sends it to a collection base for collection.

FIG. 31C shows a conventional maintenance form for a device main body. Since both the device main body and expendables such as a cartridge are sold in the sell-through form, the user must maintain the device by himself/herself or request for repair (spot repair), as needed, unless he/she has a maintenance agreement with the shop.

In addition to such a sell-through form, there is also a charge scheme called "click charge". This scheme is used for, e.g., a copying machine. In this scheme, a counter for counting the number of copies is prepared in a copying machine, a technician goes to the user site periodically or in accordance with a request from the user, maintains the copying machine, and simultaneously, reads the counter value, and records the difference between the read value and the precedingly checked counter value as the number of copies. The user is billed the total value of an amount corresponding to the number of copies and the maintenance cost by mail or the like.

However, in the cartridge sell-through scheme as for a printer, since the time when the toner runs out (toner out) cannot be predicted, and the exchange time is not constant, the budget necessary for maintenance of the device and purchase of expendables is difficult. For example, cost is incurred every time repair or cartridge exchange is done. In addition, it is hard to accurately estimate the cost because the number of printed paper sheets and printer operation state cannot be grasped In addition, a printer or the like must always be usable during business hours. For this purpose, spare cartridges must always be ensured so that the cartridge can be exchanged immediately when toner out occurs. However, it is costly to always make a space for stock of cartridges.

On the other hand, in the click charge scheme used for a copying machine or the like, the user can know the number of copies, and a budget can be easily formed. However, since an engineer must periodically or irregularly go to the user site, the maintenance cost is high. In addition, as in the cartridge sell-through scheme, the user himself/herself must supply toner to immediately cope with toner out or the like, and reserve toner must always be prepared for this purpose.

Since a copying machine or the like uses the scheme of supplying toner, toner is not wasted, and the click charge scheme can be implemented. However, when the click charge scheme is directly applied to a cartridge-type device, toner that remains in the cartridge and is discarded is wasteful, resulting in an increase in prime cost. For this reason, the click charge scheme cannot be applied to general devices such as a printer.

In the copying machine which does not employ the cartridge scheme, the expendable components are degraded according to the number of copies and a periodical maintenance is required. For this reason, the click charge scheme is commonly applied. However, in a printer using a process cartridge (to be simply referred to as a cartridge hereinafter) which accommodates toner, developing unit, and the like, many expendables or components that readily malfunction due to degradation are accommodated in the cartridge. Hence, particularly in the case when the apparatus itself has been used just for a few years, the user rarely requests a serviceman or the like for repair, and normally, periodical maintenance and check are not executed. Additionally, even when the number of printed paper sheets is large, the cost necessary for maintenance is not always high. Normally, when a maintenance agreement is made for a cartridge-type printer, the maintenance service charge is constant independently of the number of output paper sheets.

On the other hand, the cartridge scheme for a printer is advantageous in maintenance/check because supply of expendables and exchange of components can be easily done at once. However, used cartridges pose an environmental problem. The makers are trying to collect, decompose, and recycle used cartridges. To solve the environmental problem, the used cartridge collection ratio must be improved.

Many printers output a toner out warning before they become unprintable. However, even after such a warning, several ten to several hundred paper sheets can be printed. Few users exchange the cartridge immediately after the warning. Hence, when the toner runs short, the user is forced to reprint due to print blur or detach the cartridge, and shake and then attach it again.

In recent years, composite machines which integrate the copy function, scanner function, and printer function are becoming popular. Such devices are classified into neither a copying machine nor a printer. Devices mainly serving as a copying machine and employing the cartridge scheme have also been put on sale. For such a device, although the cartridge is employed, maintenance is not unnecessary, unlike a printer device used for general home use, because the number of components increases as the device has multiple functions. Additionally, for a high-speed output image forming apparatus, maintenance is necessary although it is a composite machine employing the cartridge scheme. Especially, when the apparatus is continuously used for a certain period, maintenance is required because of, e.g., exhaustion of components. The conventional maintenance agreement cannot sufficiently cope with these situations. For example, an agreement for the maintenance service may be made by a charge system (click charge) corresponding to the number of printed paper sheets, and the charge for a cartridge may be independently paid. However, this considerably complicates payment and is also inconvenient for the user and the serviceman who accepts payments.

SUMMARY OF THE INVENTION

The present invention has been made in consideration of the above prior art, and has as its object to provide expendable charge system and method capable of accurately grasping the cost of expendables by charging for the use amount of expendables in a device, and also capable of grasping the consumption amount of expendables for all devices present at a user site and charging for the consumption amount.

It is another object of the present invention to provide charge system and method capable of improving the convenience when toner runs short and improving the cartridge collection ratio while maintaining the convenience in a printer using a cartridge.

It is still another object of the present invention to provide a mechanism capable of offering, to a user, a more flexible and convenient maintenance agreement according to the use state of a user's image forming apparatus or the model of the image forming apparatus.

It is still another object of the present invention to provide a mechanism which allows a user to select an appropriate maintenance agreement from a plurality of agreements even when the user changes the agreement contents.

In order to achieve the above objects, the present invention comprises the following means.

There is provided an information processing apparatus for managing maintenance agreement information corresponding to an identifier for specifying an image forming apparatus, characterized by comprising:

a memory for storing a variety of charge amounts per paper sheet printed and output by the image forming apparatus in accordance with whether the maintenance agreement information includes maintenance information by a serviceman of the image forming apparatus; and a calculation section for calculating a payable amount on the basis of the charge amount stored in the memory.

More preferably, the information processing apparatus is characterized in that the memory stores a first charge amount per printed and output paper sheet including maintenance by the serviceman and a second charge amount without the maintenance, the first charge amount being added with a maintenance cost, unlike the second charge amount.

More preferably, the information processing apparatus is characterized in that the image forming apparatus and the information processing apparatus are capable of two-way communication through a first network.

More preferably, the information processing apparatus is characterized by further comprising a communication section for generating and transmitting window information for changing the maintenance agreement information stored in the memory.

More preferably, the information processing apparatus is characterized in that the communication section receives use situation information of the image forming apparatus and notifies a user of agreement information corresponding to the received use situation information.

More preferably, the information processing apparatus is characterized by further comprising a recognition section for recognizing the total number of printed paper sheets of the image forming apparatus in a predetermined period, and in that the calculation section calculates the payable amount in accordance with the total number of printed paper sheets recognized by the recognition section and the maintenance agreement information corresponding to the image forming apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a flow chart showing a processing procedure in the service center which receives a toner low signal in the first embodiment;

FIG. 12 is a system flow chart showing transmission and processing of charge information in the first embodiment;

FIG. 13 is a view showing a UI window for prompting the user to exchange the cartridge;

FIG. 14 is a view showing a UI window for adjusting the cartridge exchange day and time;

FIG. 16 is a view showing a UI window for notifying the user of the charge amount;

FIG. 21 is a system flow chart showing processing from transmission of malfunction information from the user to repair;

FIG. 22A is a view showing a window displayed when the service center notifies the user site of a schedule in step 2108;

FIG. 22B is a view showing a window for checking the contents of a malfunction in advance;

FIG. 30 is a system flow chart showing a procedure of transmitting and receiving a toner low signal in the fourth embodiment;

FIG. 31A is a view showing a cartridge sales form;

FIG. 31B is a view showing how a used cartridge is collected conventionally;

FIG. 31C is a view showing a conventional maintenance form for a device main body;

FIG. 33 is a view showing a UI window representing the agreement situation for each user in the fifth embodiment;

FIG. 34 is a view showing a UI window representing the agreement situation for each user or contents stored in the database server in the fifth embodiment;

FIGS. 36A and 36B are views showing a UI window for checking the agreement contents in the fifth embodiment;

FIG. 37 is a view showing a UI window for checking the agreement contents in the fifth embodiment;

FIG. 41 is a view showing a UI window representing the agreement situation for each user or contents stored in the database server in the fifth embodiment;

DETAILED DESCRIPTION OF THE PREFERRED EMBODIMENTS

The characteristic features of cartridge management systems according to the embodiments of the present invention will be described first before their details.

(1) A charge system (printing count charge system) according to the number of printed paper sheets has been implemented for a cartridge type printer. This provides the following effects.

Although the charge is paid at once in the sell-through form, the user can distribute payment of print cost.

The number of used sheets or the amount necessary for maintenance can be grasped in units of printers. For this reason, when printers are put together in units of departments/divisions, the amount necessary for maintenance can easily be grasped in units of departments/divisions.

Not only the printer but also a plurality of devices incorporated in the cartridge management system can be systematically managed. For this reason, services can be offered in units of users such that, for example, a discount (volume discount) is allowed for a user who consumes an enormous number of supplies.

Since the system is automated using a network, system management incurs no personnel expenses. The conventional click-charge scheme requires labor, and visits to the user site to check the counter increases the cost by itself.

Since the state of the printer can be grasped through the network, the number of user visits by a serviceman can be minimized.

Since the user can be charged for use of the printer as long as he/she uses it, earnings for the seller become stable. This also improves the service quality for the user.

(2) Delivery and collection of a cartridge are systemized using a network. This provides the following effects.

Since delivery and collection are arranged for on the network, labor for the arrangement can be reduced, resulting in a decrease in cost.

By combining with maintenance, a system with a large added value can be built.

Since management is completely done at the service center, the user only need print.

A used cartridge can be more reliably collected.

Since the state of the printer is grasped by the service center, the downtime can be shortened by quick response to exhaustion of supplies or a repair request.

(3) A cartridge incorporates a nonvolatile storage medium to store arbitrary data. This provides the following effects.

Accurate data can be collected for each cartridge.

For this reason, a delivery/collection schedule can be more correctly made.

Since toner out can be accurately predicted, toner can be used up as much as possible without any toner out. This contributes to resource savings and cost reductions.

Cartridge management systems having the above characteristic features will be described below.

[First Embodiment]

<System Configuration>

Figure 2:
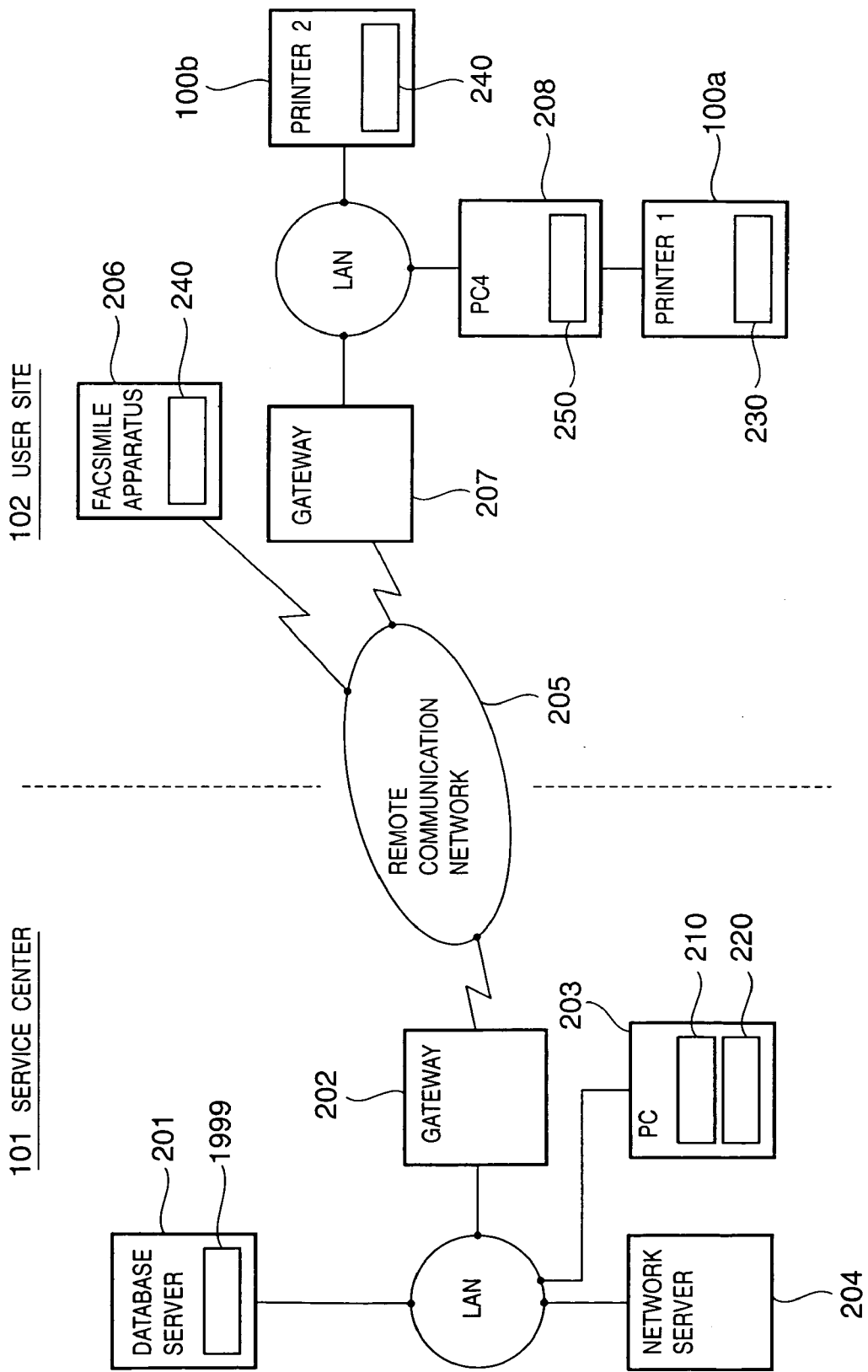
FIG. 2 is a view showing the arrangements of a user site and service center according to the first embodiment.

FIG. 2 is a view showing the configuration of a cartridge management system. This system has the service center and user site of a device maker, which are connected through a remote communication network 205, e.g., a telephone line such as a public line or leased line or the Internet. Normally, a plurality of user sites are connected to one service center, and a plurality of service centers can also be present. However, only one service center and one user site will be described here. In this embodiment, the user site especially means a user who has made such an agreement with a device maker or shop that a service and charging are executed by the printing count charge scheme of this system. The service center is prepared by the device maker or shop that has made the agreement with the user so as to offer the maintenance and cartridge delivery/collection services to the user or charge the user.

In a service center 101, a gateway 202 is connected to the remote communication network 205. A database server 201 for managing a database (to be described later), a personal computer (PC) 203, and a network server 204 for managing a LAN are connected to the gateway 202 through the LAN. The gateway here also includes a router. A database 1999 (to be described later) is constructed in the database server 201. The PC 203 is used as a window terminal for executing processing in the service center 101. The PC 203 serving as a window terminal executes a service module 210 for executing service-center-side processing shown in FIGS. 10 to 12 (to be described later) and an analyzing system (analysis module) 220 for predicting toner out. The window terminal 203 also displays a user interface window or the like. The arrangement of the service center is merely an example and only need have a mechanism for receiving data from the remote communication network 205 by the PC 203 and a mechanism for accessing the database 1999 from the PC 203.

At the user site 102, a gateway 207 is connected to the remote communication network 205. A PC 208 and printer 100b are connected to the gateway 207 through a LAN. The PC 208 has a local printer 100a. The printer 100b and PC 208 can access the remote communication network 205 through the LAN. The user site also has a facsimile apparatus 206 connected to the remote communication network 205 through a line different from that of the gateway 207. The PC 208 is used as a window terminal for executing processing at the user site. The PC 208 serving as a window terminal executes a user module 250 for performing user-site-side processing shown in FIGS. 11 and 12 (to be described later). A device such as the facsimile apparatus 206 or printer 100b which can directly access the remote communication network 205 includes a device module 240 for transmitting data such as a toner low signal or the number of printed paper sheets shown in FIGS. 10 or 12 (to be described later) from the device to the service center. Also, a device module 240 has the same function as of device module 230 (to be described later). A device such as the printer 100a connected to the remote communication network 205 through a host includes a device module 230 for transmitting data such as a toner low signal or the number of printed paper sheets shown in FIGS. 10 or 12 from the device to the host. In this case, a transfer module for transmitting a signal received from a device is included in the host.

As described above, each device at the user site 102 and the service center 101 can be connected always or as needed to communicate with each other.

"User site" or "service center" will indicate the corresponding window terminal hereinafter. In this example, the window terminals are computers connected to the LANs of the corresponding sites. However, the window terminals may be connected through the remote communication network 205 to form a network. For all the printer and facsimile apparatus at the user site 102, the user is charged by the printing count charge scheme.

(Computer)

Figure 3:
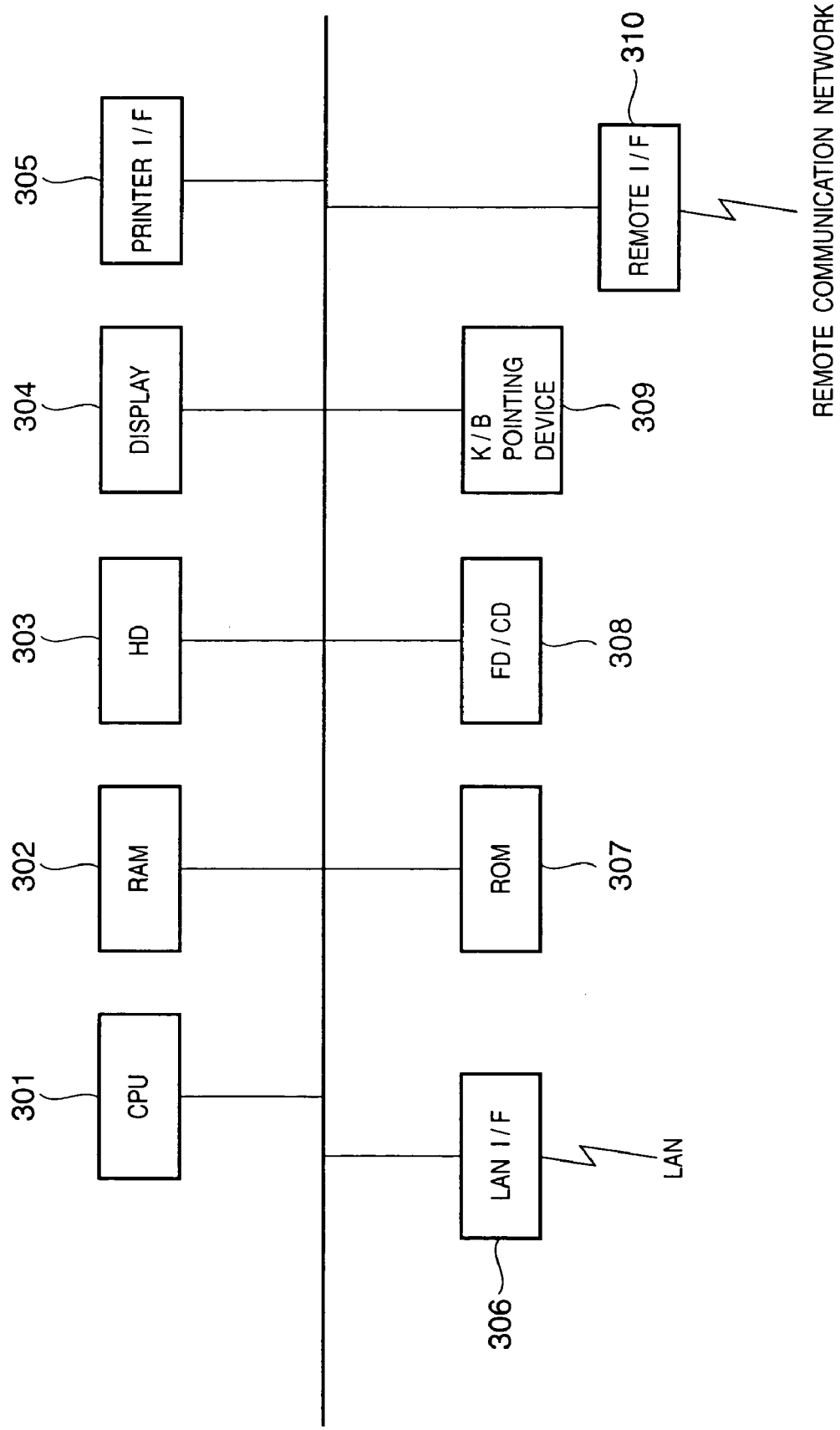
FIG. 3 is a block diagram of a personal computer.

FIG. 3 is a block diagram of the personal computer. The PC implements various control operations or procedures (e.g., service module and user module) (to be described later) by executing, by a CPU 301, a program written in a ROM 307 or an OS or application program written in a RAM 302. An HD 303 and FD/CD (floppy disk drive or CD drive) 308 are file storage media which store program files and data files. Especially as for the FD/CD 308, the storage medium can be exchanged, and data or program can be supplied from the medium to the PC. A keyboard/pointing device 309 is an input device used by the user to input and implement a user interface or the like (to be described later) together with a display 304. A LAN interface 306 is an interface circuit for connecting the PC to the LAN. A printer interface 305 is an interface circuit for locally connecting a printer to the PC. In the example shown in FIG. 2, only the PC 208 uses this interface. A remote interface 310 is a device such as a modem or router for connecting the PC to the remote communication network 205. Referring to FIG. 2, the gateway 202 and gateway 207 use the interface. The remote communication network is not limited to a telephone line. If the remote communication network is not a telephone line (such as cable TV line or wireless communication line), an interface according to the communication network is used. With this arrangement, the computers in the service center and user site are connected to each other.

(Facsimile Apparatus)

Figure 4:
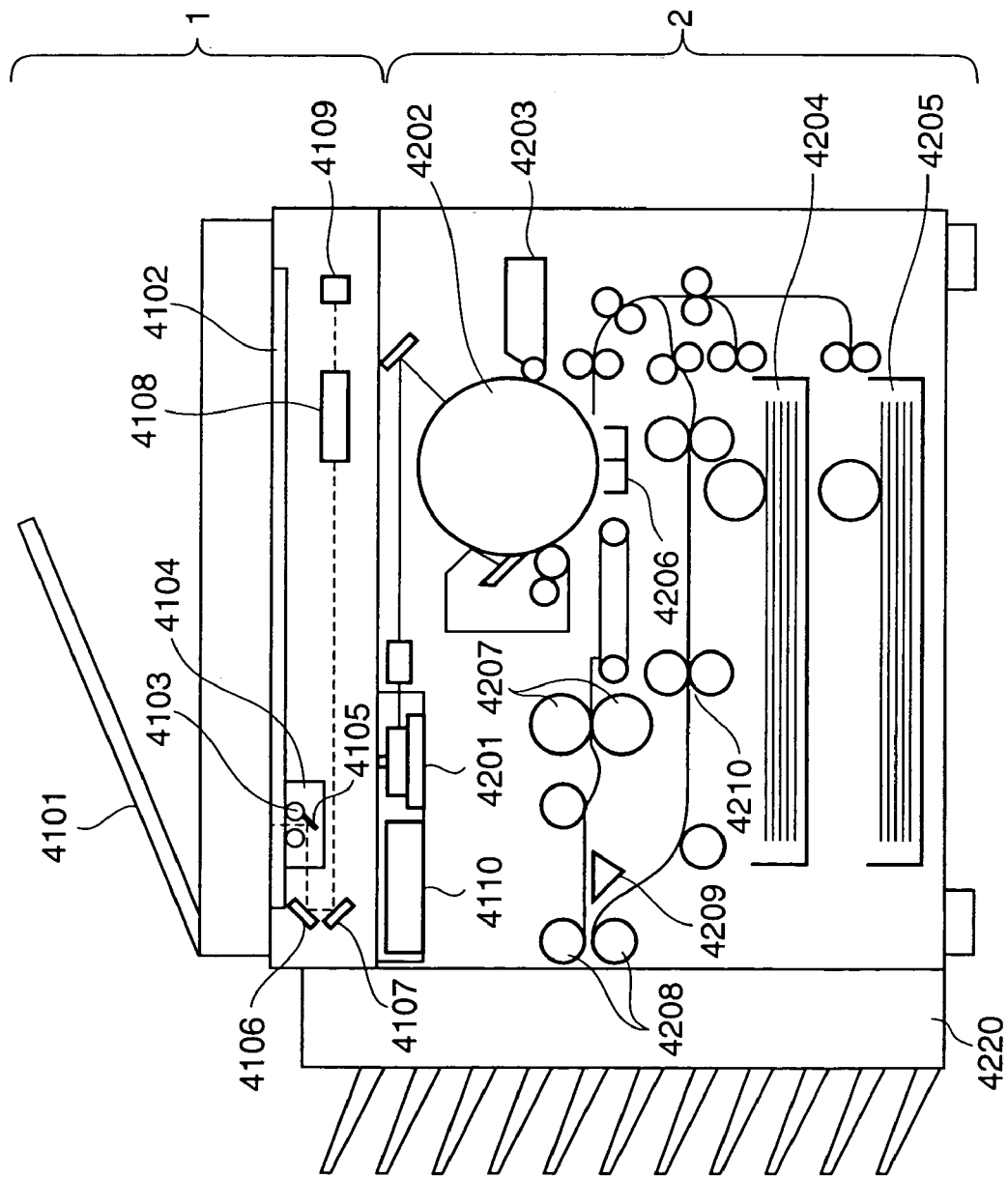
FIG. 4 is a sectional view of a facsimile apparatus.

FIG. 4 is a sectional view showing the arrangement of the facsimile apparatus. Referring to FIG. 4, an original feeding device 4101 of a reader section 1 feeds originals one by one sequentially from the final page onto a platen glass 4102, and after original read operation, discharges the original on the platen glass 4102. When an original is fed onto the platen glass 4102, a lamp 4103 is turned on, and a scanner unit 4104 starts moving to expose and scan the original. Reflected light from the original is guided to a CCD image sensor (to be referred to as a CCD hereinafter) 4109 by mirrors 4105, 4106, and 4107 and a lens 4108. In this way, the image of the scanned original is read by the CCD 4109. The image data output from the CCD 4109 is transferred to an image input/output control section 4110, encoded, and transmitted to a destination on the remote communication network through a line (not shown) connected to the image input/output control section 4110.

When a facsimile signal is received from the remote communication network, the signal is decoded, and a laser light-emitting section 4201 is driven by a laser driver 4221 of a printer section 2 in accordance with the decoded image data to emit a laser beam corresponding to the image data. A photosensitive drum 4202 is irradiated with this laser beam, so a latent image corresponding to the laser beam is formed on the photosensitive drum 4202. A developing agent is applied to the latent image portion of the photosensitive drum 4202 by a developing unit included in a toner cartridge 4203. At a timing synchronized with the start of irradiation of the laser beam, a printing paper sheet is fed from one of cassettes 4204 and 4205 and transferred to a transfer section 4206, and the developing agent sticking to the photosensitive drum 4202 is transferred to the printing paper sheet. The printing paper sheet having the developing agent thereon is conveyed to a fixing section 4207, so the developing agent is fixed to the printing paper sheet by heat and pressure of the fixing section 4207. The printing paper sheet passes through the fixing section 4207 and is discharged by discharge rollers 4208. A sorter 4220 sorts and stores discharged printing paper sheets in bins. If the sort mode is not set, the sorter 4220 stores the printing paper sheets on the uppermost bin. When a double-side printing mode is set, after the printing paper sheet is conveyed to the discharge rollers 4208, the directions of rotation of the discharge rollers 4208 are reversed to guide the printing paper sheet to a re-freed convey path by a flapper 4209. If a multiple printing mode is set, the printing paper sheet is not conveyed to the discharge rollers 4208 but guided to the re-freed convey path by the flapper 4209. The printing paper sheet guided to the re-feed convey path is fed to the transfer section 4206 at the above-described timing.

In this way, the facsimile apparatus 206 realizes image transmission/reception.

Figure 7:
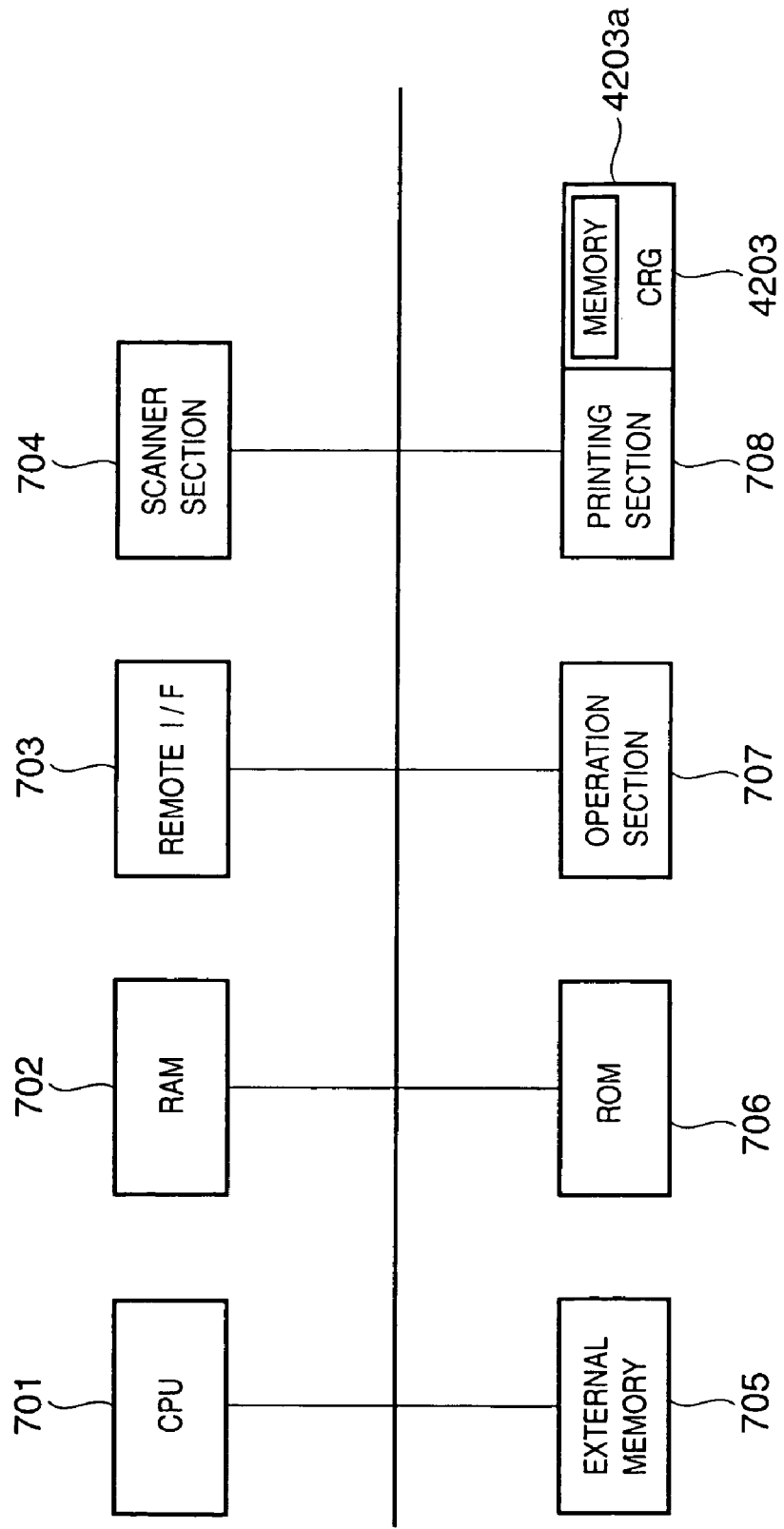
FIG. 7 is a block diagram of the facsimile apparatus.

FIG. 7 shows the control arrangement of the facsimile apparatus 206. Referring to FIG. 7, a ROM 706 stores a control program and font data to drive the printer. When a CPU 701 executes the program including a device module, facsimile reception or printing is implemented. An external memory 705 stores data externally supplied. An operation section 707 is formed from a panel integrated with a display section, which displays system state, and with which the user can make operation input. A remote interface 703 is one of interfaces, such as a modem, for connecting the facsimile apparatus to the remote communication network 205.

A scanner section 704 corresponds to the scanner section 1 shown in FIG. 4, and a printing section 708 corresponds to the printer section 2 shown in FIG. 4. The printing section 708 has the cartridge 4203. The cartridge 4203 has a nonvolatile rewritable memory 4203a. When the cartridge 4203 is attached, the memory 4203a is electrically connected to the control section of the facsimile apparatus 206, so a write/read in/from the CPU 701 or a CPU (not shown) which is locally arranged in the printing section 708 is allowed. Data read out from the memory 4203a can be sent to the LAN or host through the LAN interface 704 or host interface 703. The memory and control section are not always connected at an electrical contact and can be connected in a noncontact state using a radio wave or optical signal. This is simply called electrical connection including the connection forms capable of transmitting/receiving a signal.

(Printer)

Figure 5:
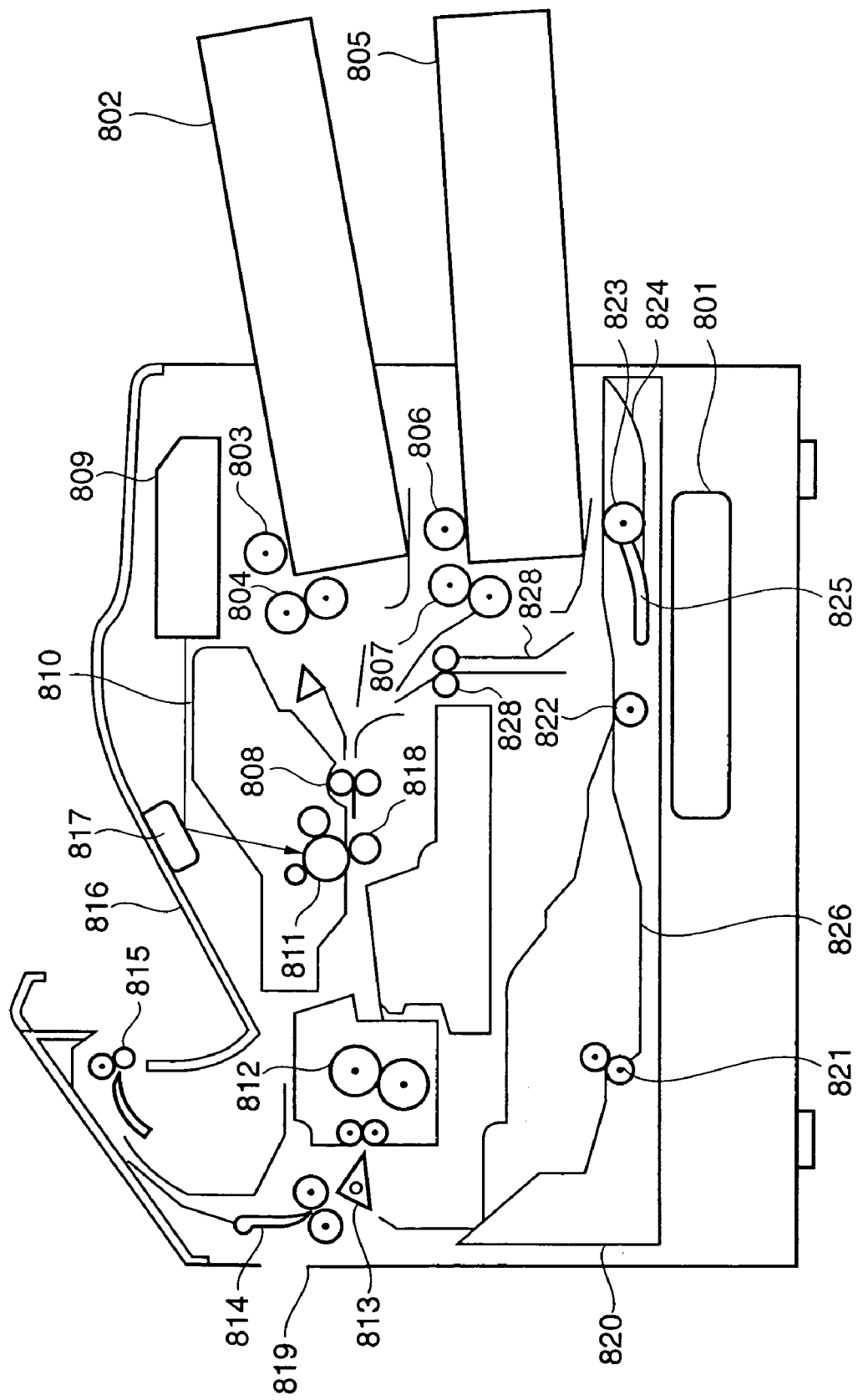
FIG. 5 is a sectional view of a printer.

FIG. 5 is a sectional view of the printer 100a or 100b. Referring to FIG. 5, a printing paper sheet is supplied from a paper cassette 802 or 805 through a paper feed roller 803 or 806 and convey rollers 804 or 807. Which paper cassette is to be used is designated at the time of printing by, e.g., the host computer that uses this printer. The printing paper sheet passes through registration rollers 808 and then under a toner cartridge 810, so a toner image formed on a photosensitive drum 811 is transferred to the paper sheet by charges on a transfer roller 15. The toner image on the photosensitive drum is formed by applying toner to an electrostatic latent image formed by a laser beam emitted from a laser scanner unit 809, reflected by a reflecting mirror 817, and modulated in accordance with the image signal and developing the toner.

The paper sheet having the toner image transferred thereon is heated by a fixing drum 812, so the fused toner is fixed onto the paper sheet. The paper sheet passes through the fixing roller and is directed to a double-side unit 820 or a discharge path by a double-side deflector 813. To discharge the paper sheet faceup, a faceup/facedown selector 814 switches the discharge path. To discharge the paper sheet facedown, it is directed to the right side of FIG. 5 and discharged to a facedown discharge tray 816 by a facedown discharge roller 815 while directing a surface printed immediately before downward. When faceup discharge is selected, the paper sheet is discharged to a tray (not shown) from a faceup discharge port 819 while directing the printed surface upward. The position of the faceup/facedown selector is detected by a sensor and output as a signal.

On the other hand, when double-side printing is selected, the paper sheet that has entered the double-side unit 820 is conveyed by convey rollers 821 and temporarily placed on a double-side tray 826. The paper sheet with one surface printed is conveyed from the double-side tray by a feed roller 822. The conveyed paper sheet is temporarily sent to a double-side path 824. When the trailing edge of the paper sheet almost reaches a double-side convey roller 823, a reversing deflector 825 whose center of pivot almost matches the double-side convey roller 823 is rotated until its left end reaches a path 828. In this state, when the paper sheet is conveyed in the opposite direction (left side of FIG. 5), the left edge of the paper sheet is picked up by the deflector, so the paper sheet is conveyed by a double-side path pickup roller 828 and reaches the registration rollers 808. After that, an image is formed in accordance with the same path/procedure as that of normal printing.

In the double-side printing mode, the printing is controlled by an instruction from the host computer. For example, as a control method for efficient printing, instead of printing and discharging paper sheets one by one, paper sheets are alternately supplied from the paper feed tray and double-side tray to the developing section and alternately printed. More specifically, the order of printing is "obverse surface of first paper sheet"→"obverse surface of second paper sheet"→"reverse surface of first paper sheet"→"obverse surface of third paper sheet"→"reverse surface of second paper sheet"→"obverse surface of fourth paper sheet"→"reverse surface of third paper sheet"→ . . . →"reverse surface of third paper sheet from the last"→"obverse surface of the final paper sheet"→"reverse surface of second paper sheet from the last"→"reverse surface of final paper sheet". That is, the obverse and reverse surfaces are alternately printed except that obverse and reverse surfaces are continuously printed at the start and last. A paper sheet with its obverse surface printed is fed to the double-side unit, and a paper sheet with its reverse surface printed is directly discharged to the discharge tray. That is, when an image is formed on a paper sheet supplied from the paper feed tray, the paper sheet is sent to the double-side tray, and when an image is formed on a paper sheet sent from the double-side tray, the paper sheet is discharged to the discharge tray.

Control for double-side printing is not limited to this. Instead, both surfaces of a paper sheet may be printed and both surfaces of the next paper sheets are then printed, and so on. The control can be switched by an instruction from the host computer.

If a plurality of paper sheets can be stacked on the double-side tray, paper sheets each having one surface printed may be stacked on the double-side tray as many as possible, and then sequentially extracted from the double-side tray to print the other surface. When the host computer can know the capacity of the double-side tray, the control mode can be switched by the host computer.

The entire printer is controlled by a control unit 801 in accordance with an instruction from the host computer. The cartridge 810 is detachable. Information representing whether the cartridge 810 is attached or detached is detected by a sensor and sent to the host computer.

The housing forms a cover that can be freely opened on the cartridge 810. Open/close of the cover can be detected by a sensor. When the cartridge has a memory, a means for writing/reading data in/from the memory is prepared.

The cartridge incorporates a sensor for detecting that the toner in the cartridge has decreased to a predetermined amount. A device such as a printer or facsimile apparatus (to be described later) receives a detection signal from the sensor and outputs a toner low signal. That is, a toner low signal is a signal representing that the toner has reached a predetermined amount. When the cartridge has a remaining toner sensor, the toner low signal is generated upon receiving a detection signal from the cartridge. However, a device using a cartridge without any remaining toner sensor can estimate the approximate remaining amount and generate a toner low signal by updating the number of printed paper sheets and print rate every time printing is performed while setting the initial state at the time of exchange of the cartridge.

Figure 6:
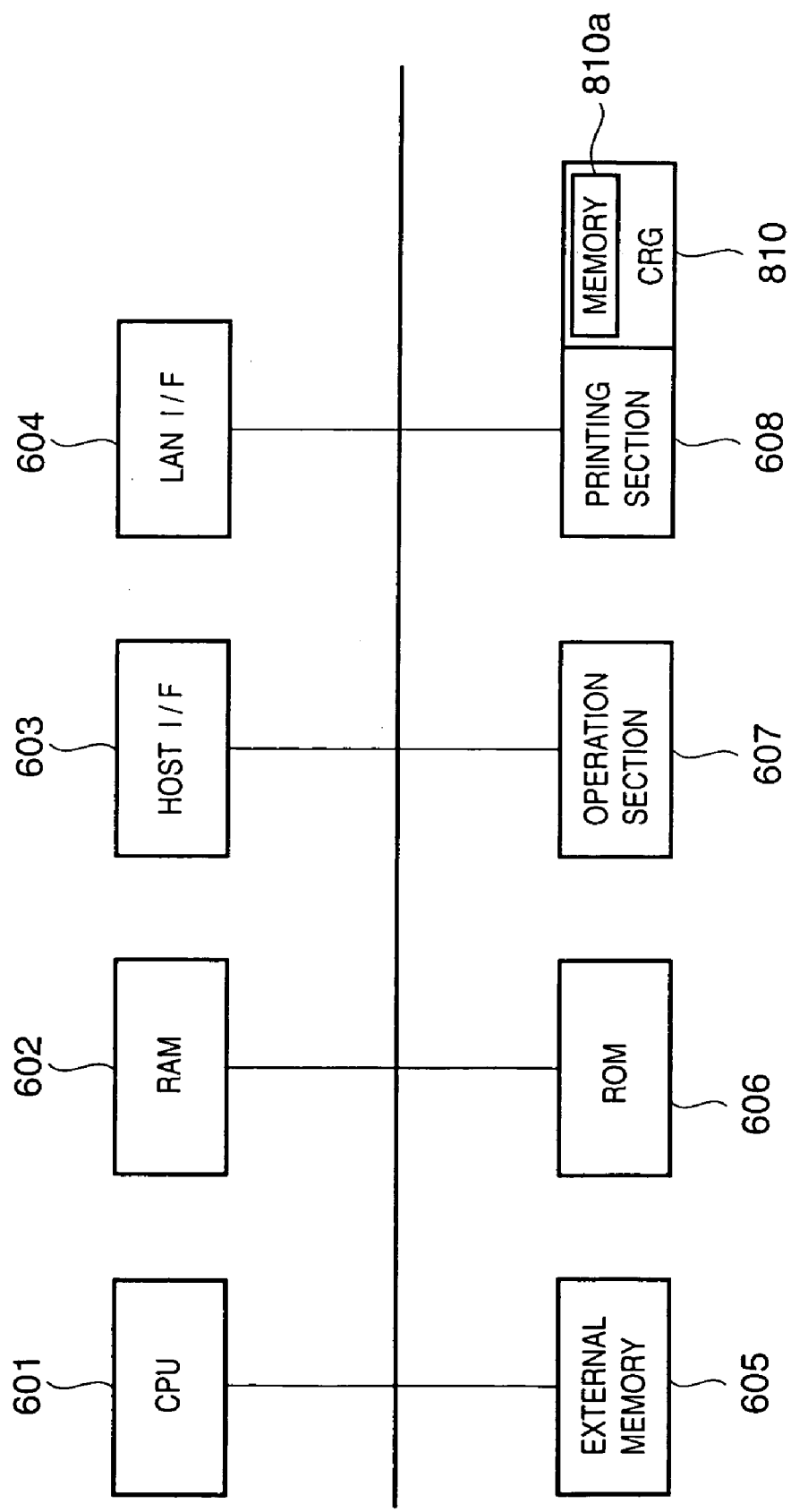
FIG. 6 is a block diagram of the printer.

FIG. 6 shows the control arrangement of the printer 100a or 100b. Referring to FIG. 6, a ROM 606 stores a control program and font data to drive the printer. When a CPU 601 executes the program, printing operation is implemented. An external memory 605 stores data externally supplied. An operation section 607 is formed from a panel integrated with a display section, which displays system state, and with which the user can make easy operation input. A host interface 603 is used to connect the printer as the local printer of a personal computer or the like. Referring to FIG. 2, the printer 100a uses this interface. A LAN interface 604 is used to connect the printer to a LAN. Referring to FIG. 2, the printer 100b is connected to the LAN through this interface.

A printing section 608 corresponds to the mechanism shown in FIG. 5 and has the cartridge 810. The cartridge 810 has a nonvolatile rewritable memory 810a. When the cartridge 810 is attached, the memory 810a is electrically connected to the control section of the printer 100a or 100b, so a write/read in/from the CPU 601 or a CPU (not shown) which is locally arranged in the printing section 608 is allowed. Data read out from the memory 810a can be sent to the LAN or host through the LAN interface 604 or host interface 603.

(Structure of Cartridge)

Figure 8:
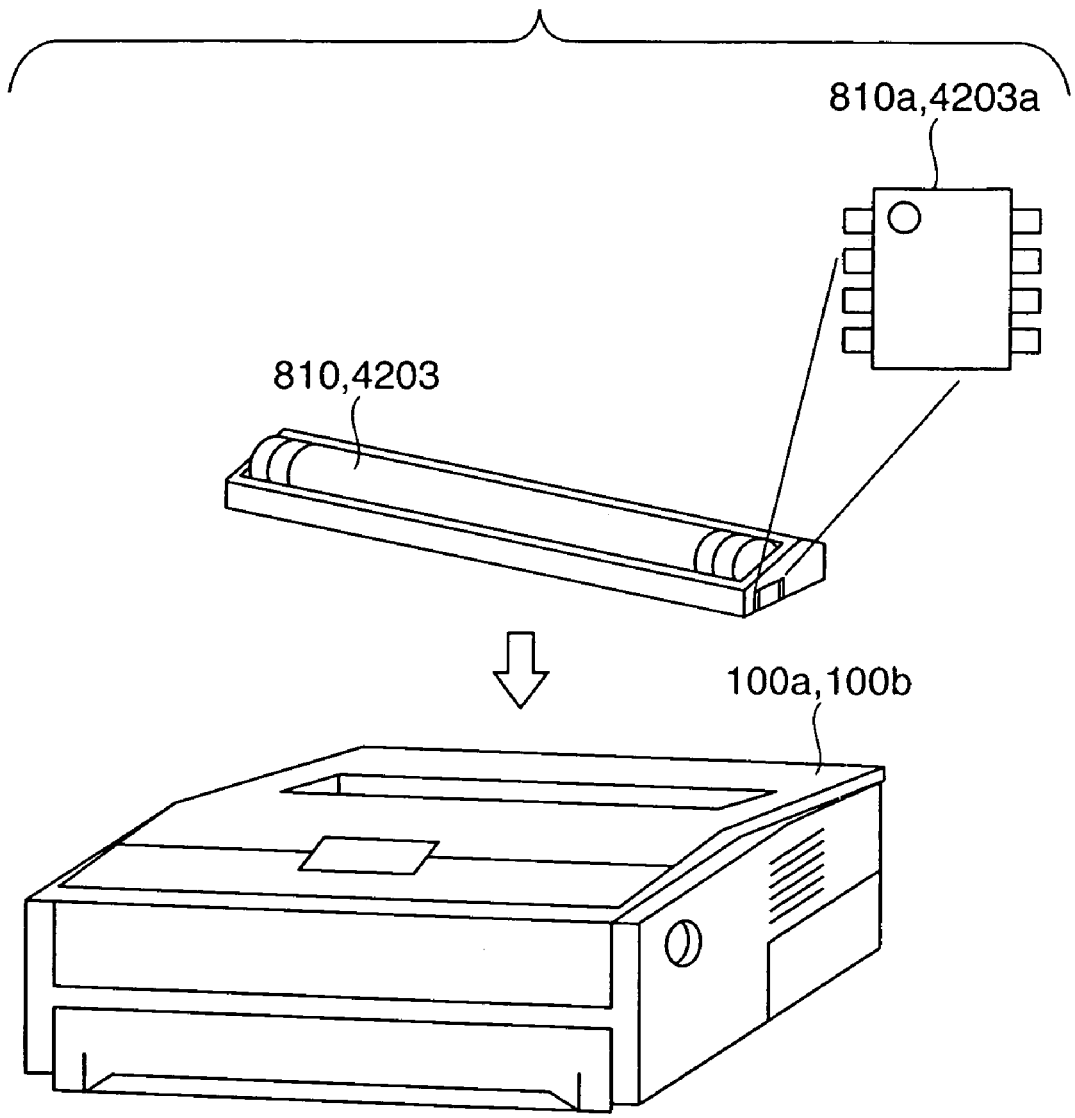
FIG. 8 is a view showing the outer appearance of a toner cartridge having a memory.

FIG. 8 shows the structure of the cartridge 810 or 4203 (to be simply referred to as the cartridge 810 hereinafter). The cartridge 810 is attached to the printer 100a or 100b or facsimile apparatus 206, as shown in FIG. 8. The cartridge 810 has the semiconductor memory 810a (the cartridge 4203 has the memory 4203a) which is electrically connected to the printer main body as the cartridge is attached, so a read/write is allowed. Although not illustrated in FIG. 8, a display panel for displaying data shown in FIG. 9 and, more particularly, the cartridge type ID/serial number, total number of printed paper sheets, and remaining toner amount may be prepared. Since the cartridge type ID/serial number is decided at the time of manufacture and is never changed, it may be recorded on the case of the cartridge by, e.g., printing or atttached seal. The total number of printed paper sheets and remaining toner amount change along with use of the cartridge, so a display panel is necessary to display these values. As a display panel, a compact liquid crystal display panel including a control circuit and backup power supply therefor can be used. When, e.g., a ferroelectric liquid crystal display device capable of leaving the display state even if the power supply is turned off is used, the cartridge only need have the display panel because power can be supplied from the device main body. For a cartridge having a display panel, the display is updated by the device using the cartridge periodically or in synchronism with the remaining toner amount transmission timing (to be described later).

When an identifier such as a cartridge type ID/serial number or information related to the state of the cartridge, such as a remaining toner amount or the number of printed paper sheets is displayed on the cartridge itself, an unused cartridge and a used cartridge can be distinguished from each other in accordance with their outer appearances. This prevents, for example, an error that the operator (user or serviceman) recognizes a used cartridge as a new cartridge and attaches the used cartridge.

Figure 9:
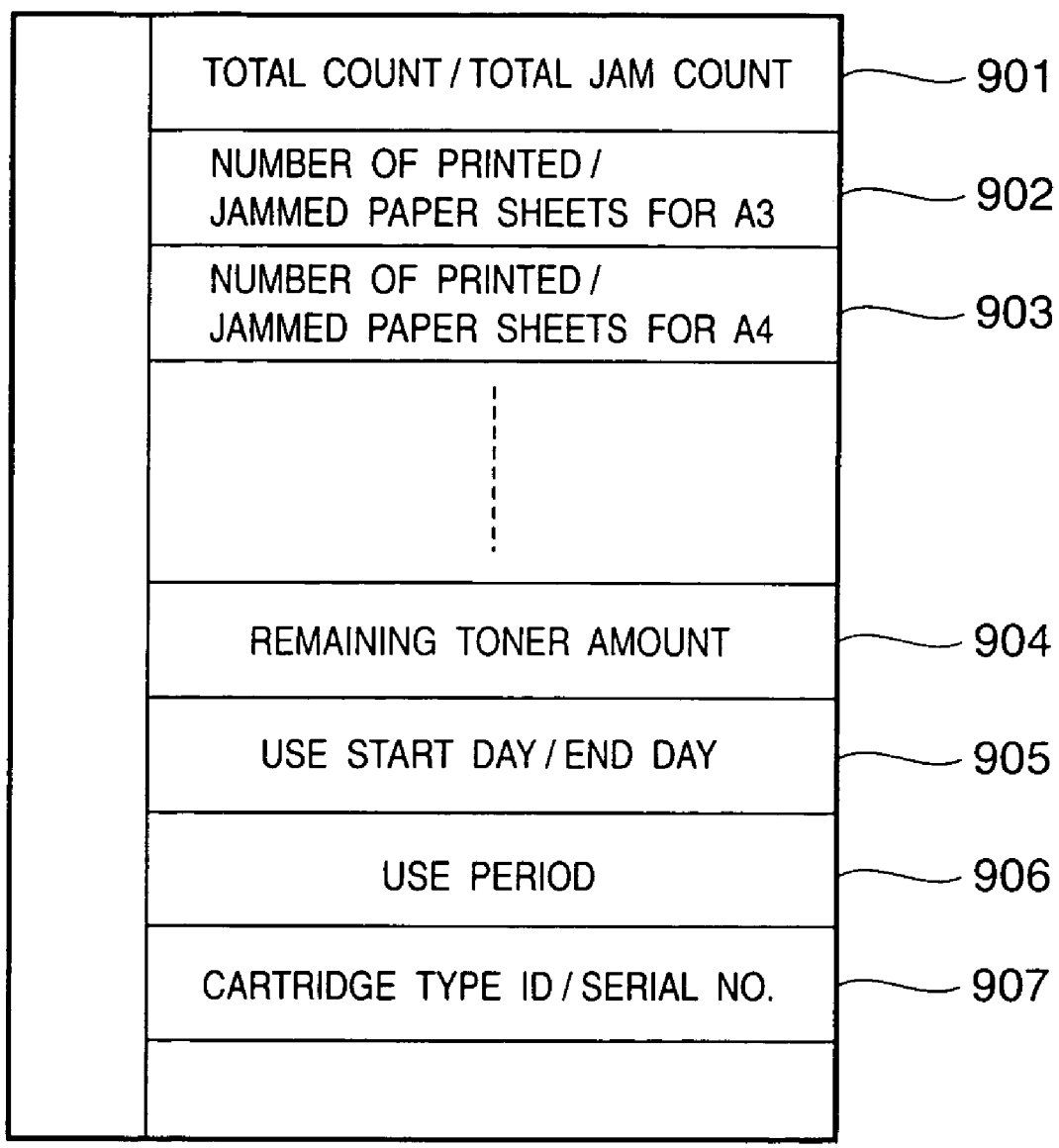
FIG. 9 is a view showing data stored in the memory of the cartridge.

FIG. 9 is a view showing data stored in the memory 810a. The memory 810a stores a total count/total jam count representing the total number of paper sheets printed using the cartridge and the total number of jammed sheets, and the numbers 902 and 903 of printed paper sheets and jammed sheets for the respective sizes. These counters are incremented every time one page is printed by the device having this cassette. A remaining toner amount 904 may store a value representing the remaining toner amount itself or may store, as a flag, the output (i.e., the toner low output) from a sensor (not shown) for detecting that the toner has decreased to a predetermined amount.

The memory 810a also stores a cartridge ID/serial number 907 for identifying each cartridge. The cartridge ID/serial number 907 is written in advance at the time of manufacture or shipment. The memory 810a may also store data such as a service center address to which a toner out notification is to be sent.

A use start day/end day 905 stores a use start date and use end date. To do this, for example, when it is detected by the cover open sensor of the cartridge that the cover is opened, the pre-stored cartridge ID/serial number of the cartridge which is being used is compared with that read out from the cartridge. If the cartridge ID/serial numbers do not match, it is regarded that the cartridge has been exchanged, and the date at that time is written as the use start day. Additionally, when the date is always written as a use end day every, e.g., 24 hours, the use end day can be recorded. As a use period 906, the period from the use start day to the use end day is written simultaneously on the use end day.

In the system of this embodiment, the above data are held by the cartridge. When the number of printed paper sheets is simply mentioned, it includes all data related to the number of printed paper sheets, including the numbers of printed paper sheets for the respective sizes and the total number of printed paper sheets.

<Cartridge Management and Charge Procedure>

Figure 1:
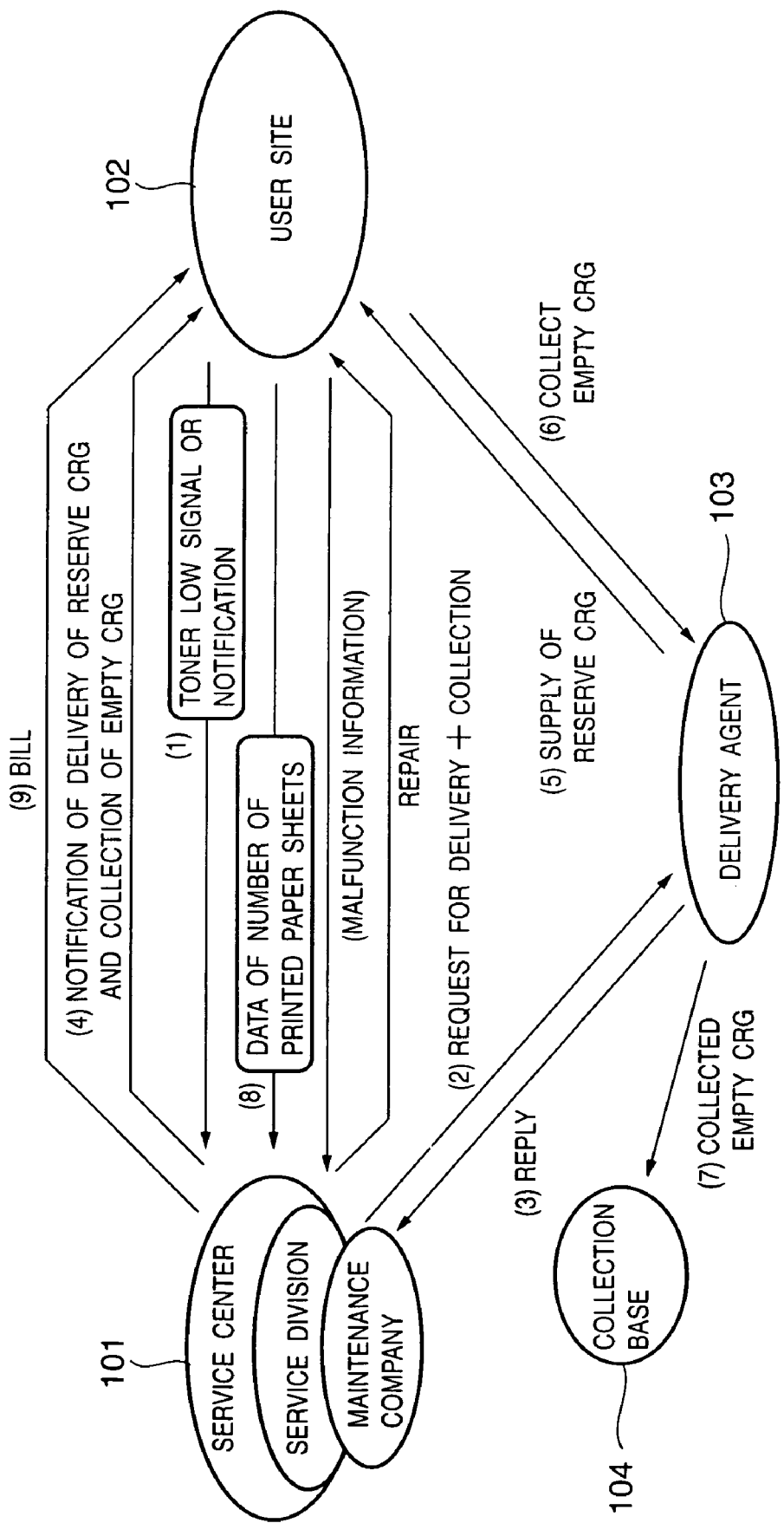
FIG. 1 is a schematic diagram of a cartridge management system according to the first embodiment.

The cartridge exchange/management procedure in this system will be described next. Note that a user site means a user who has made such an agreement with a device maker or shop that a service and charging are executed by this cartridge management system. FIG. 1 shows an outline of the management procedure.

If toner decreases to a predetermined amount or less, i.e., a toner low occurs in the printer 100a or 100b or facsimile apparatus 206 at the user site 102, it is detected by the sensor incorporated in the toner cartridge. The service center 101 is notified of this state as a toner low signal (1) from the user site 102. Although the service center is simply mentioned here, more specifically, this notification is transmitted to the PC 203 where the service module functions in the service center 101.

Upon receiving this notification, the service center 101 sends a request (2) for delivering a new toner cartridge to the user site 102 and collecting the used cartridge to a delivery agent 103 and obtains a reply (3) about the delivery schedule from the delivery agent 103.

On the basis of the reply obtained from the delivery agent, the service center 101 transmits a cartridge delivery/collection notification (4) to the user site 102. However, as will be described later, this notification is not simply transmitted but includes a sequence for schedule adjustment with the user. Also, the notification described in the present invention is the processing of information transmitting. That data is transmitted from the service center 101 to the user site 102 specifically means that data is transmitted from the PC 203 of the service center 101 to the PC 208 where the user module functions at the user site.

On the other hand, the delivery agent 103 receives the determined schedule from the service center 101 by the cartridge delivery/collection notification (4), and executes new cartridge delivery (5) to the user site 102 and used cartridge collection (6) in accordance with the schedule. The delivery agent 103 also carries the collected cartridge to a collection base 104.

At the collection base 104, necessary data are read out from the memory of the collected used cartridge, and the readout data are stored in the database managed by the service center 101.

Asynchronously with this cartridge delivery, data (8) of the number of printed paper sheets based on the printing count read out from the memory 810*a* of the cartridge is transmitted from the user site 102 to the service center 101.

The service center 101 calculates a charge corresponding to the received data of the number of printed paper sheets and transmits a bill (9) to the user site 102. The user pays the service center the payable amount by a payment method determined independently. The payee at this time may be an independently determined payee other tan the service center.

As described above, triggered by an event notification (toner low notification) from the user site 102, the service center 101 realizes, through the remote communication network 205, collection of necessary data from the user site, arrangement for delivery/collection of cartridges and generation of charge information, and sending a notification concerning the arranged schedule and charge information to the user site.

The relationship between the delivery agent 103 and the user site 102 has movement of persons and objects. However, the relationship between the delivery agent 103 and the service center 101 need only exchange of data. Hence, if the delivery agent 103 has a PC connected to a network such as a telephone line, information exchange between the service center and the delivery agent can be automated by executing a program by the PC.

In this case, a program step of implementing a function of transmitting the cartridge collection request (2) to the delivery agent 103 as an electronic message when the PC 203 receives the toner low signal (1) is included in the service module. In addition, a program step of implementing a function of transmitting the notification (4) to the PC 208 when the PC 203 receives the reply (3) from the delivery agent as an electronic message is also included in the service module.

With this arrangement, information exchange can be digitally done not only between the user site 102 and the service center 101 but also including the delivery agent 103.

Detailed of the procedure shown in FIG. 1 will be described next with reference to FIG. 10 and the like.

<Sequence of Notification and Adjustment of Cartridge Exchange Schedule>

Figure 10:
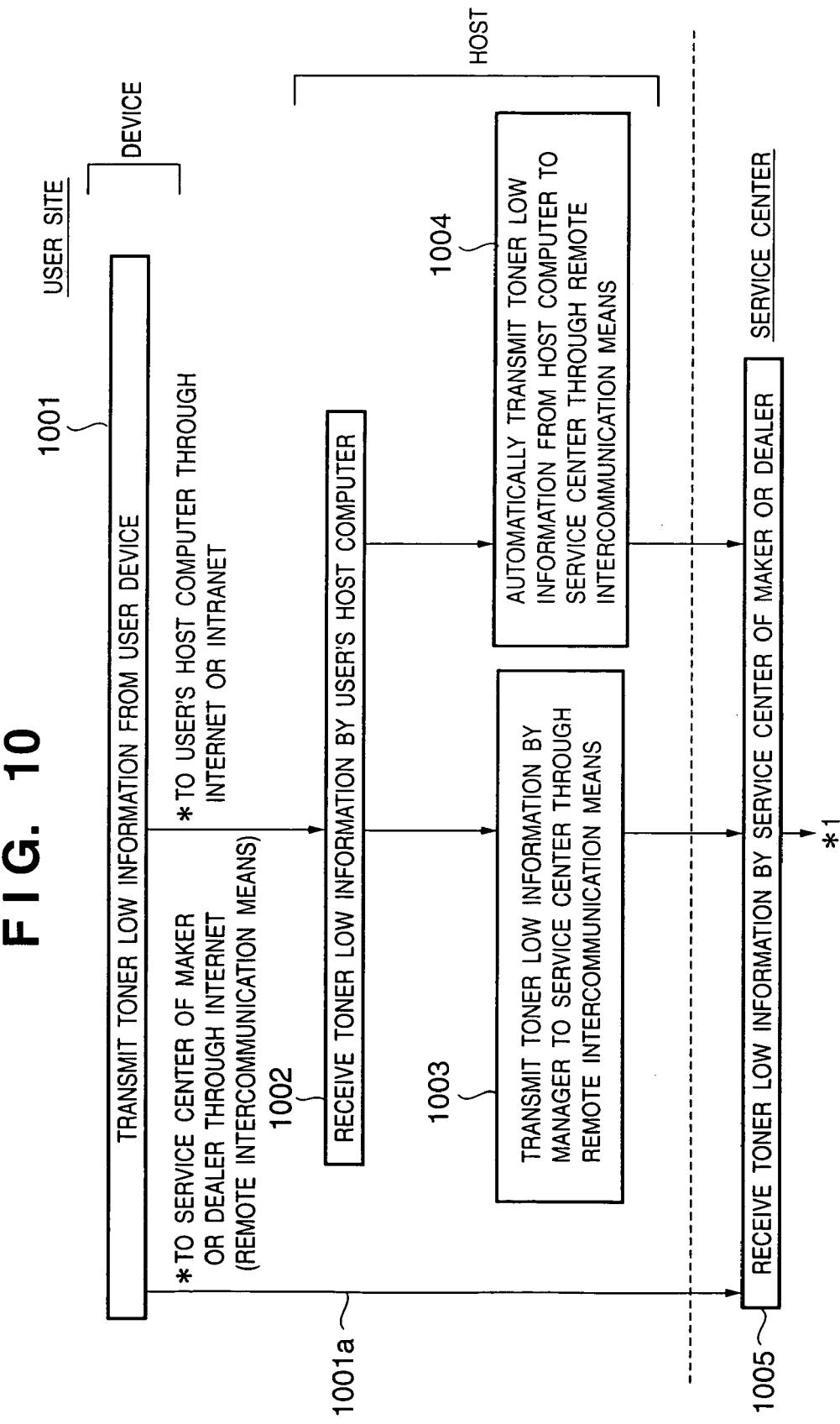
FIG. 10 is a system flow chart showing a procedure of transmitting and receiving a toner low signal in the first embodiment.

FIGS. 10 and 11 shows a procedure of adjusting the cartridge exchange schedule between the service center 101 and the user site 102. Referring to FIG. 10, a portion "user site" is executed by the user site 102 shown in FIG. 1. In processing by the user site 102, a step "device" is executed by the device modules 230 and 240 of devices such as a printer or copying machine having a toner cartridge. A device module is implemented as a program module executed by a processor for controlling each device. A step "host" is executed by a host computer such as a PC connected to a device. A portion "service center" is processing executed by the service module 210 executed by the PC 203 of the service center 101.

FIG. 10 shows a procedure from transmission of the toner low notification (1) from the user site 102 to reception of the notification by the service center 101. First, in step 1001, a toner low is detected in the device of the user, e.g., the printer 100*a* or 100*b* or facsimile apparatus 206 in FIG. 2, and this information is output by the device module 230 or 240 as a toner low signal. If the device is the facsimile apparatus 206 or printer 100*b*, the toner low signal is transmitted to the service center 101 as the toner low signal (1) in FIG. 1. This toner low signal has information representing the toner low state together with the cartridge ID/serial number read out from the cartridge. Information such as the remaining toner amount or the number of printed paper sheets may be attached to the toner low signal, as needed. When the cartridge has the memory 810*a* or 4203*a* for storing the pieces of information shown in FIG. 9, these pieces of information are acquired from the memory and transmitted to the service center through the remote communication network 205. If the cartridge has no memory, the cumulative number of printed paper sheets from the start of use of the cartridge or the remaining toner amount estimated by the print rate is used as information attached to the toner low notification (1), as described above. This information as well as the ID/serial number of the device are stored in the nonvolatile memory installed in the device. For example, information of the total number of printed paper and the remaining toner amount are transmitted with information of ID/serial number of the device.

When the device is directly connected to a computer network, like the printer 100*b* or facsimile apparatus 206, the toner low notification (1) is directly transmitted to the PC 203 of the service center, as indicated by an arrow 1001*a* in FIG. 10.

On the other hand, when the device is a printer locally connected to the host, like the printer 100*a*, or when the communication with the service center through the host is available, the toner low signal is issued to the host. In this case, the host receives the toner low signal in step 1002. After that, if the host can access the remote communication network 205 in accordance with the connection form between the host and the remote communication network 205 (remote interconnection means), the toner low signal is transmitted from the host to the service center 101 in step 1004.

If the host cannot access the remote communication network 205 or the access is inhibited, the manager manually inputs data representing the toner low state from, e.g., the personal computer 208 in FIG. 2 to make the PC 208 transmit the toner low signal to the service center 101 in step 1003.

The service center 101 receives the toner low signal transmitted by one of the above methods in step 1005. The flow advances to a step in FIG. 11.

Processing in FIG. 11 is performed by the service module 210 and analysis module 220 on the PC 203 of the service center 101. Referring to FIG. 11, when data is transmitted from the service center 101 to the user site 102, the transmission destination is the window terminal 208, and processing such as display of a user interface window on the PC 208 is executed by the user module 250.

Referring to FIG. 11, first, the processing branches in step 1101 depending on whether the data is automatically or manually input to the analyzing system of the service center 101. Step 1101 need not always be done in the service center. This is a pseudo step for expressing a processing procedure according to the arrangement of the service center. Actual processing in the service center starts from step 1102 or 1103 depending on its arrangement.

In the manual input scheme, a window for notifying the person in charge of operation of reception of the toner low signal is displayed in step 1102, and the person in charge inputs the information to the analyzing system to manage the delivery schedule.

In the automatic input scheme, the received toner low signal and the data read out from the cartridge are directly input to the analyzing system 220 (step 1103). If the input toner low information has remaining toner amount information or the information of the number of printed paper sheets, these pieces of information are also received by the PC 203 of the service center together with the cartridge ID/serial number and input to the analyzing system 220.

When the data are input to the analyzing system 220, the date of toner out is predicted by the analyzing system, and delivery day candidates are determined on the basis of the toner out day (step 1104). This prediction procedure will be described later. Subsequent steps may be manually executed, though they are automated in this case.

When the delivery day candidates are determined, the PC 203 notifies the delivery agent 103 of the determined days (step 1105).

In steps 1106 and 1107, the delivery agent 103 adjusts the schedule and transmits it to the service center. More specifically, the delivery agent determines the schedule including the stock, appropriate delivery van or delivery van candidates, and delivery time and notifies the PC 203 of the service center of the schedule. This notification is done including days on which delivery is impossible.

Upon receiving the schedule, the PC 203 of the service center transmits expected exchange times to the window terminal 208 of the user site (step 1108). At this time, the transmitted data also contains the delivery schedule information.

Upon receiving this information, the user interface (UI) window shown in FIG. 13 is displayed at the user site 102 by the user module 250 of the PC 208. When the operator inputs an acknowledge (OK) for cartridge exchange in this window, the window shown in FIG. 14 is displayed on the basis of the delivery day and time received in step 1108. In this window, the operator inputs desired date and time from the expected exchange times.

Figure 15:
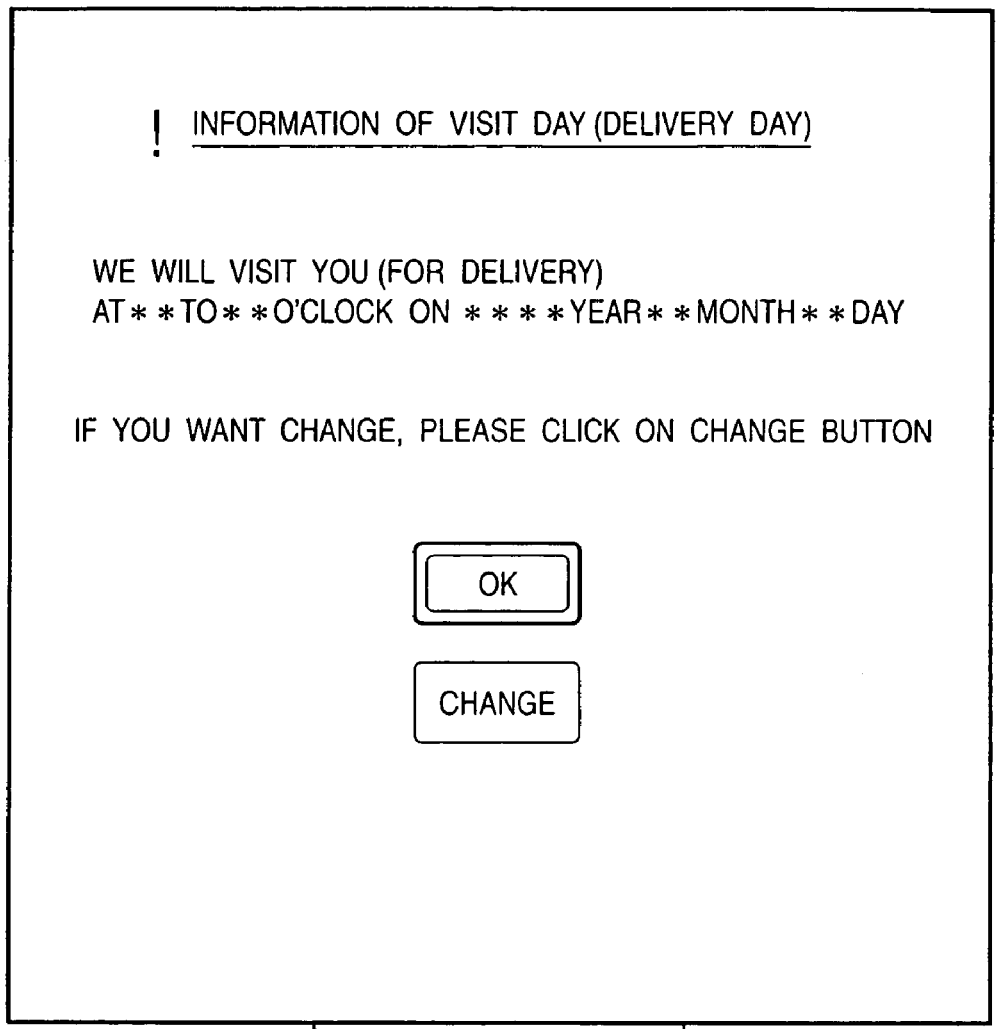
FIG. 15 is a view showing a UI window for prompting the user to check the cartridge delivery/collection schedule.

The input designated day is transmitted to the PC 203 of the service center 101. The service center 101 notifies the user (PC 208 or device such as printer of the user) of expected delivery/collection date and time determined on the basis of the designated day (step 1109) and requests final check. FIG. 15 shows a window displayed on the user side at this time.

The delivery agent is also notified of the date and time determined according to the above procedure, so the delivery agent executes cartridge delivery/collection on the designated date and time.

Referring to FIG. 11, steps 1103, 1104, 1105, 1108, and 1109 are executed by the PC 203 of the service center, and steps 1106 and 1107 are executed by the PC of the delivery agent. More specifically, after step 1105, the PC 203 waits for a reply from the delivery agent 103. Upon receiving a reply, the processing is resumed on the basis of the reply from step 1108. In step 1108, the PC of the user transmits information including the designated day to the PC of the service center.

<Prediction for Toner Out>

Figure 19:
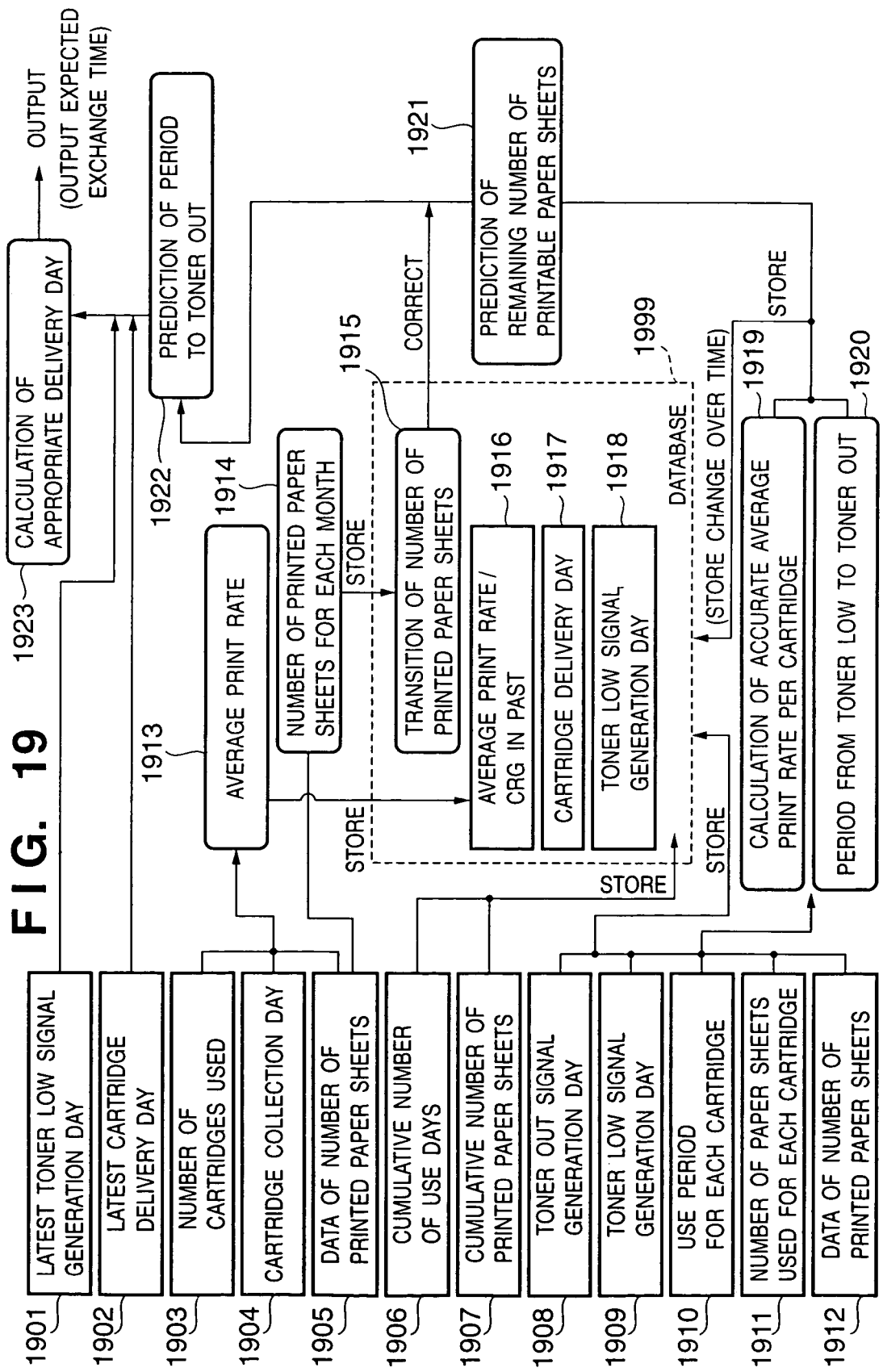
FIG. 19 is a block diagram showing the configuration of an analyzing system for predicting toner out in a cartridge in the first embodiment.

FIG. 19 is a block diagram showing the procedure of predicting the toner out time as a reference used to determine the delivery/collection schedule, which is executed by the analyzing system 220 in step 1104. The toner out time is predicted on the basis of the toner low signal received from the device and the database 1999.

The database server 201 has the database 1999. This database 1999 stores a transition 1915 of the number of printed paper sheets, an average print rate 1916 per cartridge, a cartridge delivery day 1917, a toner low signal generation day 1918, a cumulative number 1906 of use days, and a cumulative number 1907 of printed paper sheets for each user. In addition, by transmitting data recorded in the memory of the cartridge to the service center from PC at a collection base, a toner out signal generation day 1908 for each cartridge, a toner low signal generation day 1909 for each cartridge, a use period 1910 for each cartridge, a number 1911 of paper sheets used for each cartridge, and data 1912 of the number of printed paper sheets for each cartridge are also stored.

As the average print rate 1916 per cartridge, an average print rate 1913 for each cartridge is stored, which is calculated from the number 1903 of cartridges used, a collection day 1904, and data 1905 of the number of printed paper sheets per cartridge. The transition 1915 of the number of printed paper sheets is stored as a transition in each month by totaling the data 1905 of the number of printed paper sheets in units of months.

An average print rate 1919 per cartridge (obtained in units of types of cartridges or the like), which is more accurate than the average print rate 1913, and an average period 1920 from the toner low state to the actual toner out are obtained from the collected cartridge and stored in the database 1999.

For prediction, first, a remaining number 1921 of printable paper sheets is predicted from the average print rate 1919 per cartridge, and a period 1922 to toner out is predicted from the remaining number 1921 of printable paper sheets. At this time, the predicted value can be corrected using data such as the transition 1915 of the number of printed paper sheets. An appropriate delivery day 1923 is obtained from the resultant period 1922 to toner out and a toner low signal generation day 1901, and an expected exchange time is output. Exchange day candidates are output to the user site, including the date/time at which delivery is possible to the predicted toner out day, by looking up the stock and delivery schedule.

Figure 20:
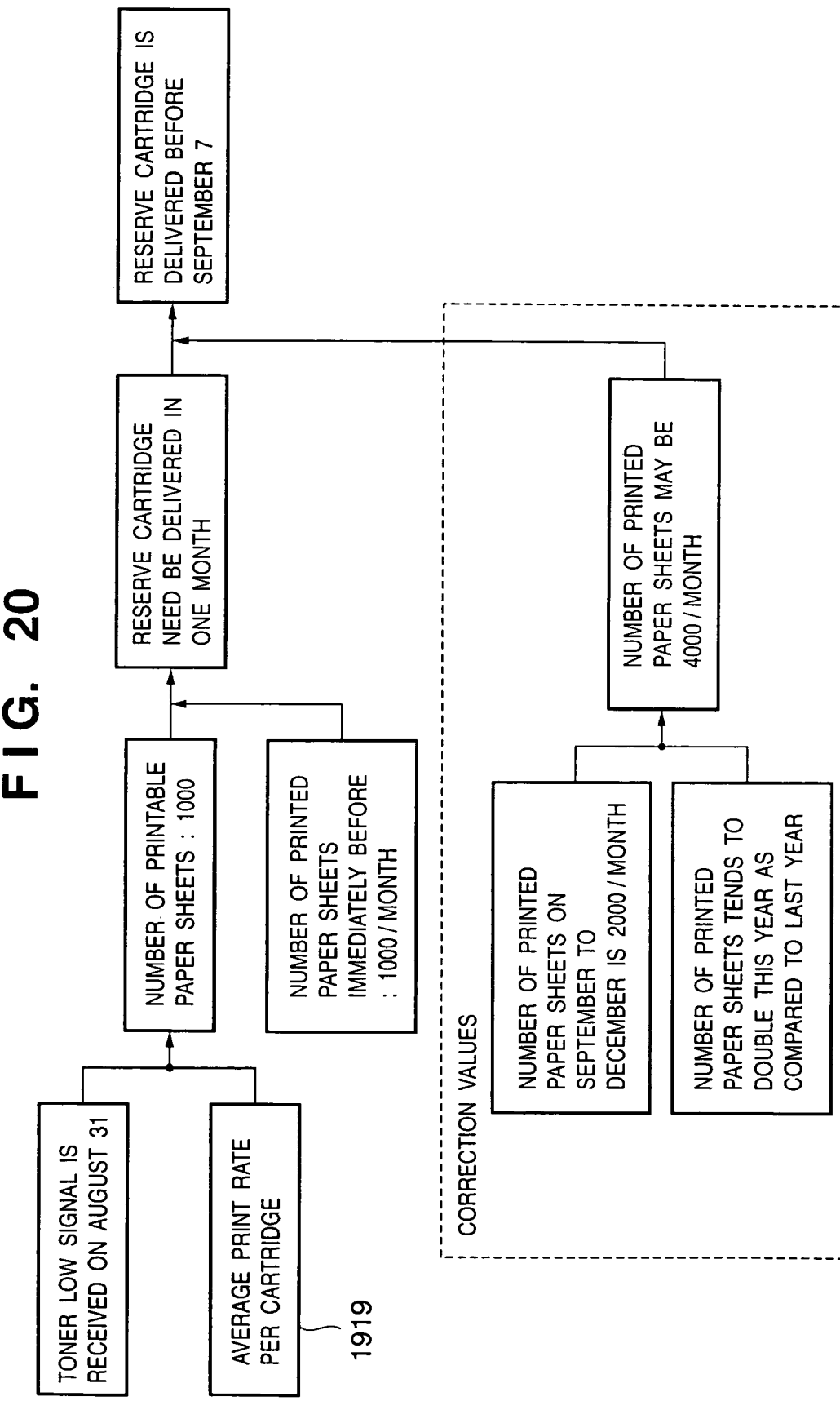
FIG. 20 is a block diagram showing the configuration of the analyzing system for predicting toner out in a cartridge in the first embodiment.

FIG. 20 is a block diagram showing the contents of correction processing for more accurately predicting the toner out time. For example, assume that the PC 203 of the service center receives a toner low signal on August 31. Since the toner low signal contains the cartridge ID/serial number, the remaining number of printable paper sheets is calculated as 1,000 from the average print rate of a cartridge of the same type. If the number of printed paper sheets immediately before is 1,000 per month, the remaining toner will be exhausted in one month, and the cartridge must be exchanged before it.

Correction values are looked up at this time. As is apparent from the transition 1915 of the number of printed paper sheets for each month, the number of printed paper sheets per month is 2,000 from September to December, and the printing amount doubles this year as compared to the last year. Apparently from these values, 4,000 paper sheets may be printed per month from September.

When the number of sheets printable by the remaining toner, 1,000, is converted into a period on the basis of the estimated printing amount, the remaining toner may last only for ¼ month or about one week. Hence, as an expected exchange time, September 7 a week after August 31 is obtained. For the user, the period from the cartridge deliverable day to September 7 is presented (transmitted) as delivery/collection day candidates.

In the above way, the expected exchange time is obtained first from the average value on the basis of the data stored in the database, and the obtained expected exchange time is corrected in accordance with the periodical variation and recent tendency, which can also be acquired from the database. Thus, an accurate toner out day is predicted, and the expected day can be presented to the user such that the cartridge can be exchanged before that day. If the period for which printing can be performed using the remaining toner is expected to be very long, the period of cartridge delivery/collection days may be limited to a predetermined number of days, e.g., one week including the expected toner out day so that the toner can be used up as much as possible. In this case, for example, if the period for which printing can be performed using the remaining toner is predicted to be one month, the final week is presented to the user as delivery/collection day candidates.

When the PC of the service center 101 receives the cartridge ID/serial number and remaining toner amount together with the toner low signal, the toner out day can be more accurately predicted from the cartridge ID/serial number and remaining toner amount. For example, when the cartridge ID/serial number is known, the models of devices in which the cartridge is being used can be limited. For this reason, the average print rate and the number of printed paper sheets can be obtained while limiting devices that use the cartridge on the basis of the pieces of information of the cartridge ID/serial number and remaining toner amount obtained from the cartridge. When the average print rate and the number of printed paper sheets are corrected using pieces of information such as the periodical variation and tendency managed by the database 1999, the toner out day can be more accurately predicted.

When the PC 203 of the service center 101 manages delivered cartridges in units of users, which cartridge is used by which device of which user can be discriminated. When the database 1999 manages the toner consumption, print rate, and the number of printed paper sheets for each user or for each model of each user, pieces of information including the average print rates, periodical variations, and recent tendencies can be stored in units of devices installed for each user. When the pieces of information stored in units of users or devices are used like the above-described database, toner out can be predicted.

As described above, since the cartridge delivery/collection schedule can be determined by highly accurately predicting the toner out time, the toner in the cartridge can be used up as much as possible by matching the cartridge exchange time with the toner out time. This contributes to resources savings. In addition, since the printing count charge scheme charges for the number of printed paper sheets, the prime cost can be reduced by decreasing the amount of toner unused and discarded. This contributes to cost reduction or an increase in profit margin.

<Charge Sequence>

FIG. 12 is a system flow chart showing a procedure of charging for the number of printed paper sheets at the user site. The charge sequence is assumed to be triggered by data of the number of printed paper sheets which is periodically transmitted from the user site. However, this sequence may be started in accordance with a request from the service center or triggered by a toner low signal. Charge operation by the service center, including issue of a bill, may be performed asynchronously with transmission of data of the number of printed paper sheets from the user site to the service center.

Referring to FIG. 12, a portion "user site" means processing executed at the user site 102, and a portion "service center" means processing executed by the PC 208 of the service center. In the processing by the user site 102, a step "device" is executed by the device having the toner cartridge, and a step "host" is executed by the host computer such as a PC connected to the device through cables or networks. After the data of the number of printed paper sheets is transmitted to the PC 203 of the service center 101, communication between the service center and the user site is performed between the respective window terminals.

Referring to FIG. 12, data of the number of printed paper sheets, which is generated after the preceding charge sequence, is read by the device module from the device which is included in the user site 102 and has an agreement of printing count charge scheme, and transmitted to the service center 101 (steps 1201, 1202, and 1202*a*). Since charging and cartridge exchange are asynchronously performed, the data of the number of printed paper sheets to be transmitted is obtained according to a procedure to be described later.

When the device is connected to the remote communication network 205 through a host, the host computer temporarily receives the data of the number of printed paper sheets (step 1203). For a manual scheme, the data is input by the manager, or for an automatic scheme, the received data is automatically transmitted to the service center (step 1204 or 1205).

In the present invention, as a form of connection to the remote communication network 205 through the host, the device may be connected to the host through a cable or through a network such as a LAN. Also, the host may have a server function, and another host (host having no server function) may be connected to the host having the server function.

The PC 203 of the service center 101 receives the data of the number of printed paper sheets (step 1206), and the data is transferred to the service module 210 of the PC 203. The service module 210 totalizes the numbers of printed paper sheets of the respective devices in units of users (step 1207), calculates the payable amount on the basis of the totalized value (step 1208), and transmits the amount to the user module 250 of the PC 208 together with pieces of particulars information such as the number of devices with agreement and the number of printed paper sheets (step 1209).

The window displayed at this time is shown in FIG. 16. The particulars are displayed together with the payable amount. To agree with this payable amount, the user clicks the YES button. If there is any question, the user clicks the NO button for inquiry or negotiation. Finally, settlement is done by a predetermined method (step 1210). Step 1210 can be executed as part of the series of processing operations if it is settlement through a computer network. However, if the predetermined method is not an electronic settlement method but, e.g., payment to a bank account, the processing by the service module 210 is ended without executing step 1210.

Figure 17A:
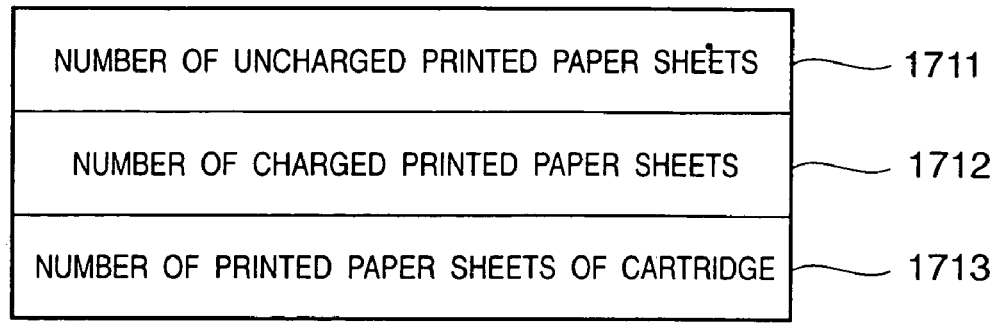
FIG. 17A is a view showing the printing count storage area in the RAM of a device.
Figure 17B:
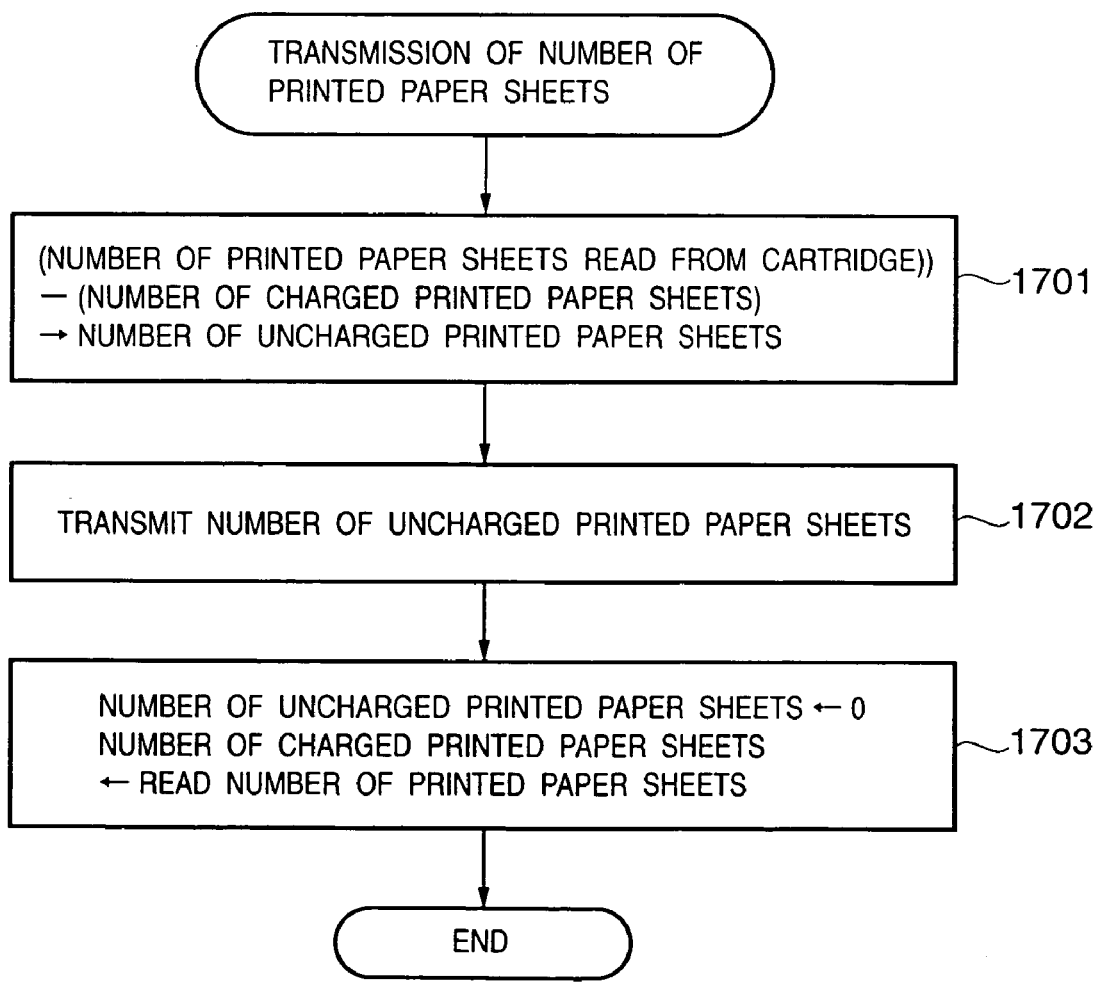
FIG. 17B is a flow chart showing details of steps 1201 and 1202 of FIG. 12, which are executed by device modules 230 and 240 to transmit the number of printed paper sheets from the user device.

FIG. 17B is a flowchart showing details of steps 1201 and 1202 of FIG. 12, which are executed by the device modules 230 and 240 to transmit the number of printed paper sheets from the user device. FIG. 17A shows the printing count storage area in the RAM of the device. The storage area includes a number 1711 of uncharged printed paper sheets for toner cartridges used so far, which represents the number of printed paper sheets for which the charge is not paid, a number 1712 of charged printed paper sheets for the currently attached toner cartridge for which the user has already been billed the charge amount, and a number 1713 of printed paper sheets read out from the used cartridge immediately before cartridge exchange.

To transmit the data of the number of printed paper sheets from the device, the number of printed paper sheets is read out from the memory of the cartridge, the value of the number 1712 of charged printed paper sheets is subtracted from the readout number of printed paper sheets, and the difference value is stored as the number 1711 of uncharged printed paper sheets (step 1701). The number of uncharged printed paper sheets is transmitted to the service center or host (step 1702). Finally, when it is confirmed that the number of uncharged printed paper sheets is transmitted, "0" is set in the number 1711 of uncharged printed paper sheets, and the number of printed paper sheets read out from the cartridge is set in the number of charged printed paper sheets.

Figure 18:
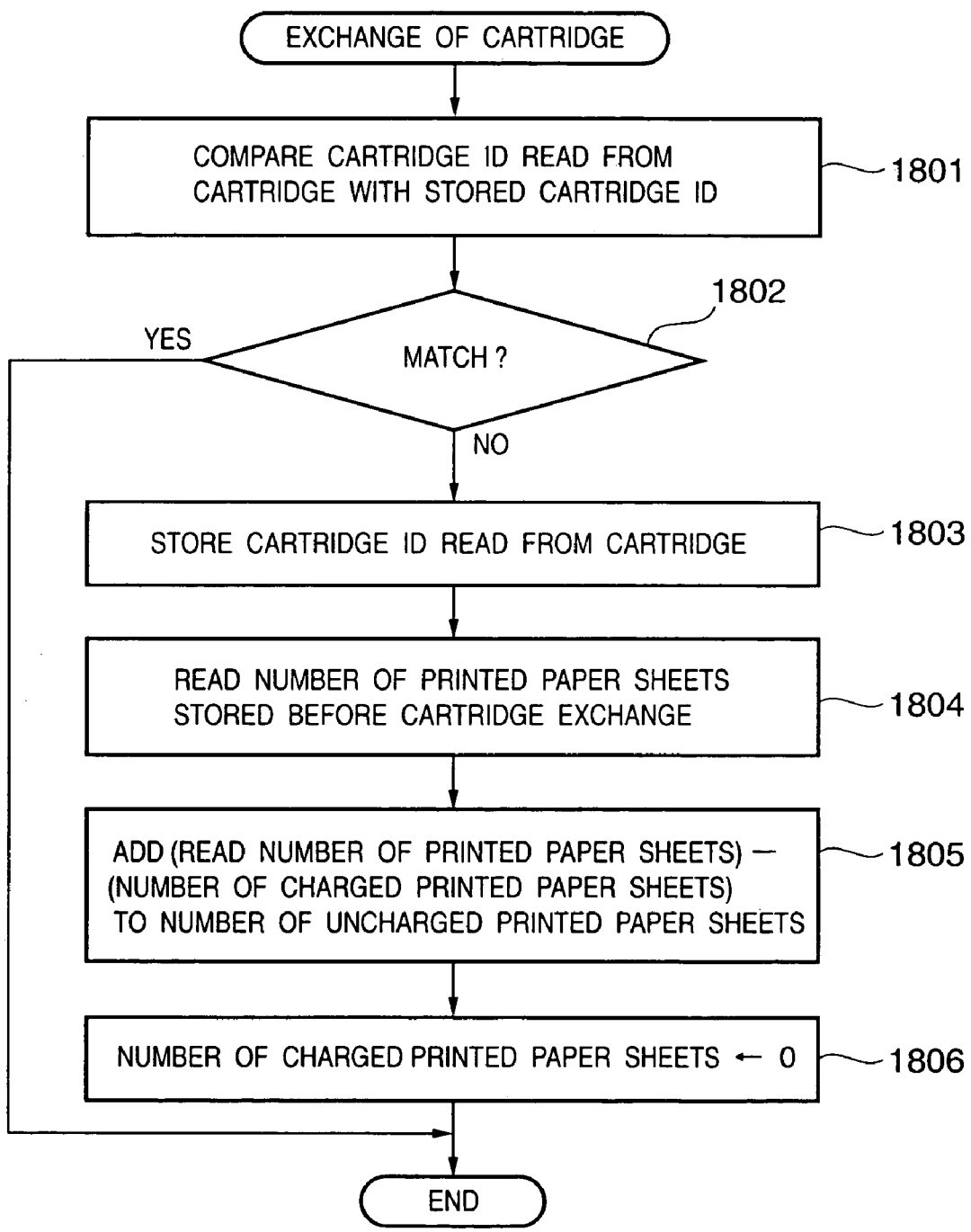
FIG. 18 is a flow chart showing a procedure of exchanging the cartridge in the device.

The flow chart shown in FIG. 17 is executed every predetermined period such as one month by the timepiece function of the device. Although not illustrated in FIG. 12, in the present invention, an instruction for transmitting information of the number of uncharged output paper sheets of the device, which is stored in the PC 208, may be transmitted from the PC 203 to the PC 208 every predetermined period, and charge information such as the number of output paper sheets may be acquired by the PC 203. Also, in the present invention information such as the number of uncharged output paper sheets of the device, which is stored in the device itself, may be transmitted to the PC 203 every predetermined period by the timepieces function of the PC 208. When the cartridge is exchanged, the device such as the printer 100 or facsimile apparatus 206 executes the procedure shown in FIG. 18. The procedure shown in FIG. 18 is executed assuming that the cartridge is probably exchanged when the cover of the cartridge storage section of the device main body is opened and then closed again or when the device is powered on. Whether the cover of the cartridge storage section is open is detected by a sensor. Immediately after the cartridge cover is opened or in the processing sequence after the device is powered off, the device reads out the data of the number of printed paper sheets from the memory of the currently attached cartridge and stores it as the number 1713 of printed paper sheets of the cartridge.

After that, when the cartridge cover is closed or the device is powered on, the cartridge ID/serial number is read from the currently attached cartridge and compared with the cartridge ID/serial number read and stored after cartridge exchange (step 1801). The comparison result is determined in step 1802. If YES in step 1802, the cartridge has not been exchanged, and the processing is ended.

If NO in step 1802, the cartridge has been exchanged, so the read cartridge ID/serial number is stored as the current cartridge ID/serial number (step 1803).

The stored number of printed paper sheets is read out from the number 1713 of printed paper sheets of the cartridge (step 1804). A value obtained by subtracting the value of the number 1712 of charged printed paper sheets from the readout number of printed paper sheets is added to the number of uncharged printed paper sheets (step 1805).

Then, "0" is set in the number 1712 of charged printed paper sheets (step 1806).

With this processing, for the number of printed paper sheets recorded in the cartridge, the number of printed paper sheets for which the user has already been billed the charge amount can be distinguished from the number of printed paper sheets for which the user has not been billed the charge amount yet. For this reason, in the charge processing, the user can be billed a correct charge amount based on the number of uncharged paper sheets.

Note that a new cartridge is substantially supplied to the user without any charge.

In the above-described manner, the printing count charge scheme of charging for the number of printed paper sheets can be applied to a device such as a printer which supplies toner by a toner cartridge. When the printing count charge scheme is applied, payment can be done asynchronously with operation such as cartridge exchange or collection, and a charge system corresponding to the printing amount can be implemented. Since the service side such as a maker or seller can expect a continuous and stable profit, business expansion can be expected. In addition, since data collection for the printing count charge scheme is done through a network, the labor can be reduced, and highly accurate data can be quickly acquired.

Furthermore, linking with the management system for accurately predicting the toner out time of the cartridge, any increase in prime cost due to discard of unused toner can be prevented, and the printing count charge scheme for cartridges can be commercially successful.

On the user side, since a variation in print cost decreases, and the charge can be simply checked or estimated from the number of printed paper sheets, check of the amount paid and budget formation for print cost are facilitated. This contributes to an improvement of productivity of these operations.

Note that the device may transmit the cartridge ID/serial number together with the number of printed paper sheets. In this case, the service center receives the cartridge ID/serial number and stores the data in the database shown in FIG. 20.

<Device Maintenance>

FIG. 21 shows a procedure when a malfunction occurs in the user device. In this embodiment, since the user site and service center are connected through a network, both a malfunction notification and a repair request can be transmitted through the network.

When malfunction information is generated by, e.g., detecting a malfunction by the user device, the device transmits the malfunction information to the service center directly through the remote communication network 205 when the device is connected to the remote communication network 205, or to the host when the device is connected to the remote communication network 205 through the host (step 2101).

If the device has no failed sensor or cannot detect the malfunction, or the device is not connected to the remote communication network, the operator manually inputs the malfunction information directly to the remote communication network 205 or to the host connected to the remote communication network 205 (step 2102).

When the malfunction information is transmitted to the host, the host receives the malfunction information (step 2103), so the malfunction information is transmitted to the service center manually by the operator (step 2104) or automatically (step 2105).

In the service center, when the PC 203 receives the malfunction information (step 2106), the service division of the device maker or a repair agent is automatically or manually notified of necessary information, and the schedule is adjusted between the service center and the service division or repair agent (step 2107). The adjusted schedule is transmitted to the window terminal 208 of the user site. When the schedule is further adjusted and determined (step 2108), repairs are done in accordance with the determined schedule. To adjust the schedule, data may be exchanged between the service center and the service division or the like in step 2107 or the user site in step 2108.

FIG. 22A shows a window displayed when the service center notifies the user site of the schedule in step 2108. The user selects schedules in this window and returns them to the service center.

FIG. 22B shows a window showing information to be transmitted from the service center to the user site in order to check the contents of a malfunction in advance. The user selects a corresponding malfunction content from the displayed candidates and returns it to the service center. The window shown in FIG. 22B can be displayed either at or before the schedule adjustment. When the user is made to send the malfunction content before adjustment, the degree of malfunction can be reflected on the schedule.

In this way, malfunction notification and repair schedule adjustment can be done through the network. A serviceman who checks and repairs the printer is dispatched from the service center to the user in accordance with the adjusted schedule. At this time, the user is basically billed no charge except that corresponding to data related to the number of printed paper sheets.

As described above, in the printing count charge scheme according to this embodiment for use of a printer using a detachable cartridge which accommodates at least toner and a developing unit, data related to the number of paper sheets printed by the printer and data related to the remaining toner amount in the cartridge, which are output from the printer having a cartridge attached thereto, are supplied to the service center through the remote communication means, and the service center bills the user of the printer a charge corresponding to the data related to the number of printed paper sheets supplied through the remote communication means and supplies to the user a new cartridge to be attached in place of the cartridge in the printer on the basis of the data related to the remaining toner amount basically without billing the user the charge.

The charge corresponding to the data related to the number of printed paper sheets is included in the maintenance service charge for the printer. In addition, data related to a malfunction of the printer is supplied to the service center through the remote communication means, and the service center dispatches a serviceman who checks and repairs the printer on the basis of the data related to the malefaction of the printer, which is supplied through the remote communication means, basically without billing the user any charge except the charge corresponding to the data related to the number of printed paper sheets.

Furthermore, the function of the service center includes a delivery function such as a cartridge delivery agent. The used cartridge is collected when a new cartridge is supplied.

<Effects of First Embodiment>

According to the cartridge management system of the above-described embodiment, the following effects can be obtained.

(1) When a toner low signal is generated, the toner out time is predicted, and the cartridge is exchanged at the predicted time. For this reason, the toner in the cartridge can be used up, and this contributes to resource savings and prime cost reductions.

(2) Since the cartridge can be exchanged immediately before toner out in the cartridge, the downtime of the device such as a printer due to toner out can be eliminated.

(3) Since the cartridge is delivered to the user immediately before toner out in the cartridge, the user need not stock or store spare cartridges or used cartridges.

(4) Since delivery and collection of cartridges are combined, the user need not bring a used cartridge to the maker or shop. In addition, when the new cartridge is exchanged with the used cartridge immediately after delivery, the used cartridge can be reliably collected.

(5) A plurality of devices at the user site can be charged together. For this reason, charging and maintenance can be done in units of users.

(6) Since the cartridge itself has a memory to store printing record data such as the number of printed paper sheets, the data can be stored in a database, and toner out can be accurately predicted using the data.

(7) Since the cartridge itself has identification data such as an ID representing the cartridge type or a serial number to uniquely identify the cartridge, it can be checked whether the cartridge has been exchanged. It can be checked using these identification data whether it is a cartridge delivered by a printing count charge scheme agreement, so any illicit use of the cartridge can be prevented. In addition, the cycle of reuse/recycle can be managed.

(8) Since the cartridge itself has data, the number of printed paper sheets or the like can be grasped from the data of the cartridge even when it is detached from the device.

(9) Since data are systematically managed by the service center, the print rate and exchange time can be more accurately calculated.

[Second Embodiment]

As the second embodiment, a system using a cartridge having no memory will be described. Only different points between this system and the first embodiment will be described. Hence, the overall arrangement is the same as in FIGS. 1 and 2, and the arrangement of a device is also the same as in the first embodiment except that the cartridge has no memory.

<Charge Sequence>

Figure 23:
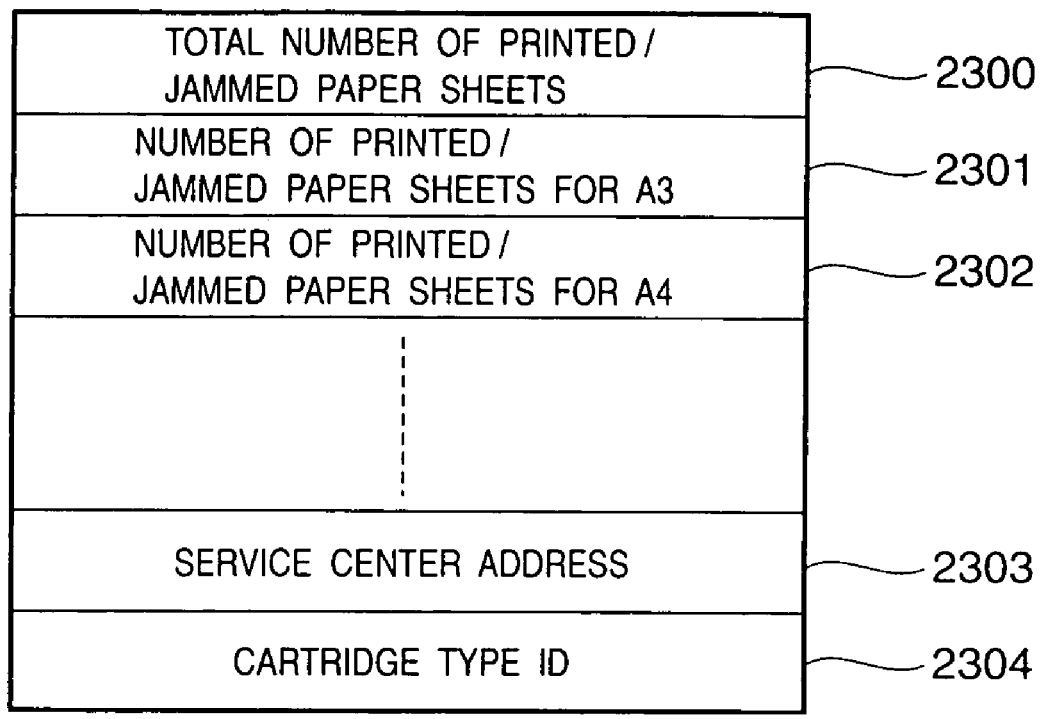
FIG. 23 is a view showing data held by each device in the second embodiment.

FIG. 23 shows a data area prepared in the memory of a device charged by the printing count charge scheme of this embodiment. Basically, the data are the same as those held in the memory of a cartridge, though data unique to the cartridge is excluded. A total number 2300 of printed/jammed paper sheets represents the number of printed paper sheets and the number of paper sheets print of which has failed. A number 2301 of printed/jammed paper sheets for A3 and a number 2302 of printed/jammed paper sheets for A4 represent the numbers of paper sheets for the respective sizes. These values are incremented by one every time the device prints one page of a paper sheet with a corresponding size.

A service center address 2303 represents the address of a transmission destination of the number of printed paper sheets or a toner low signal. This field is used when the device is directly connected to a remote communication network 205. A cartridge type ID 2304 is used to notify the service center of the cartridge type from the device. The contents in the fields 2303 and 2304 are rarely changed and therefore can be recorded in a ROM. In the present invention, the device ID stored in a memory of the device can be also applied instead of the cartridge ID 2304.

Figure 24:
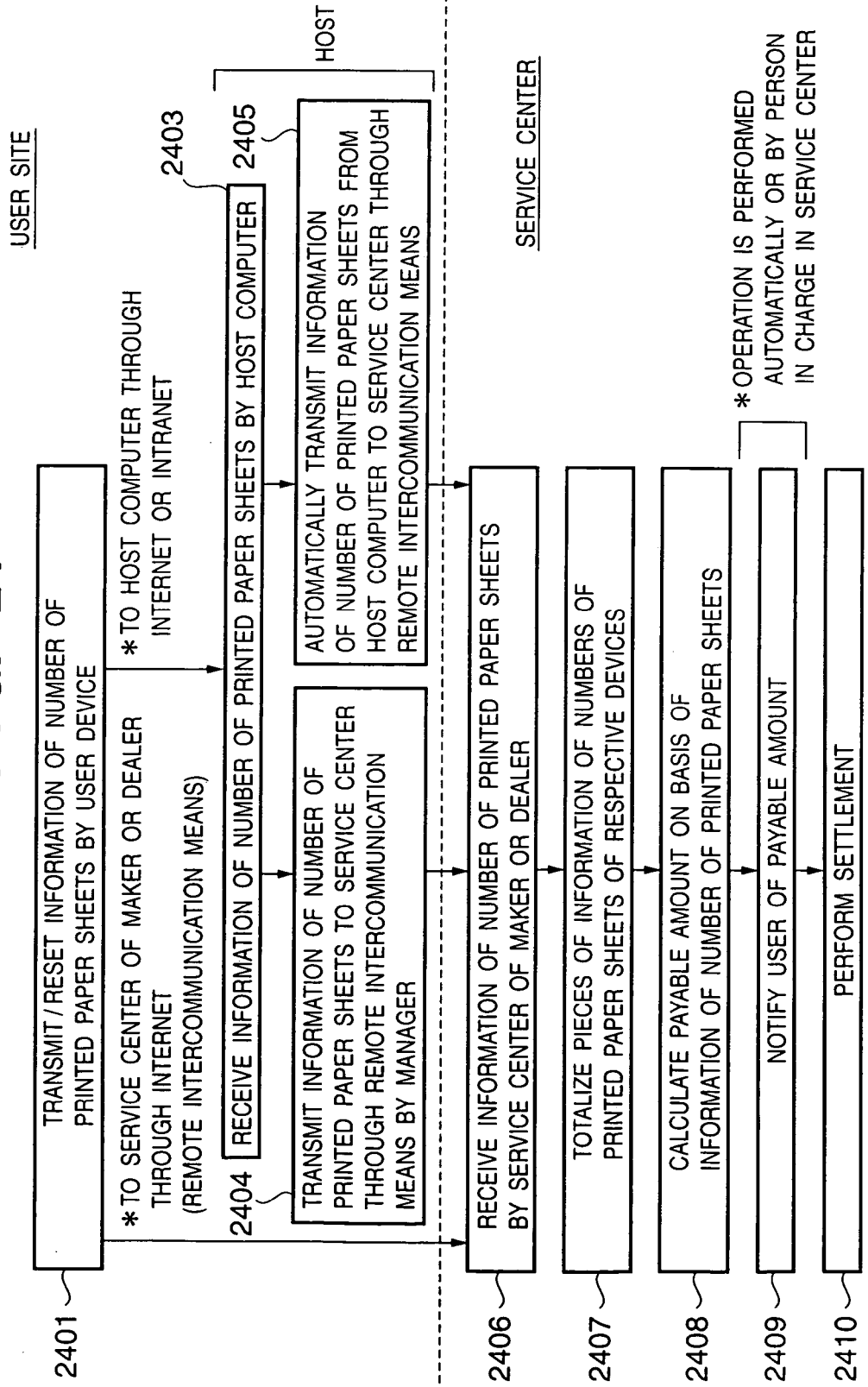
FIG. 24 is a system flow chart showing transmission and processing of charge information in the second embodiment.

FIG. 24 is a system flow chart showing the charge procedure executed in this embodiment in place of that shown in FIG. 12 of the first embodiment.

The device module reads out the data 2300 to 2302 of the numbers of printed paper sheets shown in FIG. 23 periodically or in accordance with a request from the service center, and transmits the data to the remote communication network 205 or the host connected to the device in accordance with the connection destination (step 2401). When transmission is confirmed, "0" is set to the read out data 2300 to 2302 of the numbers of printed paper sheets.

Steps 2403 to 2410 are the same as steps 1203 to 1210 in FIG. 12, and a detailed description thereof will be omitted.

As described above, even when the cartridge has no memory, the service center can charge for the number of printed paper sheets in units of devices. Since this sequence is also effective for a device using a cartridge having a memory, the procedure shown in FIG. 24 can be used in place of that shown in FIG. 12 of the first embodiment. Only the processing on the device side is different FIG. 12 and FIG. 24. Hence, when the procedure in FIG. 12 is applied to a device using a cartridge having a memory, and the procedure in FIG. 24 is applied to a device using a cartridge having no memory, this system can cope with even a user site having devices of both types.

<Prediction for Toner Out>

In this embodiment, the sequences of notification and adjustment of a cartridge exchange schedule, which are triggered by generation of a toner low signal by the device, are almost the same as in FIGS. 10 and 11 of the first embodiment. However, since data for each cartridge cannot be held, the serial number of a cartridge is not transmitted together with the toner low signal. In addition, since data to be reflected on the database are different from those of the first embodiment, the prediction method is also different.

Figure 25:
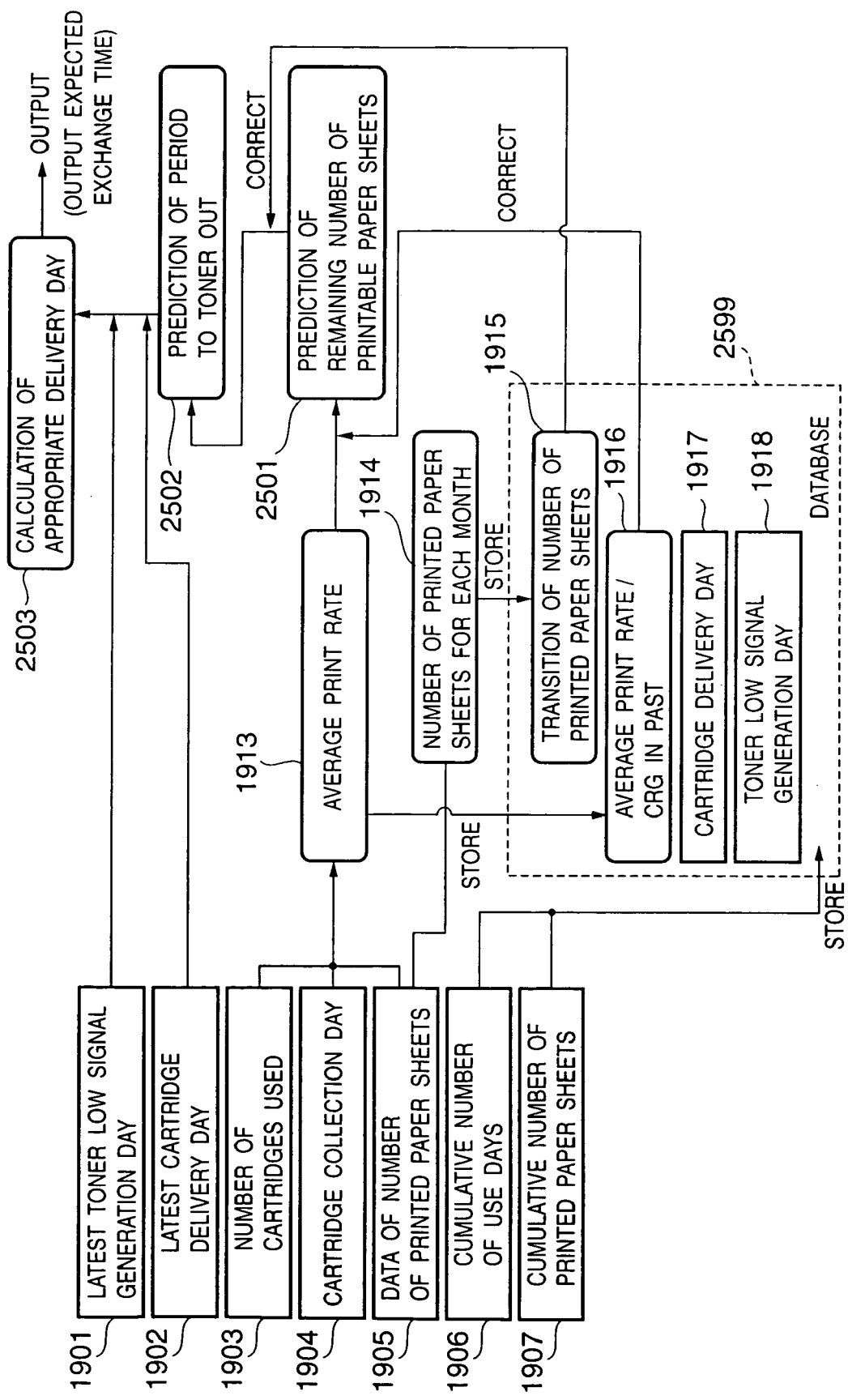
FIG. 25 is a block diagram showing the configuration of an analyzing system for predicting toner out in a cartridge in the second embodiment.

FIG. 25 is a block diagram showing the procedure of predicting the toner out time, which is executed by an analyzing system 210 in step 1104 in FIG. 11 and used as a reference for determining the delivery/collection schedule.

The analyzing system has a database 2599. This database 2599 stores a transition 1915 of the number of printed paper sheets, an average print rate 1916 per cartridge, a cartridge delivery day 1917, a toner low signal generation day 1918, a cumulative number 1906 of use days, and a cumulative number 1907 of printed paper sheets for each user.

As the average print rate 1916 per cartridge, an average print rate 1913 is stored, which is calculated from the number 1903 of cartridges used, collection day 1904, and data 1905 of the number of printed paper sheets per cartridge. The transition 1915 of the number of printed paper sheets is stored as a transition in each month by totaling the data 1905 of the number of printed paper sheets in units of months.

For prediction, first, a remaining number 2501 of printable paper sheets is predicted from the average print rate 1919, and a period 2502 to toner out is predicted from the remaining number 2501 of printable paper sheets. At this time, the predicted value can be corrected using data such as the average print rate 1916 and the transition 1915 of the number of printed paper sheets in the past. An appropriate delivery day 2503 is obtained from the resultant period 2502 to toner out and a toner low signal generation day 1901, and an expected exchange time is output. Exchange day candidates are output to the user site, including the date/time at which delivery is possible to the predicted toner out day, by looking up the stock and delivery schedule.

Figure 26:
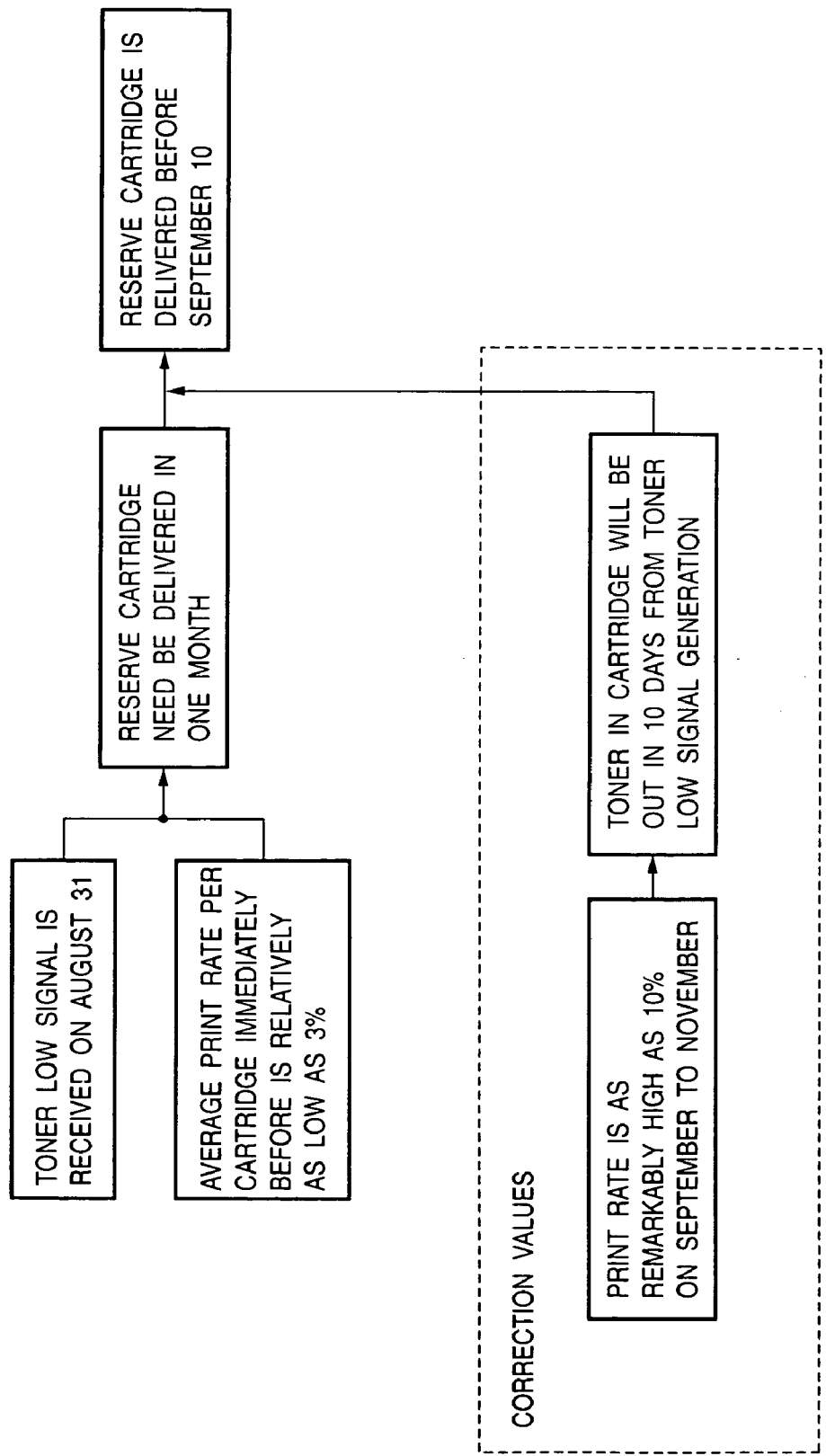
FIG. 26 is a block diagram showing the configuration of the analyzing system for predicting toner out in a cartridge in the second embodiment.

FIG. 26 is a block diagram showing the contents of correction for more accurately predicting the toner out time. For example, assume that the service center receives a toner low signal on August 31. From the number of printable paper sheets obtained from the immediately preceding average print rate of per cartridge, the remaining toner will be exhausted in one month, and the cartridge must be exchanged before it.

Correction values are looked up at this time. As is apparent from the average print rate 1916 per cartridge and the transition 1915 of the number of printed paper sheets for each month in the past, the print rate rises to 10% from September to November. The average print rate from September to November is almost three times that immediately before. That is, there are only 10 days from toner low signal generation to toner out. Hence, the time limit for delivery of a reserve cartridge is set at September 10 that is 10 days after August 31 as the toner low signal generation day. For the user, the period from the cartridge deliverable day to September 10 is presented as delivery/collection day candidates.

In the above way, an accurate toner out day can be predicted, and the expected day can be presented to the user such that the cartridge can be exchanged before that day. If the period for which printing can be performed using the remaining toner is expected to be very long, the period of cartridge delivery/collection days may be limited to a predetermined number of days, e.g., one week including the expected toner out day so that the toner can be used up as much as possible. In this case, for example, if the period for which printing can be performed using the remaining toner is predicted to be one month, the final week is presented to the user as delivery/collection day candidates.

As described above, since the cartridge delivery/collection schedule can be determined by highly accurately predicting the toner out time, the toner in the cartridge can be used up as much as possible. In addition, since the printing count charge scheme charges for the number of printed paper sheets, the prime cost can be reduced by decreasing the amount of toner unused and discarded. This contributes to cost reduction or an increase in profit margin.

An analyzing system using both the prediction scheme shown in FIG. 19 and that shown in FIG. 25 can also be built. In this case, for a cartridge having no memory, toner out is predicted using the method shown in FIGS. 25 and 26, and for a cartridge having a memory, toner out is predicted using the method shown in FIGS. 19 and 20.

<Effects of Second Embodiment>

According to the cartridge management system of the above-described embodiment, the following effects can be obtained.

(1) When a toner low signal is generated, the toner out time is predicted, and the cartridge is exchanged at the predicted time. For this reason, the toner in the cartridge can be used up, and this contributes to resource savings and prime cost reductions.

(2) Since the cartridge can be exchanged immediately before toner out in the cartridge, the downtime of the device such as a printer due to toner out can be eliminated.

(3) Since the cartridge is delivered to the user immediately before toner out in the cartridge, the user need not stock or store spare cartridges or used cartridges.

(4) Since delivery and collection of cartridges are combined, the user need not bring a used cartridge to the maker or shop. In addition, when the new cartridge is exchanged with the used cartridge immediately after delivery, the used cartridge can be reliably collected.

(6) Unlike the first embodiment, a charge system and delivery/collection system based on the printing count charge scheme can be built using a conventional device using a cartridge having no memory.

(7) Since data are systematically managed by the service center, the print rate and exchange time can be more accurately calculated.

[Third Embodiment]

As the third embodiment, a system which excludes a delivery agent entrusted with delivery operation on a network from the system of the first embodiment will be described. The arrangement of the system and the arrangement of each device are the same as in FIGS. 2 to 9 of the first embodiment.

Figure 27:
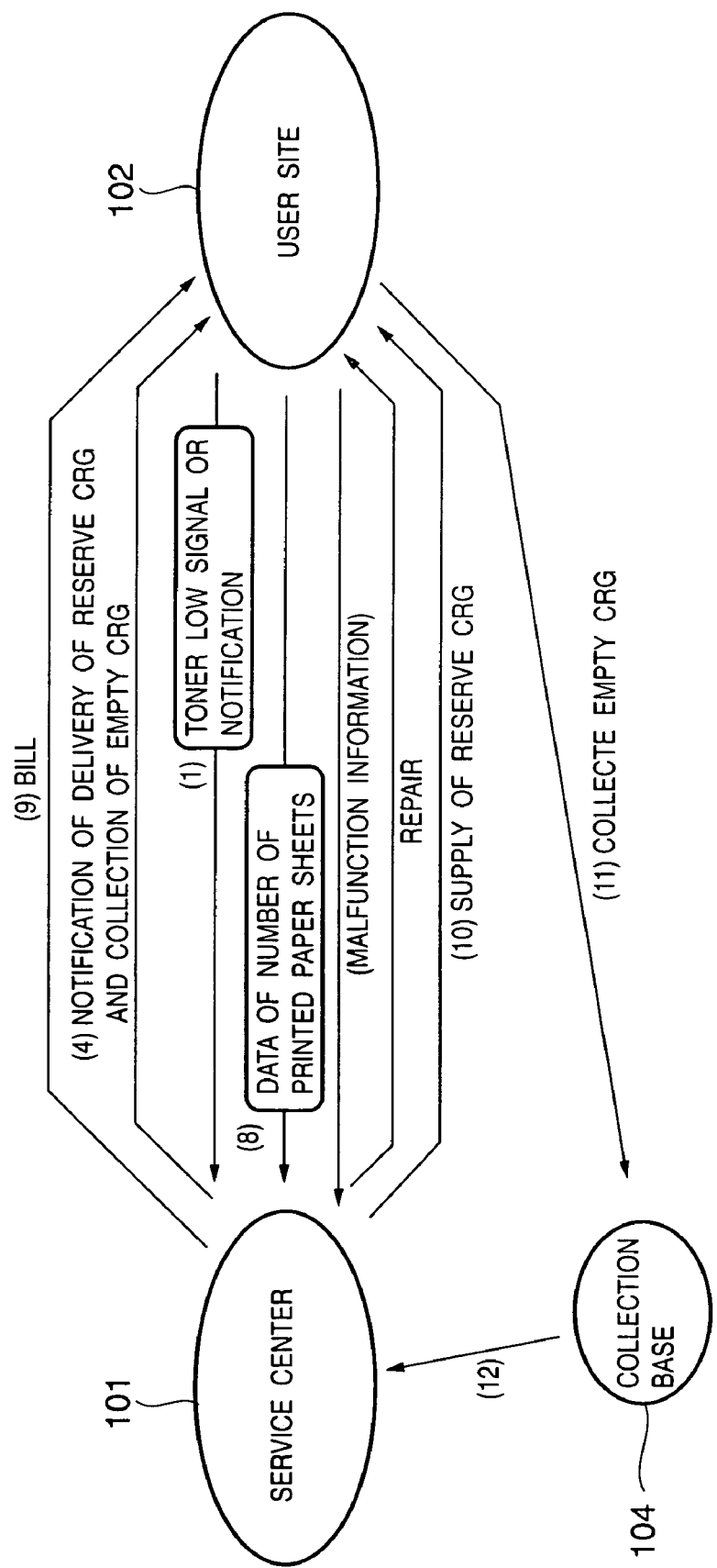
FIG. 27 is a view showing the outline of a cartridge management system according to the third embodiment.

FIG. 27 schematically shows the management procedure of the third embodiment. The same numbers as in FIG. 1 denote the same messages in FIG. 27.

If toner decreases to a predetermined amount or less, i.e., a toner low occurs in a printer 100a or 100b or facsimile apparatus 206 at a user site 102, it is detected by the sensor incorporated in the cartridge. A service center 101 is notified of this state as a toner low signal (1) from PC 208 or directly from the device of the user site 102. Although the service center is simply mentioned here, more specifically, the notification destination of a PC 203 or the like included in the service center 101.

Upon receiving this notification, the service center 101 transmits a cartridge delivery/collection notification (4) to the user site 102. However, as will be described later, this notification is not simply transmitted but includes a sequence for schedule adjustment with the user.

The service center 101 delivers (10) a new cartridge to the user site 102 in accordance with the schedule determined by the cartridge delivery/collection notification (4), and simultaneously, collects (11) the used cartridge and carries the collected cartridge to a collection base 104.

At the collection base 104, necessary data are read out from the memory of the collected used cartridge, and the readout data are stored in the database managed by the service center 101. The readout data are transmitted to the service center 101 as cartridge data (12).

Asynchronously with this cartridge delivery, data (8) of the number of printed paper sheets based on the printing count read out from a memory 820a of the cartridge is transmitted from the user site 102 to the service center 101.

The service center 101 calculates a charge corresponding to the received data of the number of printed paper sheets and transmits a bill (9) to the user site 102. The user pays the service center the payable amount by a payment method determined independently. The payee at this time may be an independently determined payee other tan the service center.

As described above, triggered by an event notification (toner low notification) from the user site 102, the service center 101 realizes, through the remote communication network 205, collection of necessary data from the user site, arrangement for delivery/collection of cartridges and generation of charge information, and sending a notification concerning the arranged schedule and charge information to the user site.

<Sequence of Notification and Adjustment of Cartridge Exchange Schedule>

In the arrangement shown in FIG. 27, the procedures of transmitting a toner low signal from the user site 102 to the service center 101 and receiving the toner low signal by the service center 101 are the same as in FIG. 10 of the first embodiment. However, processing in the service center which has received the toner low signal is performed as in FIG. 28.

Figure 28:
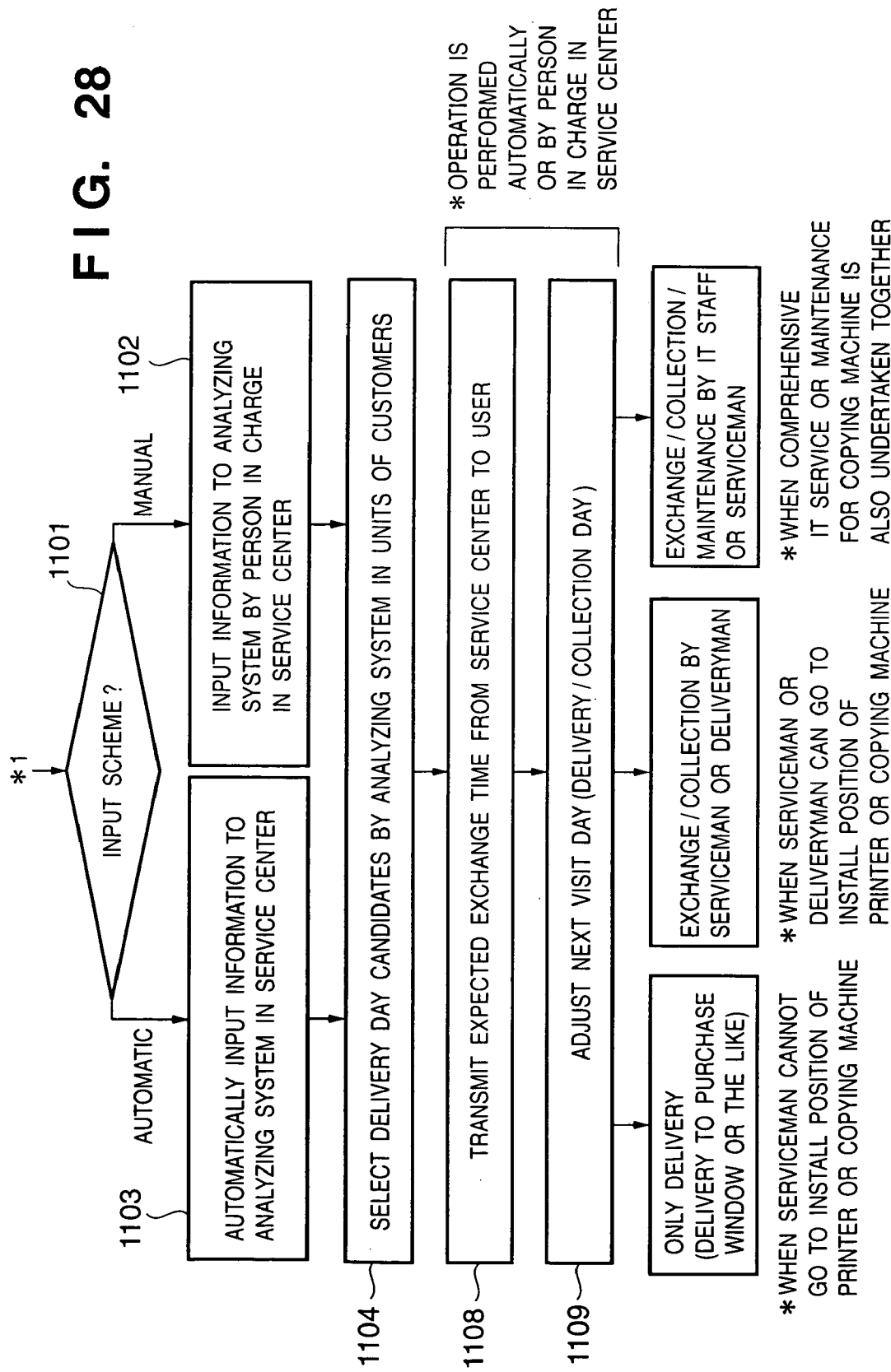
FIG. 28 is a flow chart showing a processing procedure in a service center which receives a toner low signal in the third embodiment.

Referring to FIG. 28, first, the processing branches in step 1101 depending on whether the data is automatically or manually input to the analyzing system of the service center 101. Step 1101 need not always be done in the service center. This is a pseudo step for expressing a processing procedure according to the arrangement of the service center. Actual processing in the service center starts from step 1102 or 1103 depending on its arrangement. In this embodiment, the analyzing system is implemented on the PC 203 by executing an analysis program based on a procedure to be described later by looking up the database in a database server 201.

In the manual input scheme, a window for notifying the person in charge of operation of reception of the toner low signal is displayed in step 1102, and the person in charge inputs the information to the analyzing system to manage the delivery schedule.

In the automatic input scheme, the received toner low signal and the data read out from the cartridge are directly input to the analyzing system (step 1103).

When the data are input to the analyzing system, the date of toner out is predicted by the analyzing system, and delivery day candidates are determined on the basis of the toner out day (step 1104). This prediction procedure will be described later. Subsequent steps may be manually executed, though they are automated in this case.

When the delivery day candidates are determined, the user is notified of the days as an expected exchange time (step 1108).

Upon receiving this notification, the user interface (UI) window shown in FIG. 13 is displayed at the user site 102 by a PC 208 as a window terminal. When the operator inputs an acknowledge (OK) for cartridge exchange in this window, the window is switched to that shown in FIG. 14. In this window, the operator inputs desired date and time from the expected exchange times.

The input designated day is transmitted to the service center 101. The service center 101 notifies the user of expected delivery/collection date and time determined on the basis of the designated day and requests final check (step 1109). FIG. 15 shows a window displayed on the user side at this time.

In accordance with the date and time determined by the above procedure, a serviceman or IT staff for maintenance or a delivery van for simply delivering goods is dispatched from the service center 101 to deliver/collect the cartridge and, as needed, execute maintenance of the device. The staff to be dispatched and operation contents depend upon the agreement between the user and the shop or maker that operates the service center.

In addition, the charge scheme (printing count charge scheme) depending on the number of printed paper sheets is asynchronous with delivery/collection of cartridges and therefore functions as in the first or second embodiment.

As described above, in this embodiment, a system which does not entrust a delivery agent with delivery operation on a network can be built. In this case, the same effects as in the first or second embodiment can be obtained.

[Fourth Embodiment]

Figure 29:
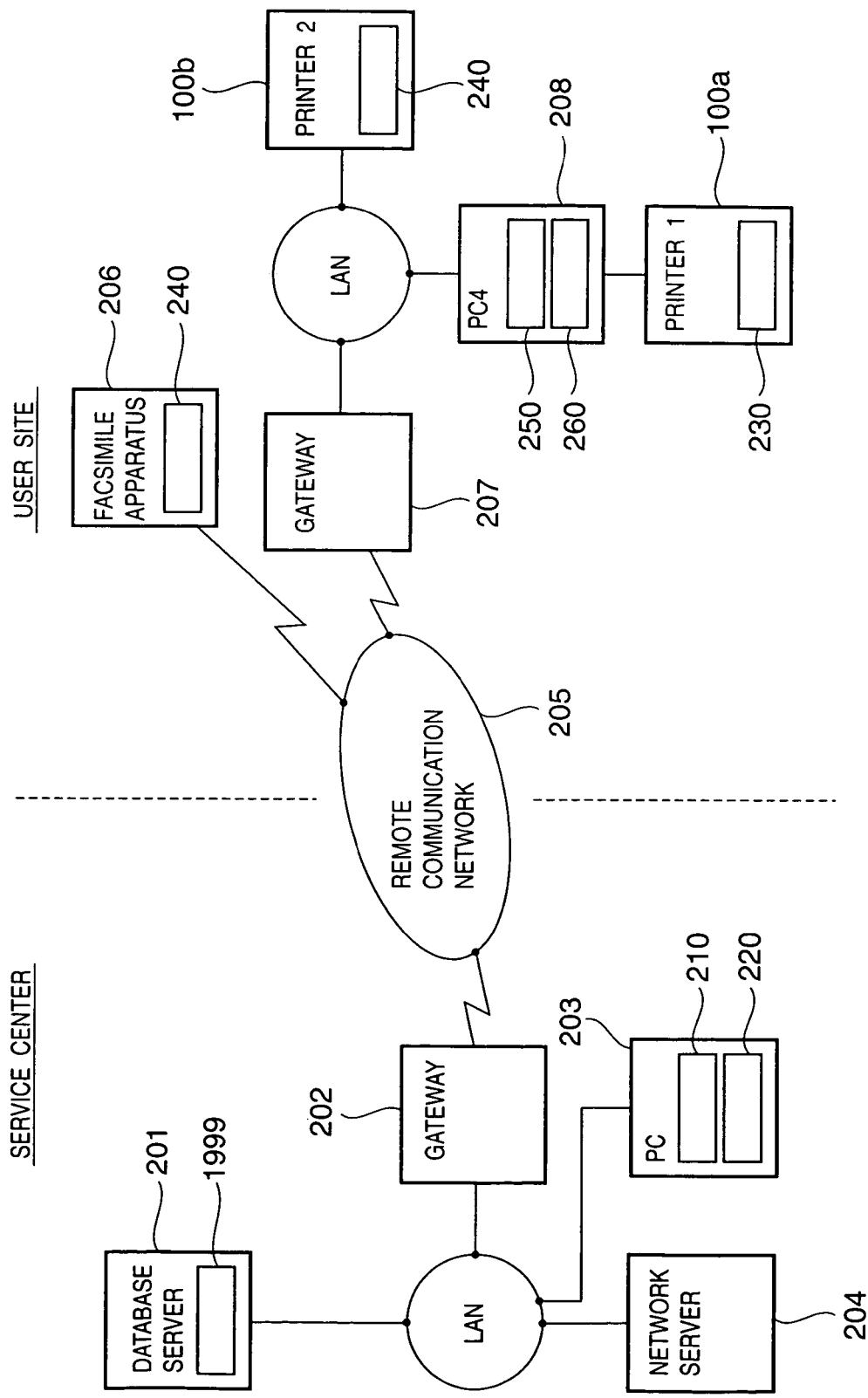
FIG. 29 is a view showing the arrangements of a user site and service center according to the third embodiment.

The basic arrangement of the system according to the fourth embodiment is the same as in the first embodiment except that the user site includes a stock management system. As shown in FIG. 29, a stock management system 260 is implemented by executing a predetermined program by PC 4 or the like at a user site 102. This stock management system 260 also manages the internal stock of toner cartridges and links with the cartridge management system. The computer on which the stock management system runs must be able to directly or even indirectly access a remote communication network 205.

FIG. 30 shows the procedure of transmitting and receiving a toner low signal from the user site 102 and receiving the toner low signal by a service center 101 in the fourth embodiment. First, a toner low is detected in, e.g., a printer 100*a* or 100*b* or facsimile apparatus 206 shown in FIG. 2, and the information is output as a toner low signal by the device module in step 2901. If the device is the facsimile apparatus 206 or printer 100*b*, the toner low signal is transmitted (S2901*a*) to a PC 208 on which the internal stock management system runs as the input signal to the stock management system 260.

If the device is a printer locally connected to the host, like the printer 100*a*, a toner low signal is issued to the host. In this case, the host receives the toner low signal in step 2902. After that, the toner low signal is transmitted from the host to the internal stock management system 260.

Upon receiving the toner low signal, the stock management system 260 determines the type of cartridge used by the device from the information of the transmission source of the toner low signal or information of the device ID/serial number or the cartridge type ID/serial number transmitted together with the toner low signal, and determines whether there is a stock (step 2903). If there is a stock, information representing it is displayed on the display of the PC 208 to call for user's attention (step 2904).

If it is determined that no stock is present, the toner low signal is transmitted from the stock management system 260 to the service center 101 in accordance with the connection form between the toner low signal transmitting device and the remote communication network 205. When the device can directly access the remote communication network 205, the toner low signal is directly transmitted to the service center (step 2907). When the device is connected through the host computer, the toner low signal is transmitted from the host to the service center 101 (step 2906). When the device cannot access the remote communication network online, the toner low signal is transmitted to the service center 101 by manual input by the operator (step 2905).

The thus transmitted toner low signal is received by the service center 101 (step 2908), and then, processing is executed by a service module 210 and user module 250 according to the same procedure as in FIG. 11.

With the above process, when the user manages the stock, a cartridge management system which uses the stock of the user can be built, in addition to the effects of the first and second embodiments.

[Fifth Embodiment]

In the first embodiment, processing of charging for the number of output paper sheets printed at the user site has been described with reference to FIG. 12, and device maintenance processing of containing a charge corresponding to the information related to the number of printed paper sheets in the maintenance service, and instructing to dispatch a serviceman who checks and repairs the printer basically without billing the user any charge except the charge corresponding to the information related to the number of printed paper sheets has been described with reference to FIG. 21.

In the fifth embodiment, a charge system capable of offering a more convenient maintenance service to the user will be described.

Figure 32:
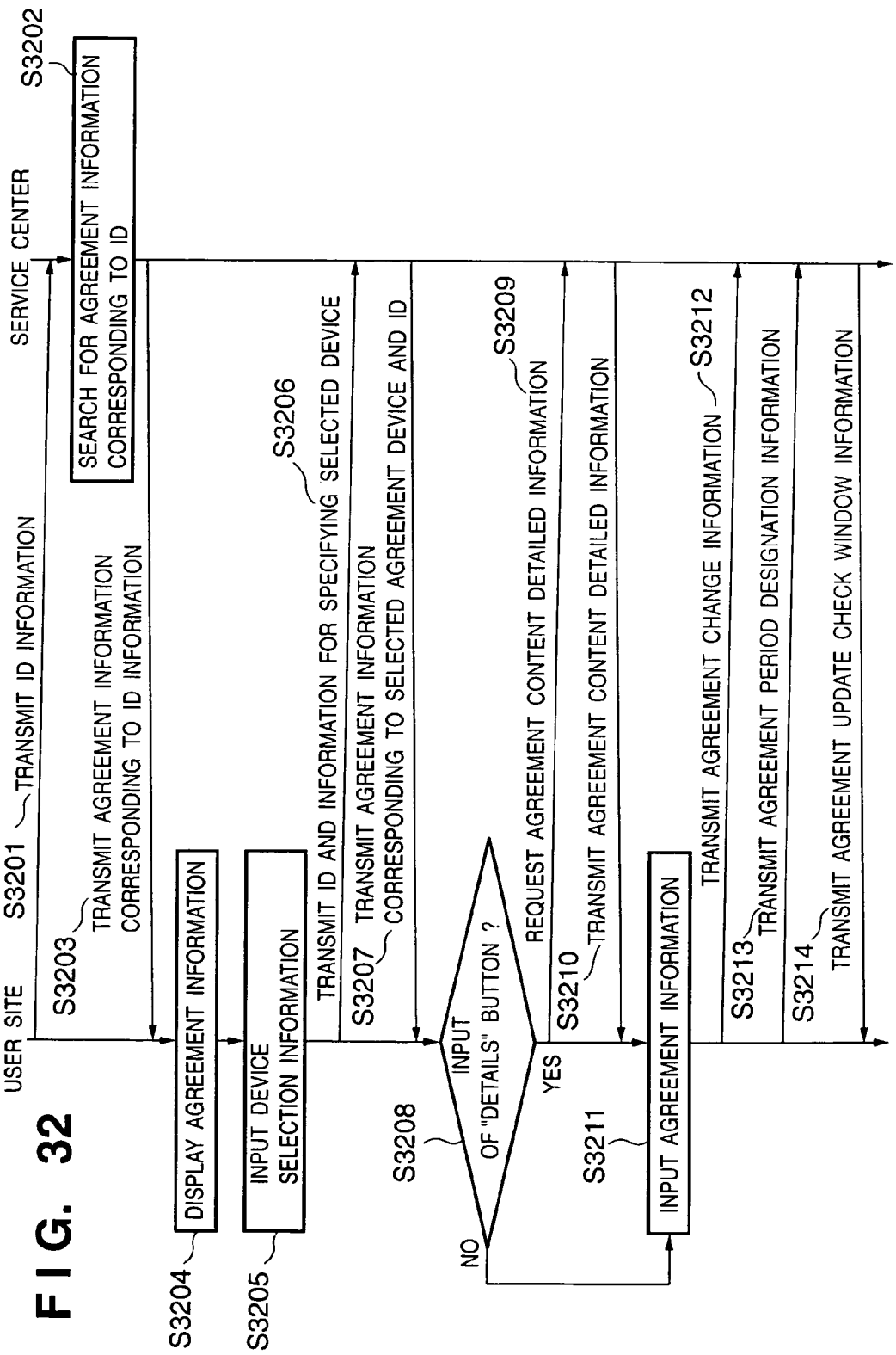
FIG. 32 is a flow chart showing agreement processing between a user site and a service center in the fifth embodiment.

FIG. 32 shows an outline of transmission/reception of data related to agreement processing between a user site and a service center. The user site and service center correspond to those in FIG. 1, respectively. In the processing operations in steps of FIG. 32, processing on the user site side is executed by the PC 208, and processing on the service center side is executed by the PC 203. The functions of the PCs 208 and 203 are the same as those described in the first to fourth embodiments, and their block diagrams correspond to FIG. 3. The processing in the PCs 208 and 203 is implemented by causing the CPU 301 to control processing based on program codes stored in any one of the ROM 307, RAM 302, and HD 303. The PC 203 cooperates with the database server 201 so that data management and data offer (data transmission to the user site) are performed by the CPU 301 on the basis of the data contents stored in the database server 201. The functions of the present invention can be implemented regardless of whether the PC 203 and database server 201 are physically separated or integrated as long as the functions of the present invention can be implemented by cooperation of the PC 203 and database 201.

The processing on the user site 102 need not always be executed by only the PC 208. In the present invention, the same function (e.g., function of allowing two-way communication with an external device through the remote communication network 205) as that of the PC 208 may be prepared in the device such as the printer 100*a* or 100*b* or facsimile apparatus 206 so that the device executes the processing. In this case, the device has the same block arrangement as in FIG. 6 or 7, and processing based on program codes stored in the storage section of the device is implemented under the control of the CPU 601 or 701.

The respective processing operations will be described below with reference to the flow chart of FIG. 32 and other drawings.

An ID is transmitted from the user site in step S3201.

The ID corresponds to an agreement ID which is linked with a specific user to specify agreement information for that user. A user ID will be described below.

The ID transmitted in step S3201 is information input to the PC 208 or a device through the display window. In the present invention, the PC 208 or 203 or a device preferably has a browser function capable of processing a language such as HTML or XML. The window for inputting the ID is generated by the PC 203 and transmitted when the user designates a URL or file specifying information. The window is displayed on the display section of the PC 208 or device. When a window for prompting the user to input login information is displayed before the display of the ID input window, any illicit access can be prevented. The function of the present invention is not limited to the browser function, and any other function for supporting two-way communication can be used.

Here, ID information transmission from the user site to the service center is executed by a device module 240, a device module 230, a user module 250 of the host computer or the stock management system 260 described above, which transmits data from the device to the service center.

Agreement information corresponding to the ID transmitted from the user site is searched for in step S3202.

The information found by the search in step S3202 is transmitted from the service center to the user site in step S3203.

Display processing for the information transmitted in step S3203 is executed by the device on the user site side in step S3204. This display processing is done on a display section provided on a PC 208, printer 100*a*, or the like at the user site. The display section corresponds to a display 304 in FIG. 3, an operation section 607 in FIG. 6, or an operation section 707 in FIG. 7.

FIGS. 33 to 41 shows

The display examples (display information) shown in FIGS. 33 to 41 discribed later show data managed in a storage section of a database server 201, PC 203, or the like on the service center side. These data are transmitted to the user site side and displayed on the display section of printers 100*a* and 100*b*, facsimile apparatus 206, or PC 208. The data shown in FIGS. 13–16, 22A and 22B are also displayed as the same manner as described above.

FIG. 33 shows a display example in step S3204 in which agreement contents (3306) for each device model (3305) are displayed. A change in agreement contents for each device will be described below. The device type 3305 in FIG. 33 is not limited to the printer. A device such as a facsimile apparatus, copying machine, or personal computer can also be assumed. Also, the display examples shown in FIGS. 34–41 are not limited to a printer.

FIG. 34 also shows a display example in step S3204 in which, as pieces of display information, user devices (3401), ID (3402) corresponding to the devices, agreement situations (3403), the numbers (3404) of output paper sheets of the devices, output unit prices (3405) per print, which correspond to the agreement situations, charge amounts (3406) based on the numbers of output paper sheets and the output unit prices per print, and agreement periods (3407) corresponding to the devices are displayed. The number (3404) of output paper sheets of each device has a form corresponding to the number of uncharged paper sheets. In the present invention, display of the total number of printed paper sheets in the agreement period, and the total number of printed paper sheets for a predetermined period such as a month or week is also assumed. Since the pieces of display information as in FIG. 34 can be browsed at the user site, the user can clearly know which device need update of the agreement in updating the agreement. The way for the obtaining the number 3404 of output paper sheets of each device and each expendable at the service center is the same as that described in the first, second, and third embodiments, and a detailed description thereof will be omitted.

In step S3205, information for specifying devices covered by the agreement processing is input in accordance with an instruction input to a check box 3304 shown in FIG. 33.

In step S3206, the information of the devices input in step S3205 is transmitted from the user site to the service center together with the ID (ID in step S3201).

In the service center, detailed information based on the ID and information for specifying devices covered by the agreement, which are transmitted from the user site in step S3206, is searched for, and the search result is transmitted to the user site (S3207).

Figure 35:
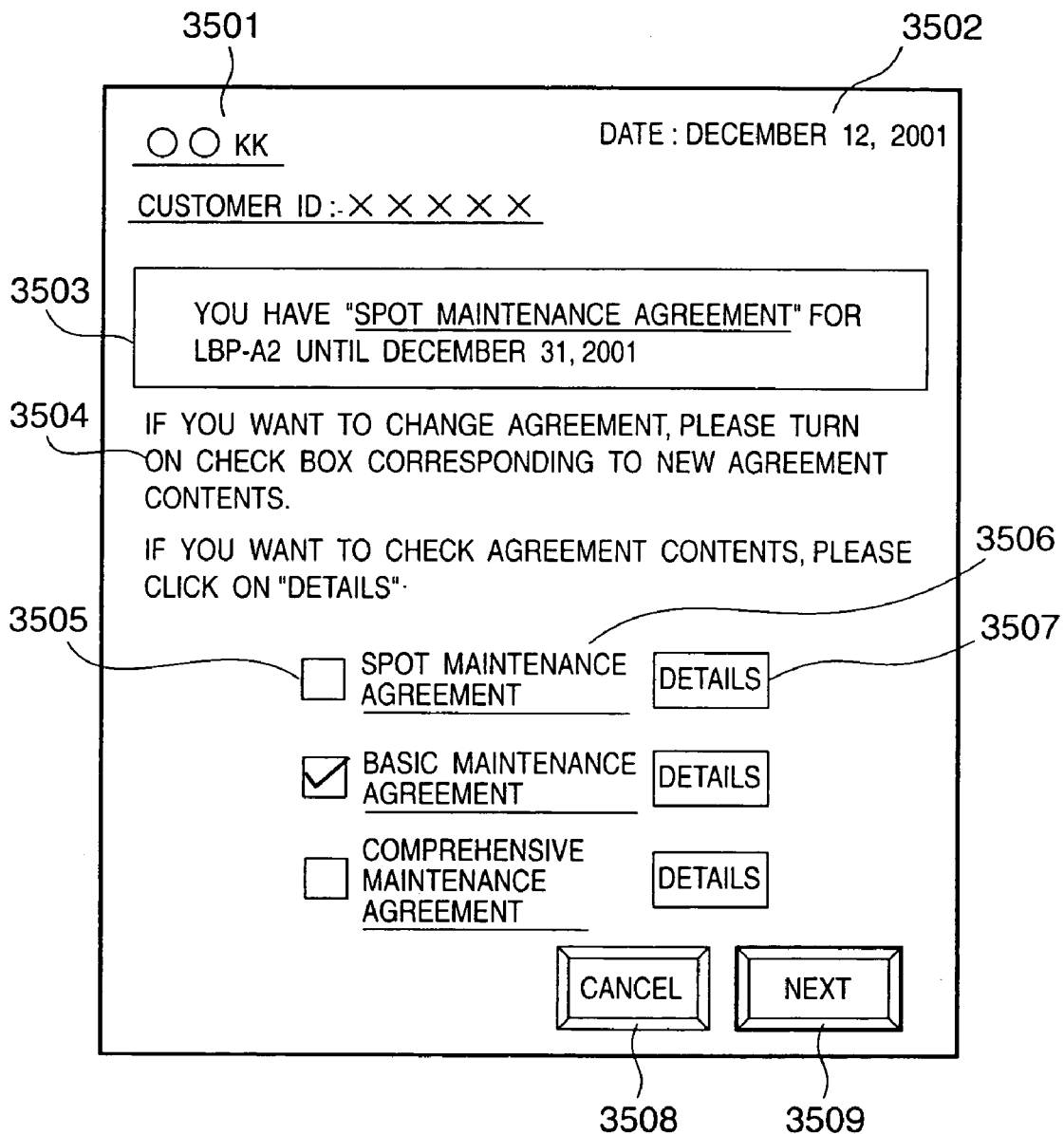
FIG. 35 is a view showing a UI window for a change in agreement or contents stored in the database server in the fifth embodiment.

FIG. 35 shows a display example of information at the user site, which is transmitted in step S3207. The display example shown in FIG. 35 indicates a result of selection of the LBP-A2 (this means the second laser beam printer or LBP) in FIG. 33. A portion 3503 shows that " " spot maintenance agreement" is made for the LBP-A2 until Dec. 31, 2001". A check box 3505 is turned on by the user to select agreement contents to be changed. When the user inputs to this check box, a mark which can be identified by the user is added to the window. An instruction button 3507 is clicked to display detailed information of the agreement contents. When this instruction button is clicked, details of the agreement contents are displayed on the window. To display such detailed contents, an instruction button 3307 is also displayed in FIG. 33. Thus allows the user to check the agreement contents in advance.

FIGS. 36 and 37 show data stored and managed by the database server 201 of the service center. These data are transmitted to the user side (S3210) and browsed in accordance with instruction information and ID of the "details" button 3505 or 3507 in FIG. 35 or 33 (S3209) described above. Details of agreement contents shown in FIGS. 36A and 36B will be described here.

(Spot Maintenance Agreement)

A spot maintenance agreement includes only the charge for use of CRGs (cartridges). Charges for dispatch, repair, and components are paid every time repair is done.

(Basic Maintenance Agreement)

In a basic maintenance agreement including not only the charge for use of CRGs but also the periodical visit maintenance cost, repair is done without any charges for it, e.g., charges for dispatch, repair, and components, independently of the number of times of repair unless the charge for repair in the agreement period exceeds the upper limit. Any charge beyond the upper limit is paid as an expense. Referring to FIG. 36B, the upper limit amount for each model is stored and managed by the database server 201, as in FIG. 34.

(Comprehensive Maintenance Agreement)

In a comprehensive maintenance agreement including not only the charge for use of CRGs but also the periodical visit maintenance cost during the agreement period, repair is done without any charges for it, e.g., charges for dispatch, repair, and components, independently of the number of times and amount of repair, without exception.

The user can select/change the agreement conditions in units of arbitrary periods. For example, the user can select the spot maintenance agreement in the first year from purchase of a printer assuming that the malfunction frequency is low, the basic maintenance agreement in the second year, and the comprehensive maintenance agreement from the third year.

The types and contents of agreements are not limited to these three types. For example, such an agreement can also be made that an instruction button for selecting whether an option for an image forming apparatus, such as an HD or sorter used for scanner or reserved printing, is to be used is provided on the window shown in Fig, 33 or the like, and the charge for use of the option is included in the charge amount of the number of output paper sheets. In this case, a charge table is assumed in which data is stored and the charge for use of the option is additionally made to correspond to the amount per print in the charge table shown in FIG. 37 (to be described later).

FIG. 37 shows data representing the charge amount per printed and output paper sheet according to the agreement contents. Charge amounts per printed and output paper sheet for the respective maintenance agreements corresponding to the LBP-A, B, C, and D are shown. As described above, there are both charge amount in the charge table, which includes or does not include the maintenance cost per print. When the maintenance cost is included, the amount is large. When the information for specifying the device is transmitted to the service center in step S3206, the convenience for the user can be improved by transmitting only charge table display information corresponding to the specified device from the service center to the user site as information to be browsed by the user.

In the present invention, the charge amount to the user is calculated by the service center in accordance with the number of printed and output paper sheets of the image forming apparatus and the amount per print obtained from the charge table as show in FIGS. 34 and 37. Acquisition of the information of the number of printed and output paper sheets of the image forming apparatus at the user site by the service center is the same as that described in FIG. 12, 17B, 24, or 27 of the first to the third embodiments, and a detailed description thereof will be omitted.

The data shown in FIGS. 36 and 37 can be displayed either simultaneously or selectively. Although not illustrated, when a "return" instruction button or the like is prepared to return the window to that immediately precedingly browsed, the display can be returned to the window in FIG. 33 or 35.

When the "details" button is not clicked in step S3208 (NO in step S3208), or after processing in steps S3209 and S3210 is executed, agreement information which specifies the type of agreement in accordance with the instruction through the window shown in FIG. 35 by the user is input in step S3211.

Figure 38:
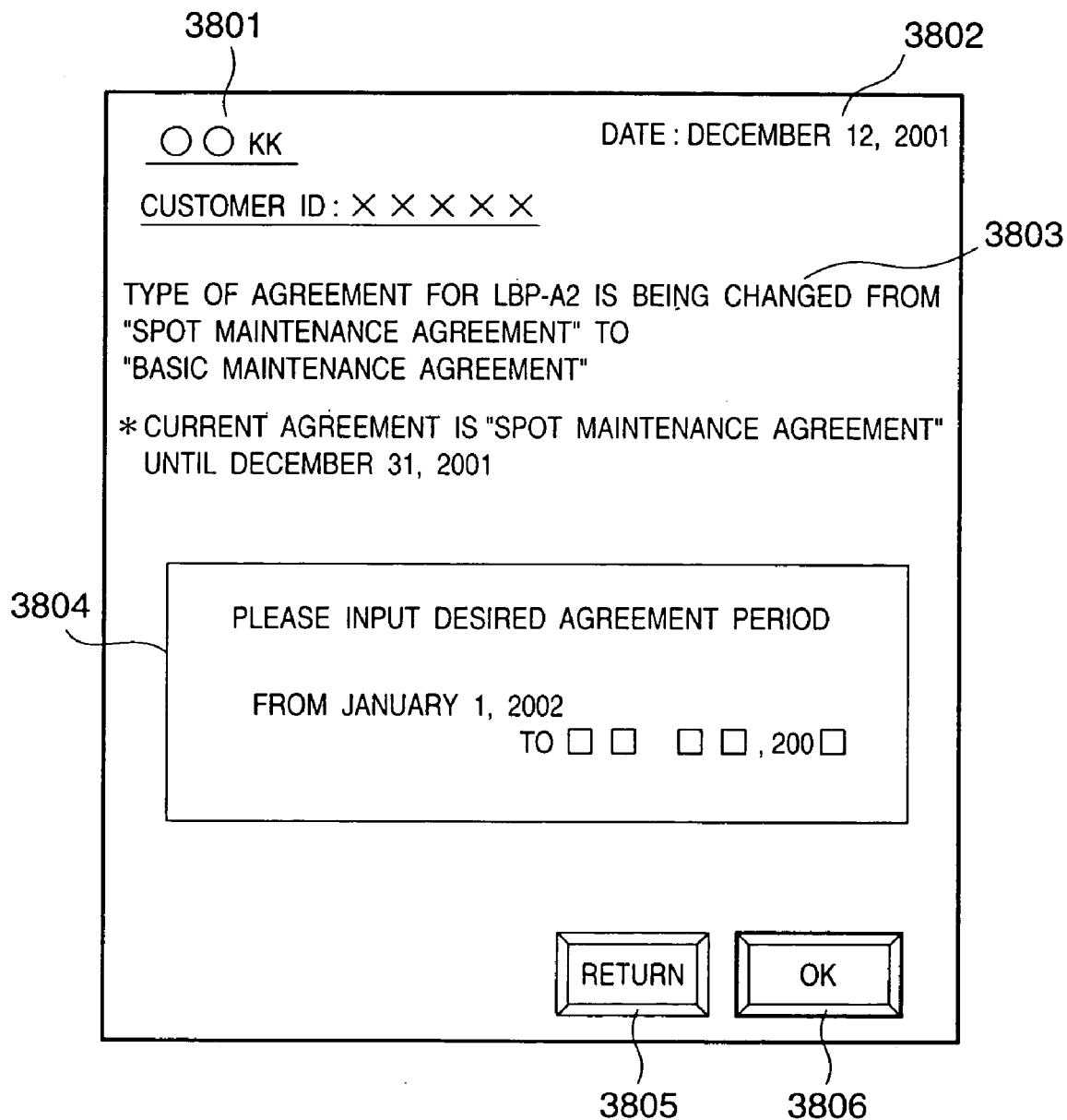
FIG. 38 is a view showing a UI window for designating the agreement period in the fifth embodiment.

In step S3212, agreement update information (corresponding to an input to a button 3509 in FIG. 35) is transmitted from the user site to the service center. This agreement update information contains at least information for specifying a maintenance form for a given device, which is generated through the window shown in FIG. 35, and an ID. Upon receiving the information transmitted in step S3212, the service center transmits information for designating the agreement period to the user site (not shown). FIG. 38 shows a display example.

In step S3213, when the agreement period is input through a dialog box 3804 in FIG. 38, and an "OK" button 3806 is clicked, period designation information for the new agreement is transmitted from the user site to the service center together with the ID information and the information specifying the device and the type of agreement.

Figure 39:
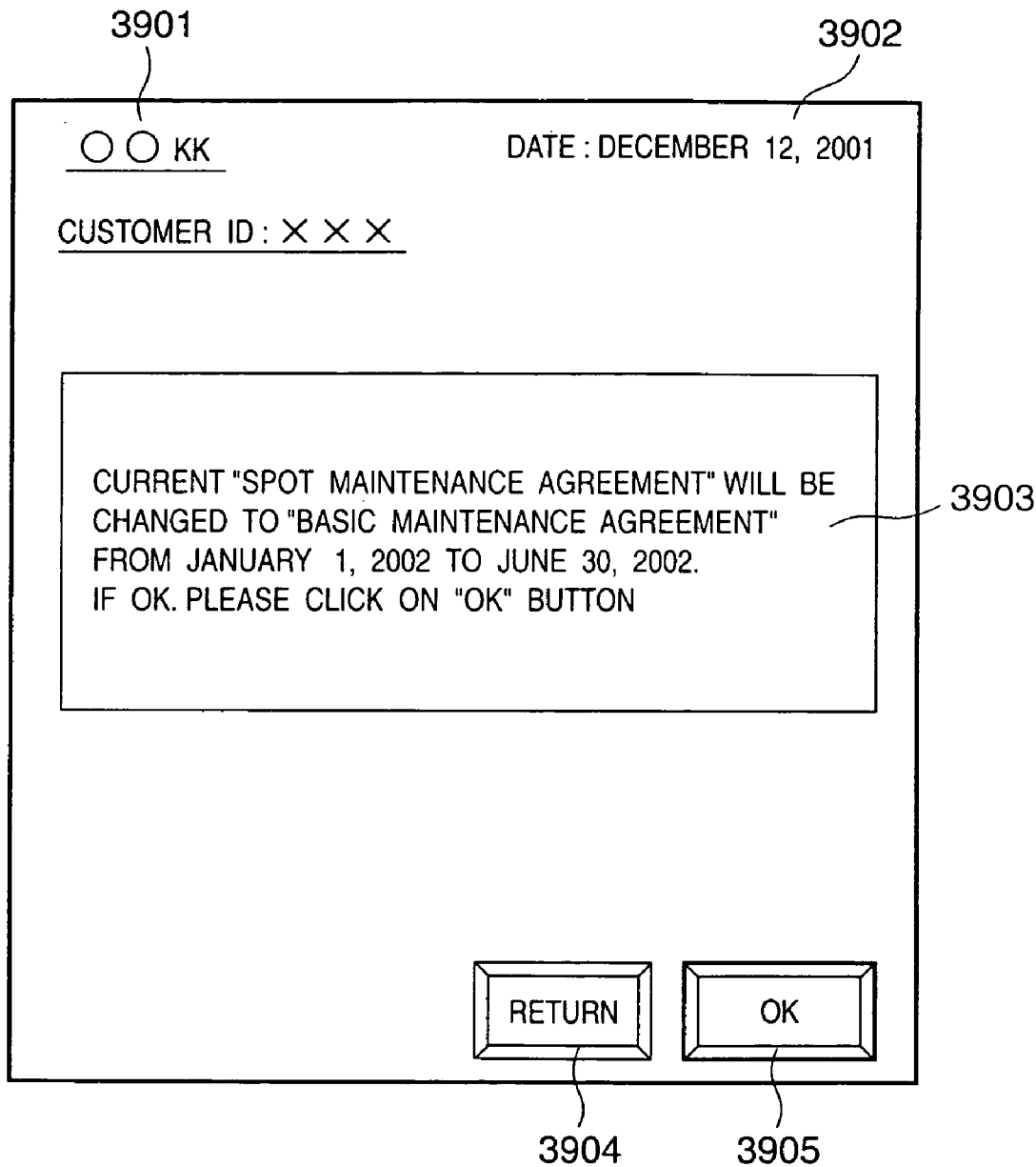
FIG. 39 is a view showing a UI window for checking a change in agreement in the fifth embodiment.

Agreement check window information in step S3213 is transmitted from the service center to the user site in step S3214. FIG. 39 shows a display example at the user site. If the user agrees with it (click on an approval button 3905 in FIG. 39), information representing approval is transmitted from the user site to the service center.

Figure 40:
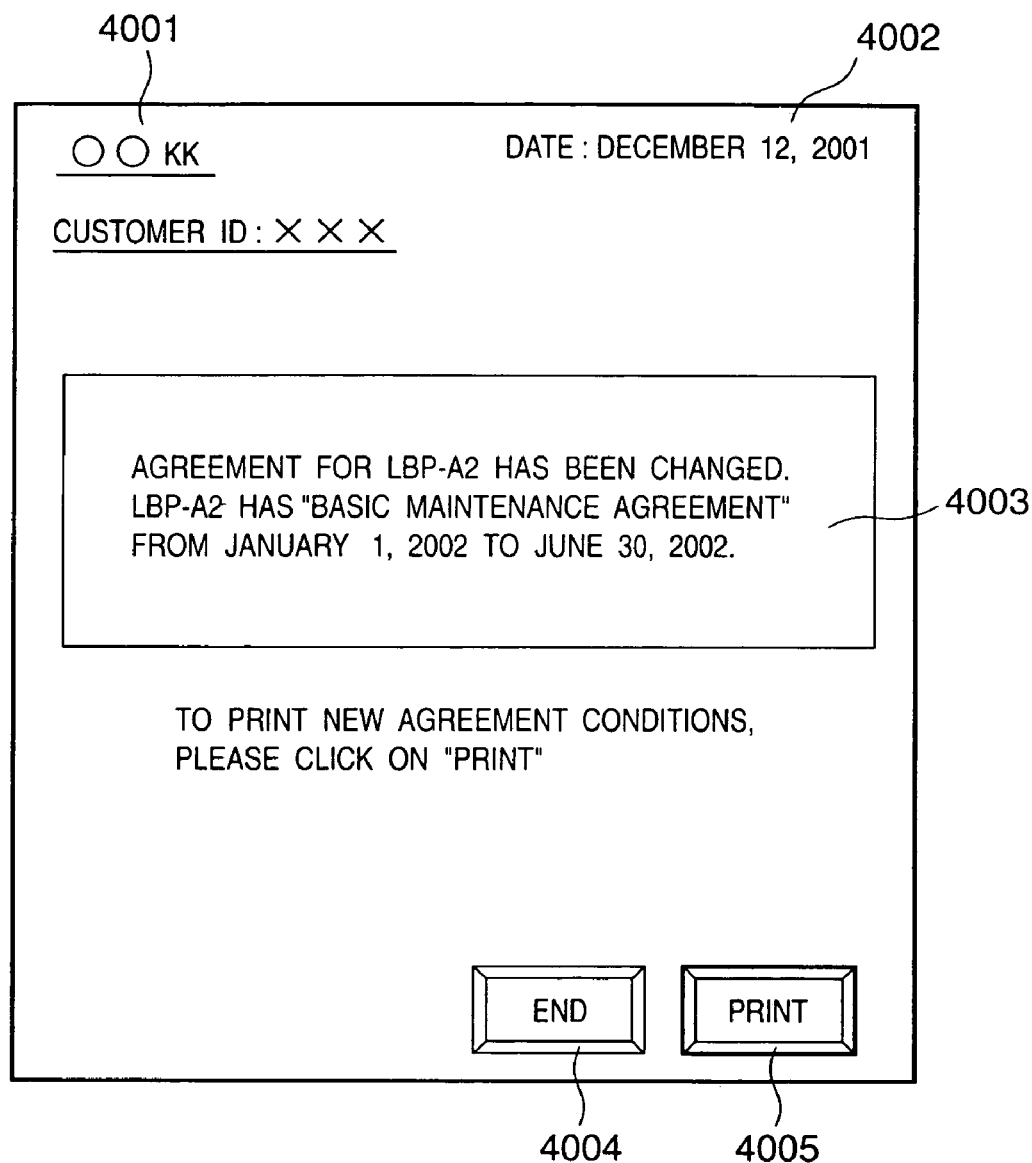
FIG. 40 is a view showing a UI window for checking determination of a change in agreement in the fifth embodiment.

Upon receiving the approval information, the service center transmits information as shown in FIG. 40 to the user site (not illustrated in the flow). This display information contains instruction button information (4005) for executing printing. When this button is clicked, printing corresponding to the displayed information is executed. For this printing, when the device which is displaying the information in FIG. 40 is a personal computer (PC), a printer or the like connected to the PC executes output processing, and when the device which is displaying the information in FIG. 40 is a device such as a printer apparatus, the apparatus executes output processing.

Agreement information management in the server after the processing shown in FIG. 40 will be described. When the agreement contents of the user are finally changed in FIG. 40, or a change will be made in a designated period, the window shown in FIG. 34 is changed to contents including the new agreement contents, and the contents of data corresponding to them are also changed. The changed data are stored in the storage section of the database server 201 or PC 203 on the service center side and can also be browsed by the user.

Referring to FIG. 35, as agreement information for the LBP-A2, the "spot maintenance agreement" is made until Dec. 31, 2001. When the user instructs to make the "basic maintenance agreement" from Jan. 1, 2002 to Jun. 30, 2002 through the user interfaces shown in FIGS. 35, 38, and 39, the display in FIG. 34 is changed to that in FIG. 41. The pieces of information stored in the storage section of the database server 201 or PC 203 are also changed to those shown in FIG. 41. When the database server 201 or PC 203 recognizes that the model is LBP-A, and the "spot maintenance agreement" is changed to the "basic maintenance agreement", the storage table in FIG. 37 is looked up, the unit price per print is changed from 10 yen to 13 yen, and data as shown in FIG. 41 are created and managed. Referring to FIG. 41, a model (4108) with an agreement and a model (4109) for which an agreement is to be made are displayed such that they can be identified. Data corresponding to them are stored in the database server 201 or PC 203. This embodiment also assumes to discernibly display models for which agreements have matured.

Management tables as shown in FIGS. 34 and 41 described above are stored and managed by the database server 201 or PC 203. In this arrangement, use situation information such as the number of printed paper sheets transmitted from the user site together with the ID is received, and information of the payable amount is transmitted at every predetermined period to the user on the basis of the received number of printed paper sheets of each ID and the tables shown in FIGS. 34 and 41. A display example displaying information of payable amount, which is displayed for the user, corresponds to the display example shown in FIG. 16.

Examples of ID to be transmitted from the user site together with the use situation information are a user ID, model ID (machine ID), and agreement ID. These pieces of ID information are stored in a nonvolatile memory provided in a cartridge or a nonvolatile memory provided in an image forming apparatus, or a storing section in PC 208, and these ID information specify of which use status information corresponds to each device.

The mechanism for transmitting from the user site to the service center use situation information such as the number of output paper sheets of each image forming apparatus (printer 100a or 100b, or facsimile apparatus 206) or each expendable together with the ID is the same as that described in FIG. 12, 17B, 24, or 27 of the first to third embodiments. That is, in the present invention, the use situation information may be transmitted from the PC 208 together with the ID or from the device main body together with the ID. The ID transmitted together with the use situation information of the image forming apparatus or expendable is preferably the same as an ID (user ID) for specifying agreement information for a specific user in step S3201 of FIG. 32. However, the present invention can also be achieved even with another ID.

Other application examples of the above fifth embodiment will be described below.

(1) In the description of steps S3201 to S3204 of FIG. 32, a user ID is exemplified as an ID for specifying agreement information for a user. However, the present invention is not limited to the user ID and can also be applied to, e.g., "ID of the device main body", "expendable ID" of a toner cartridge or the like, or "agreement ID corresponding to a specific device or expendable". For example, when the ID of the device main body, the expendable ID, or the agreement ID corresponding to a specific device or expendable is applied to the ID to be transmitted from the user site to the service center in step S3201 of FIG. 32, the processing operations in the respective steps of FIG. 32 are executed for the specific device or expendable. This is useful, e.g., when the model whose agreement is to be changed is specified in advance.

(2) In the display example in step S3204, the agreement contents corresponding to the device main body of the image forming apparatus are displayed. However, in the present invention, the agreement contents for each expendable (e.g., cartridge) may also be displayed by linking the expendable ID with the ID (user ID) transmitted in step S3201. The ID of each expendable is managed by the database server 201 in a link to the user ID. The expendable used by the user can be searched for by the CPU 301 on the basis of the user ID, and agreements are managed in units of expendable ID. In combination with the mechanism for acquiring use situation information such as the number of printed/output paper sheets of each expendable by the service center, which is described in the first to third embodiments, charging per print is executed in accordance with the agreement contents for a specific expendable. Additionally, when an expendable has a storage means for storing an ID, the expendable ID can be recognized by the device to which the expendable is attached even when it is used by a plurality of devices covered by the agreement. For this reason, in the present invention, the agreement and use situation of an expendable used by a plurality of devices can be managed. As described above, when the ID of each expendable is managed, the ID in each step of FIG. 32 corresponds to the expendable ID, and each display window is displayed not for devices but for expendables.

(3) When the database server 201 installed in the service center manages pieces of information including the use situation, malfunction situation, and use period of the image forming apparatus of a specific user, generates or searches for appropriate maintenance agreement information among those of which shown in FIGS. 36A and 36B in accordance with the managed information, and notifies the user of the maintenance agreement information, a maintenance service according to the exhaustion state of the image forming apparatus can be easily offered to the user. For example, malfunction information of the user device (e.g., a printer), as described with reference to FIG. 21 of the first embodiment, can be stored in the database server 201, and the user can be notified of appropriate agreement contents in advance in accordance with the model and malfunction situation.

In the present invention, as a service form, a plurality of agreements such as the "comprehensive maintenance agreement", "basic maintenance agreement", and "spot maintenance agreement" shown in FIG. 35 can be automatically switched. For example, when appropriate agreement information corresponding to the use situation (the total number of printed and output paper sheets and various malfunction situations) of each device model is stored in the database server 201 in advance, and malfunction information of the user device as described with reference to FIG. 21 is received, an appropriate maintenance agreement can be automatically offered to the user. Furthermore, when the maintenance agreement contents are automatically changed, and e-mail for notifying the user that the agreement information storage contents in the database server 201 are updated is transmitted to prompt the user to check it, the maintenance agreement can be automatically changed with user's check.

<Effects of Fifth Embodiment>

According to the cartridge management system of the above-described embodiment, the following effects can be obtained.

(1) Since the charge amount per paper sheet printed and output from the device includes the maintenance cost, a system which flexibly copes with a change in maintenance agreement contents by the user can be provided. When the charge table as shown in FIG. 37 is prepared in the service center, the charge per printed and output paper sheet can be set in units of devices, expendables, and users, so a system for offering a maintenance agreement that meets each user's requirement can be built.

(2) The user can arbitrarily select a plurality of agreement conditions such as the spot maintenance agreement, basic maintenance agreement, and comprehensive maintenance agreement through the user interfaces shown in FIGS. 33, 35, and 38 in accordance with the desired maintenance form. The user can select/change the agreement conditions in units of arbitrary periods. For example, the user can select the spot maintenance agreement in the first year from purchase of a printer assuming that the malfunction frequency is low, the basic maintenance agreement in the second year, and the comprehensive maintenance agreement from the third year.

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is achieved even by recording, in a storage medium, the program codes of the procedures, shown in FIGS. 10 to 12, 17 and 18, 21, 24, 28, 30, and 32, for implementing the functions of the above-described first to fifth embodiments divisionally for the device module, user module, and service module in accordance with the execution entities, supplying the storage medium (or recording medium) to the device and personal computers as the execution entities, and causing them (or a CPU or MPU) to read out and execute the program codes stored in the storage medium.

In this case, the program codes read out from the storage medium implement the functions of the above-described embodiments by themselves, and the storage medium which stores the program codes constitutes the present invention.

The functions of the above-described embodiments are implemented not only when the readout program codes are executed by the computer but also when the operation system (OS) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

The present invention can be applied not only to toner but also to any expendables such as a photosensitive drum, fixing member, and cleaning member.

As has been described above, according to the present invention, the following effects can be obtained.

(1) Since the exhaustion time of expendables is predicted, and the expendables are exchanged at that time, the expendables can be used up, and this contributes to resource savings and prime cost reductions.

(2) Even when the user uses a plurality of devices, all expendables used in these devices can be charged for together. For this reason, charging and maintenance can be done in units of users.

As many apparently widely different embodiments of the present invention can be made without departing from the spirit and scope thereof, it is to be understood that the invention is not limited to the specific embodiments thereof except as defined in the appended claims.

What is claimed is:

1. A remote managing system for managing plural image forming apparatuses and plural types of maintenance agreements relating to the image forming apparatuses, comprising:
   a receiver that receives information of a number of printed paper sheets output by an image forming apparatus, together with an identifier of the image forming apparatus, via a communication path;
   a memory that stores a variety of unit prices per paper sheet to be output by each of the image forming apparatuses, wherein each of the variety of unit prices is associated with an identifier of an image forming apparatus and a type of maintenance agreement for the image forming apparatus; and
   a calculation section that calculates a payable amount for an image forming apparatus having the identifier on the basis of (i) the number of printed paper sheets received by said receiver, associated with the identifier and (ii) a unit price of the variety of unit prices, stored in said memory, associated with the identifier and the type of maintenance agreement for the image forming apparatus.

2. The system according to claim 1, wherein said memory stores a first unit price per printed sheet in correspondence with an agreement of a first type and a second unit price per printed sheet in correspondence with an agreement of a second type,
   wherein the contents of services under each of the agreements of the first type and the second type differ from each other, and
   wherein the amount of the second unit price is an additional amount of the first unit price and a predetermined amount.

3. The system according to claim 1, further comprising an input section that inputs an instruction for instructing an agreement sent from an external computer, input through an agreement instruction window displayed by the external computer,
   wherein said calculation section calculates the payable amount based upon (i) a unit price per printed sheet in accordance with the agreement instructed by the instruction input by said input section and (ii) the number of printed sheets received by said receiver.

4. The system according to claim 3, further comprising a retrieval section for retrieving agreement information of a suitable agreement based upon running information, based on the information of the number of paper sheets, of the image forming apparatuses, and
   an information section that informs a user of a result of retrieval by said retrieval section.

5. The system according to claim 1, further comprising a an input section that inputs an instruction sent by an external computer for instructing (i) a type of agreement and (ii) a period of the type of agreement input through an agreement instruction window displayed by the external computer,
   wherein said calculation section calculates the payable amount in the instructed period input by said input section based upon (i) a unit price per printed sheet in accordance with the type of agreement in the instructed period and (ii) the number of printed sheets is a number of sheets printed during the instructed period.

6. A remote managing method of calculating a charge for use of each of a plurality of image forming apparatuses by a user, comprising the steps of:
   receiving information of a number of printed paper sheets output by an image forming apparatus, together with an identifier of the image forming apparatus, via a communication path;
   storing a variety of unit prices per paper sheet to be output by each of the image forming apparatuses, wherein each of the variety of unit prices is associated with an identifier of an image forming apparatus and a type of maintenance agreement for the image forming apparatus; and
   calculating a payable amount for use of an image forming apparatus having the identifier on the basis of (i) the number of printed paper sheets, received in said receiving step, associated with the identifier and (ii) a unit price of the variety of unit prices, stored in said storing step, associated with the identifier and the type of maintenance agreement for the image forming apparatus.

7. The method according to claim 6, wherein said storing step stores a first unit price per printed sheet in correspondence with an agreement of a first type and a second unit price per printed sheet in accordance with an agreement of a second type,
   wherein the contents of services under each of the agreements of the first type and the second type differ from each other, and
   wherein the amount of the second unit price is an additional amount of the first unit price and a predetermined amount.

8. The method according to claim 6, further comprising an inputting step of inputting an instruction for instructing an agreement sent from an external computer, input through agreement instruction window displayed by the external computer,
   wherein said calculating step calculates the payable amount based upon (i) a unit price per printed sheet in accordance with the agreement instructed by the instruction input in said inputting step and (ii) the number of printed sheets received in said receiving step.

9. The method according to claim 8, further comprising:
   a retrieving step of retrieving agreement information of a suitable agreement based upon running information, based on the information of the number of paper sheets, of the image forming apparatuses; and
   an informing step of informing a user of a result of retrieval by said retrieval step.

10. The method according to claim 6, further comprising an inputting step for inputting an instruction sent by an external computer for instructing (i) a type of agreement and (ii) a period of the type of agreement input through an agreement instruction window displayed by the external computer, wherein said calculating step calculates the payable amount in the instructed period input by said input step based upon (i) a unit price per printed sheet in accordance with the agreement in the instructed period and (ii) the number of printed sheets is a number of sheets printed during the instructed period.

11. A computer program stored on a computer-readable medium for a remote managing method for calculating a charge for use of each of a plurality of image forming apparatuses by a user, comprising codes for the steps of:

receiving information of a number of printed paper sheets output by an image forming apparatus, together with an identifier of the image forming apparatus, via a communication path;

storing a variety of unit prices per paper sheet to be output by each of the image forming apparatuses, wherein each of the variety of unit prices is associated with an identifier of an image forming apparatus and a type of maintenance agreement for the image forming apparatus; and calculating as payable amount for use of an image forming apparatus having the identifier on the basis of (i) the number of printed paper sheets, received in said receiving step, associated with the identifier and (ii) a unit price of the variety of unit prices, stored in said storing step, associated with the identifier and the type of maintenance agreement for the image forming apparatus.

12. The program according to claim 11, wherein said storing step stores a first unit price per printed sheet in correspondence with an agreement of a first type and a second unit price per printed sheet in correspondence with an agreement of a second type, wherein the contents of services under each of the agreements of the first type and the second type differ from each other, and wherein the amount of the second unit price is an additional amount of the first unit price and a predetermined amount.

13. The program according to claim 11, further comprising a step of inputting an instruction for instructing an agreement sent from an external computer, input through an agreement instruction window displayed by the external computer, wherein said calculating step calculates the payable amount based upon (i) a unit price per printed sheet in accordance with the agreement instructed by the instruction input in said inputting step and (ii) the number of printed sheets received in said receiving step.

14. The program according to claim 11, further comprising:

a step of retrieving agreement information of a suitable agreement based upon running information of the image forming apparatuses based on the information of the number of paper sheets; and a step of informing a user of a result of retrieval by said retrieval step.

15. The program according to claim 11, further comprising an inputting step for inputting an instruction sent by an external computer for instructing (i) a type of agreement and (ii) a period of the type of agreement input through an agreement instruction window displayed by the external computer, wherein said calculating step calculates the payable amount in the instructed period input in said input step based upon (i) a unit price per printed sheet in accordance with the agreement in the instructed period and (ii) the number of printed sheets is the number of sheets printed during the instructed period.

* * * * *

UNITED STATES PATENT AND TRADEMARK OFFICE
CERTIFICATE OF CORRECTION

PATENT NO. : 7,158,946 B2
APPLICATION NO. : 09/781162
DATED : January 2, 2007
INVENTOR(S) : Sato et al.

It is certified that error appears in the above-identified patent and that said Letters Patent is hereby corrected as shown below:

PAGE TWO OF COVER SHEET:
(56) Foreign Patent Documents,

"JP    11-103291    10/2006" should read
-- JP    11-103291    4/1999 --.

SHEET 27:
FIG. 27, "COLLECTE" should read -- COLLECT --.

SHEET 30:
FIG. 30, "STSTEM" should read -- SYSTEM --.

COLUMN 1:
Line 15, "such" should read -- such as --; and
Line 67, "grasped" should read -- grasped. --.

COLUMN 5:
Line 56, "embodiment;" should read -- embodiment. --.

COLUMN 7:
Line 16, "need" should read -- needs to --.

COLUMN 8:
Line 65, "re-freed" should read -- re-feed --.

COLUMN 9:
Line 1, "re-freed" should read -- re-feed --.

COLUMN 13:
Line 28, "tan" should read -- than --;
Line 40, "need only" should read -- needs only the --;
Line 57, "Detailed" should read -- Details --; and
Line 62, "shows" should read -- show --.

COLUMN 14:
Line 33, "paper" should read -- paper sheets --.

COLUMN 16:
Line 18, "from" should read -- from a --.

UNITED STATES PATENT AND TRADEMARK OFFICE
CERTIFICATE OF CORRECTION

PATENT NO. : 7,158,946 B2
APPLICATION NO. : 09/781162
DATED : January 2, 2007
INVENTOR(S) : Sato et al.

It is certified that error appears in the above-identified patent and that said Letters Patent is hereby corrected as shown below:

<u>COLUMN 18</u>:
Line 55, "particulars" should read -- particular --.

<u>COLUMN 21</u>:
Line 60, "malefaction" should read -- malfunction --.

<u>COLUMN 23</u>:
Line 27, "different" should read -- different in --.

<u>COLUMN 25</u>:
Line 34, "like" should read -- like is --; and
Line 61, "tan" should read -- than --.

<u>COLUMN 29</u>:
Line 15, "shows" should read -- show examples of display information. --;
Line 22, "as" should read -- in --;
Line 34, "ID" should read -- IDs--;
Line 48, "device" should read -- devices --; and
Line 49, Delete "the" third occurrence.

<u>COLUMN 30</u>:
Line 2, " " " spot" should read -- " "spot --; and
Line 56, "Fig, 33" should read -- FIG. 33 --.

<u>COLUMN 31</u>:
Line 1, "amount" should read -- amounts --.

<u>COLUMN 33</u>:
Line 27, "ID." should read -- IDs. --.

<u>COLUMN 35</u>:
Line 38, "of(i)" should read -- of (i) --.

<u>COLUMN 36</u>:
Line 50, "through" should read -- through an --.

UNITED STATES PATENT AND TRADEMARK OFFICE
CERTIFICATE OF CORRECTION

PATENT NO.       : 7,158,946 B2
APPLICATION NO.  : 09/781162
DATED            : January 2, 2007
INVENTOR(S)      : Sato et al.

It is certified that error appears in the above-identified patent and that said Letters Patent is hereby corrected as shown below:

COLUMN 37:
Line 25, "as" should read -- a --; and
Line 26, "of(i)" should read -- of (i) --.

Signed and Sealed this

Fifth Day of August, 2008

JON W. DUDAS
*Director of the United States Patent and Trademark Office*